(12) United States Patent
Jones et al.

(10) Patent No.: US 6,771,377 B2
(45) Date of Patent: Aug. 3, 2004

(54) OPTICAL DISPLACEMENT SENSING DEVICE WITH REDUCED SENSITIVITY TO MISALIGNMENT

(75) Inventors: Benjamin K. Jones, Seattle, WA (US); Karl G. Masreliez, Redmond, WA (US); Kim W. Atherton, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/279,135

(22) Filed: Oct. 22, 2002

(65) Prior Publication Data

US 2003/0174344 A1 Sep. 18, 2003

Related U.S. Application Data

(63) Continuation-in-part of application No. 10/101,031, filed on Mar. 18, 2002, now abandoned.

(51) Int. Cl.$^7$ ............................................. G01B 11/24
(52) U.S. Cl. ....................... 356/616; 356/494; 356/499; 250/237 G
(58) Field of Search ................................ 356/614–616, 356/482, 486, 488, 493–494, 498–499; 250/237 G, 231.13, 231.14, 559.29, 559.32

(56) References Cited

U.S. PATENT DOCUMENTS

| | | | | |
|---|---|---|---|---|
| 4,676,645 A | * | 6/1987 | Taniguchi et al. | 356/494 |
| 4,970,388 A | * | 11/1990 | Nishimura et al. | 250/237 G |
| 4,979,826 A | * | 12/1990 | Ishizuka et al. | 356/499 |
| 5,035,507 A | * | 7/1991 | Nishioki et al. | 356/499 |
| 5,066,130 A | * | 11/1991 | Tsukiji et al. | 356/494 |
| 5,104,225 A | * | 4/1992 | Masreliez | 356/494 |
| 5,120,132 A | * | 6/1992 | Spies et al. | 356/499 |
| 5,532,819 A | * | 7/1996 | Ishizuka et al. | 356/494 |
| 5,977,539 A | * | 11/1999 | Holzapfel et al. | 250/237 G |

* cited by examiner

Primary Examiner—Frank G. Font
Assistant Examiner—Sang Hoang Nguyen
(74) Attorney, Agent, or Firm—Christensen O'Connor Johnson Kindness PLLC

(57) ABSTRACT

An optical displacement sensing device is provided for determining the relative displacement of a diffraction scale grating that may have a grating pitch less than the wavelength of the light of the sensing device. The sensing device includes a split light beam input portion for inputting two split light beams along respective light paths, and light beam directing elements for directing the two split beams along converging light paths toward a first zone on the scale grating to give rise to two diffracted beams along light paths which diverge. The sensing device further includes retroreflector elements for receiving the two diverging diffracted beams and retroreflecting them along light paths which converge toward a second zone on the scale grating to give rise to two later-diffracted light beams that are then directed to a shared zone. The retroreflectors may be positioned to eliminate cross-over beams and the need for polarizers. An optical detector detects at least one illumination characteristic arising from the shared zone, thus sensing displacement of the scale grating along the measuring axis.

95 Claims, 34 Drawing Sheets

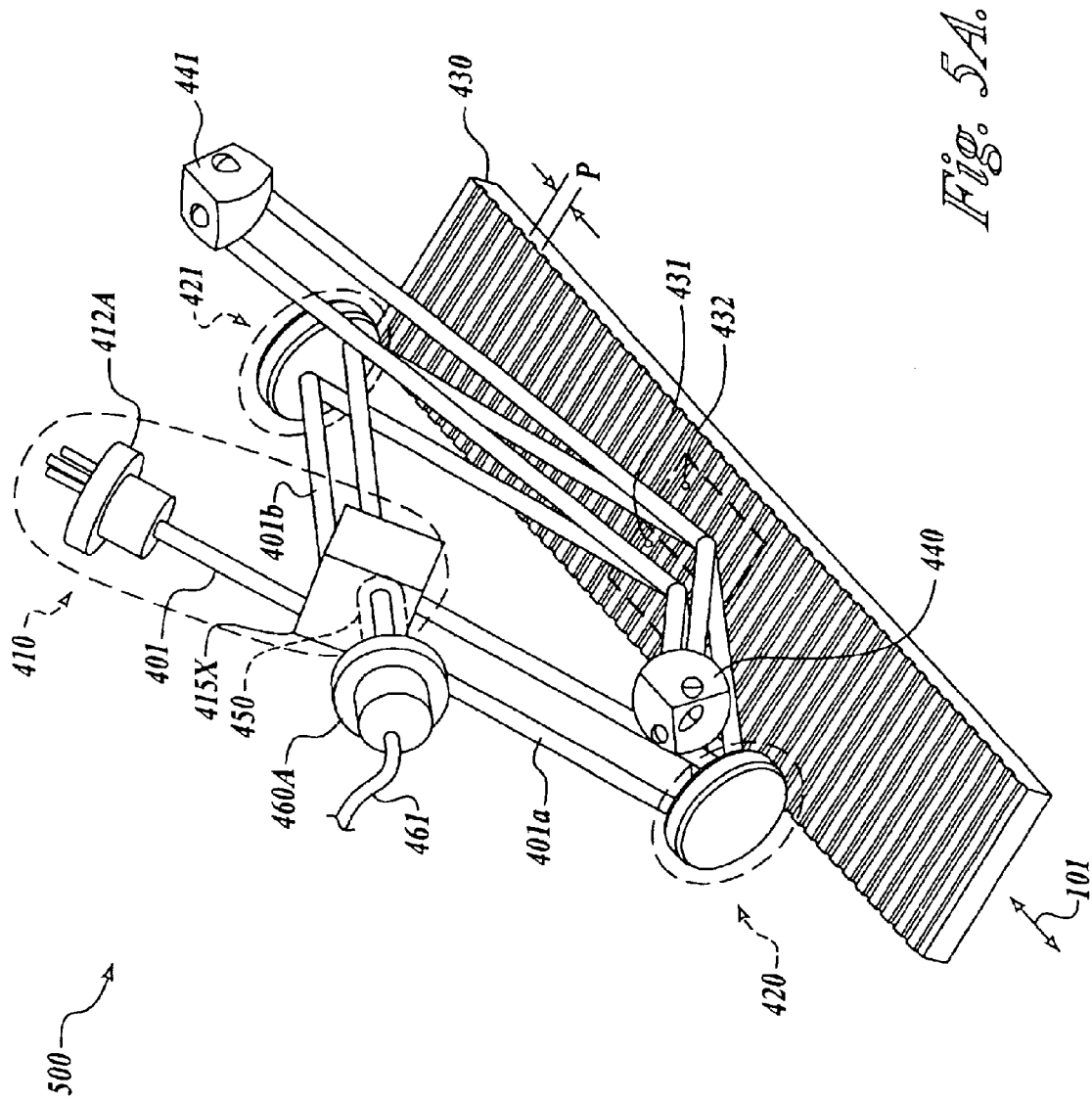

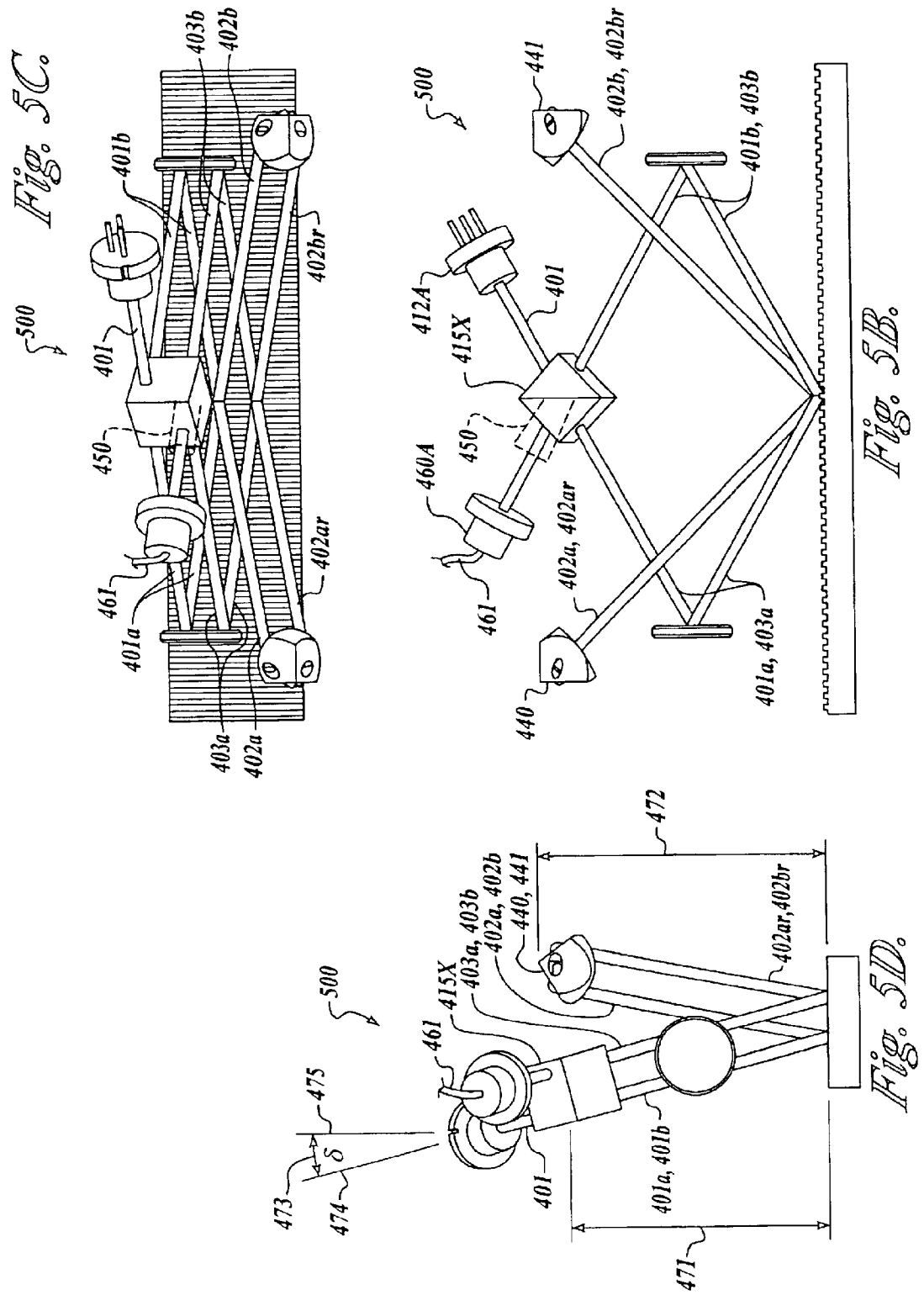

TABLE 801

| INSTALLATION MISALIGNMENTS AND/OR DEVIATIONS | | DYNAMIC MISALIGNMENTS AND/OR DEVIATIONS | | | | | | |
|---|---|---|---|---|---|---|---|---|
| | | ΔPITCH SECONDS | Δ ROLL SECONDS | ΔYAW SECONDS | Δλ um | ΔGAP mm | Δα SECONDS | Δβ SECONDS |
| | | 2 | 2 | 2 | 0.00025 | 0.01 | 20 | 20 |
| PITCH, MINUTES | 30 | 97.0 | 0.0 | 0.0 | -1.0 | 87.3 | 0.0 | 0.1 |
| ROLL, MINUTES | 30 | 97.0 | 0.0 | 3.6 | 0.5 | 0.0 | 0.1 | 0.0 |
| YAW, MINUTES | 1.5 | 97.0 | 0.2 | 0.0 | 0.0 | 0.0 | 0.0 | 0.0 |
| λ, um | 0.005 | 97.0 | 0.0 | 0.0 | 0.0 | 0.0 | 0.0 | 0.0 |
| GAP, mm | 0.1 | 97.0 | 0.0 | 0.0 | 0.0 | 0.0 | 0.0 | 0.0 |
| α, MINUTES | 30 | 97.0 | 0.0 | 0.0 | 0.0 | 0.0 | 0.0 | 0.0 |
| β, MINUTES | 30 | 97.0 | 0.0 | 0.0 | 0.0 | 0.0 | 0.0 | 0.0 |

Fig. 8.

TABLE 901

| INSTALLATION MISALIGNMENTS AND/OR DEVIATIONS | | DYNAMIC MISALIGNMENTS AND/OR DEVIATIONS | | | | | | |
|---|---|---|---|---|---|---|---|---|
| | | ΔPITCH SECONDS | Δ ROLL SECONDS | ΔYAW SECONDS | Δλ um | ΔGAP mm | Δα SECONDS | Δβ SECONDS |
| | | 2 | 2 | 2 | 0.00025 | 0.01 | 20 | 20 |
| PITCH, MINUTES | 30 | 0.0 | 0.0 | 0.0 | -117.5 | -87.3 | -9.2 | 2.1 |
| ROLL, MINUTES | 30 | 0.0 | 0.0 | -0.9 | 0.0 | 0.0 | 0.0 | 0.0 |
| YAW, MINUTES | 1.5 | 0.0 | 0.0 | 0.0 | 0.0 | 0.0 | 0.0 | 0.0 |
| λ, um | 0.005 | -2.2 | 0.0 | 0.0 | 0.0 | 0.0 | 0.0 | 0.0 |
| GAP, mm | 0.1 | -1.0 | 0.0 | 0.0 | 0.0 | 0.0 | 0.0 | 0.0 |
| α, MINUTES | 30 | -0.9 | 0.0 | 0.0 | 0.0 | 0.0 | 0.0 | 0.0 |
| β, MINUTES | 30 | 0.2 | 0.0 | 0.0 | 0.0 | 0.0 | 0.0 | 0.0 |

Fig. 9.

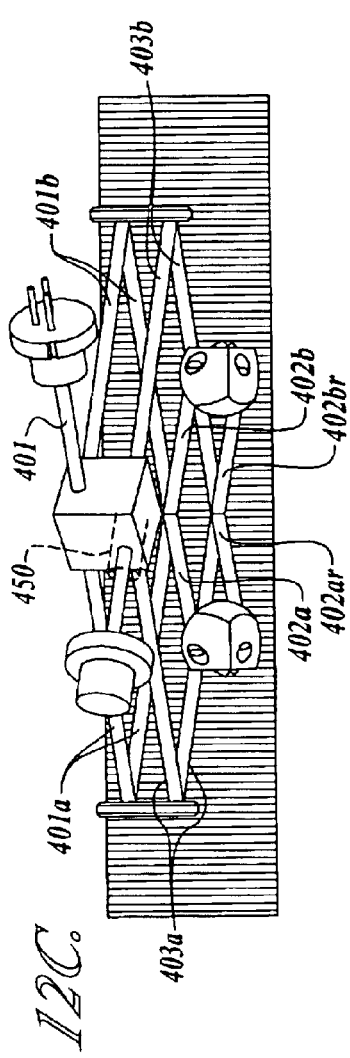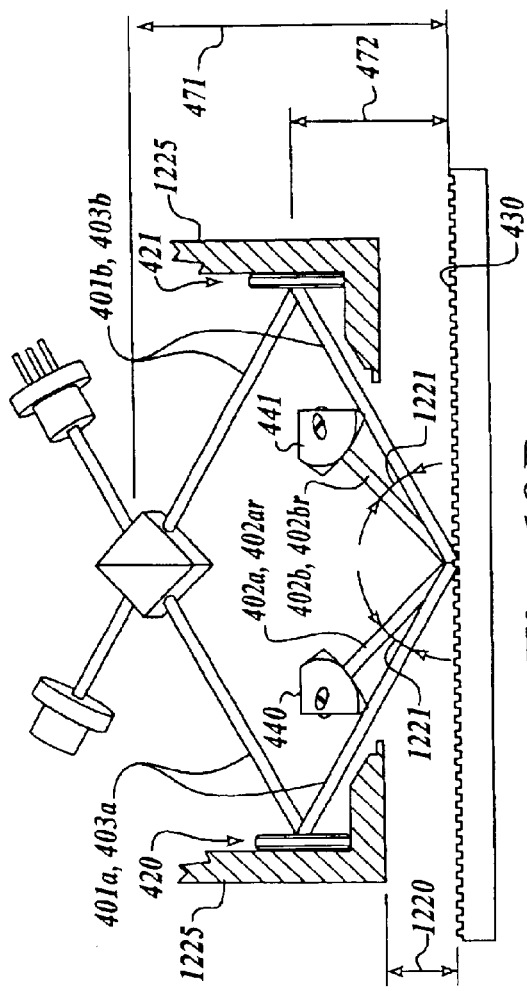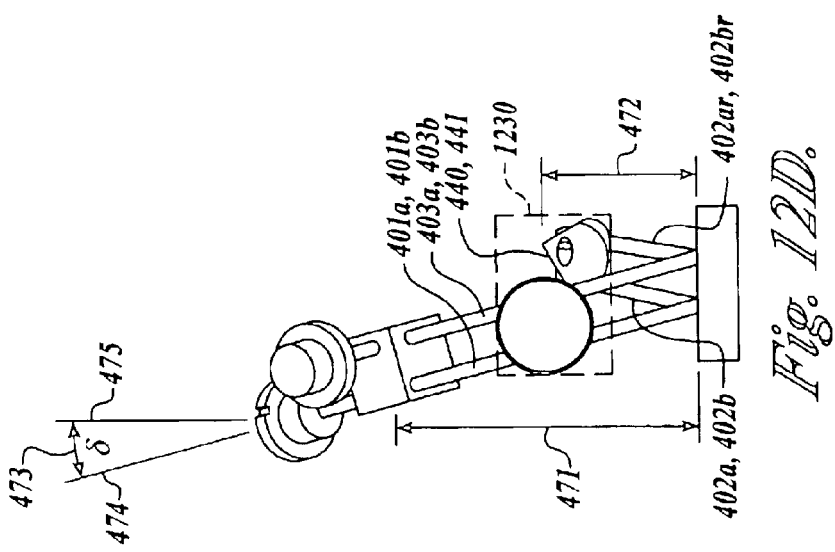
Fig. 12C.
Fig. 12B.
Fig. 12D.

| INCIDENCE ANGLE α | MAXIMUM BEAM CROSS-SECTION AT RETROREFLECTORS (MM) | DISTANCE BETWEEN MIRRORS (MM) |
|---|---|---|
| 10 | 4.6 | 56.7 |
| 20 | 2.2 | 27.5 |
| 30 | 1.4 | 17.3 |
| 40 | 0.9 | 11.9 |

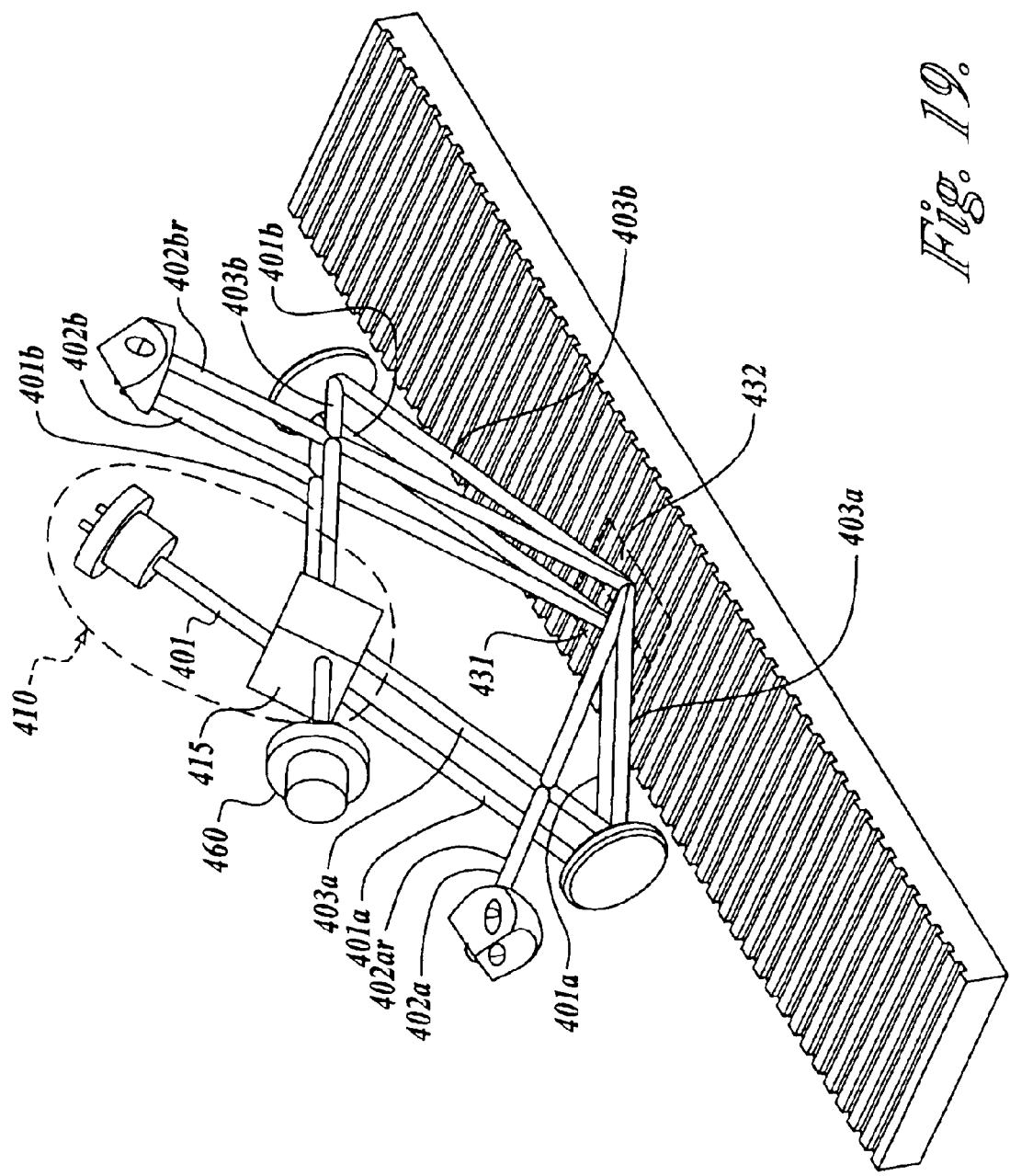

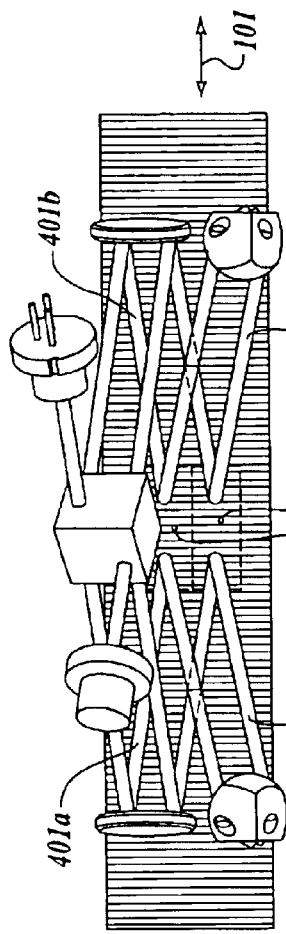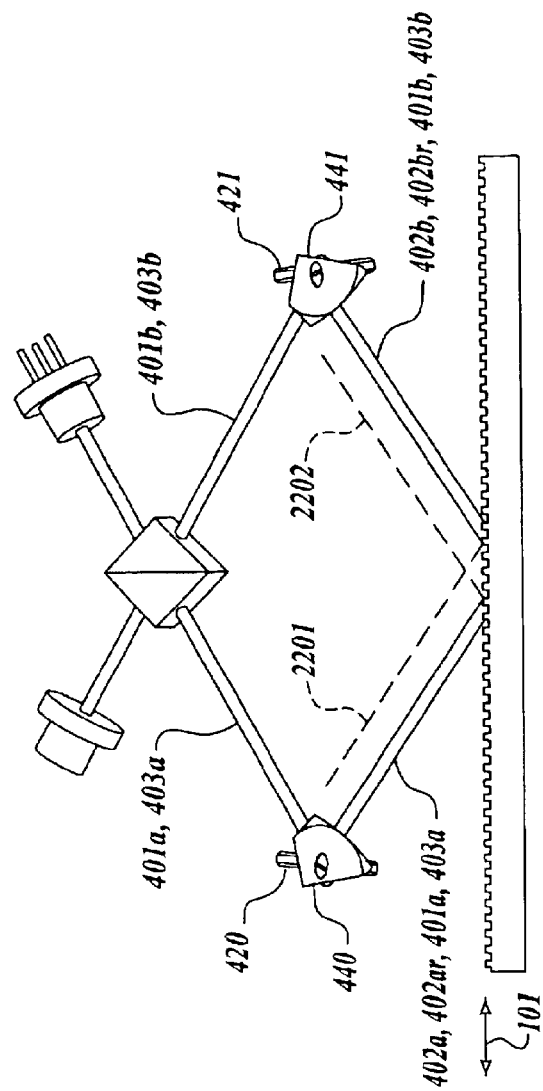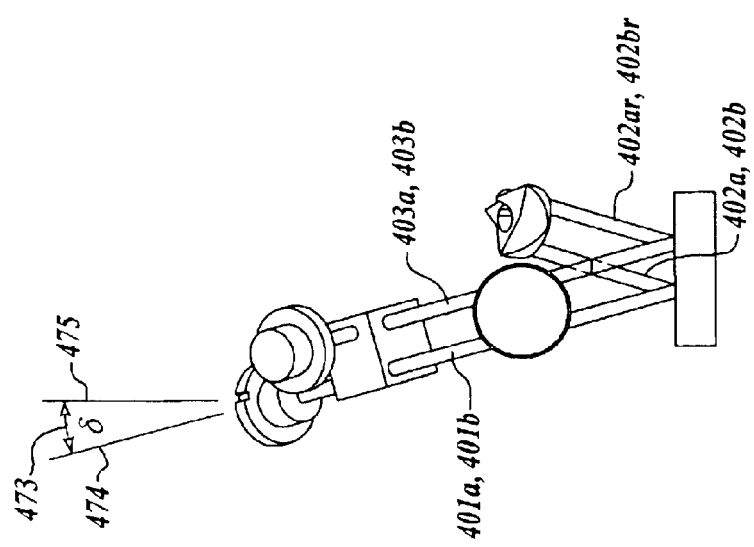

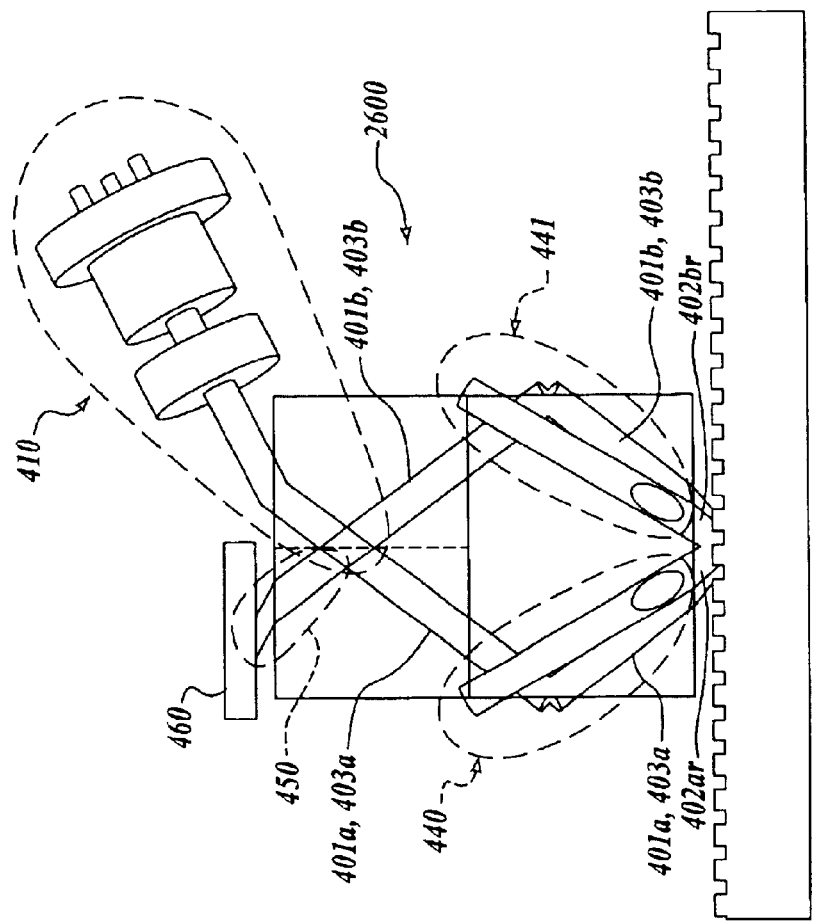
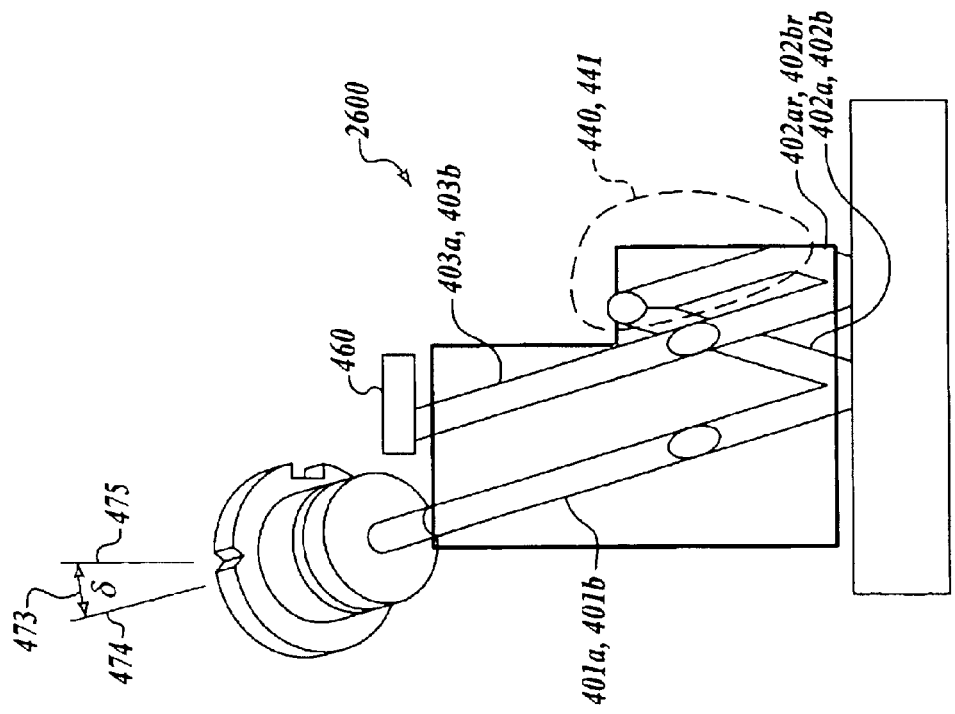
Fig. 26B.
Fig. 26C.

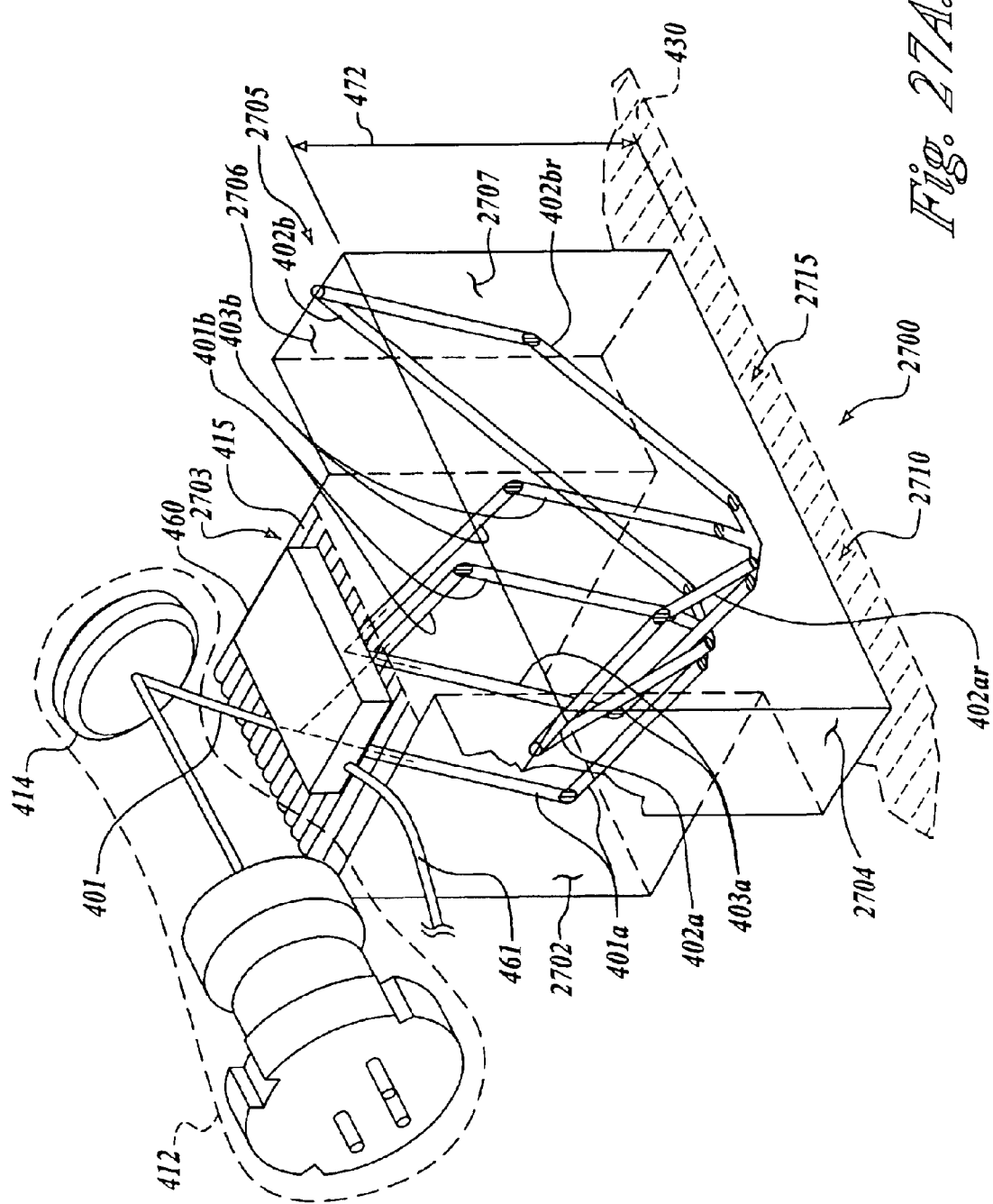

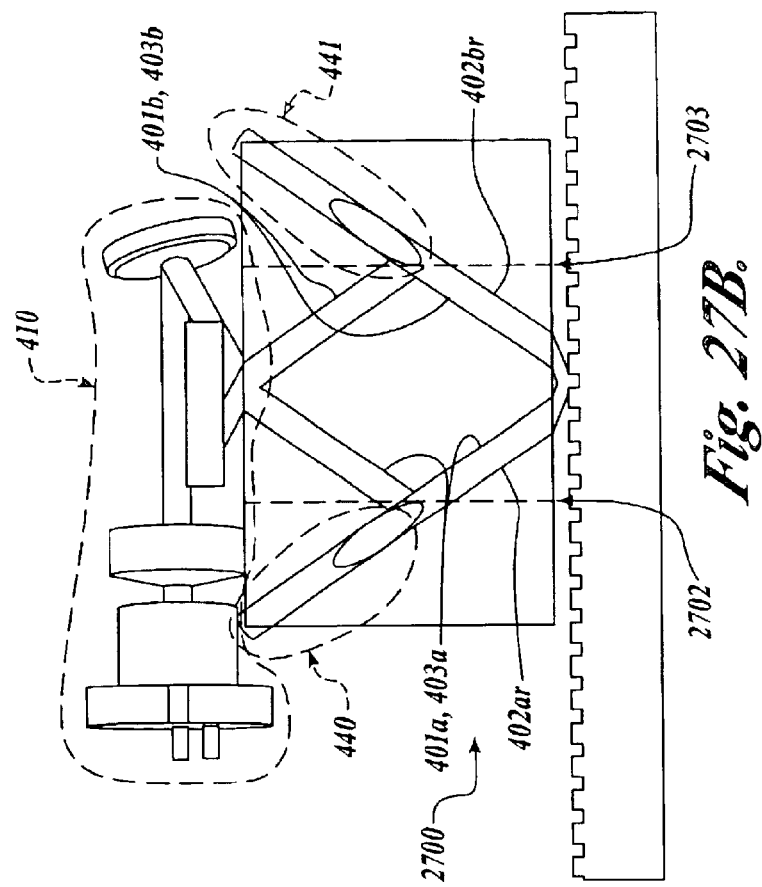
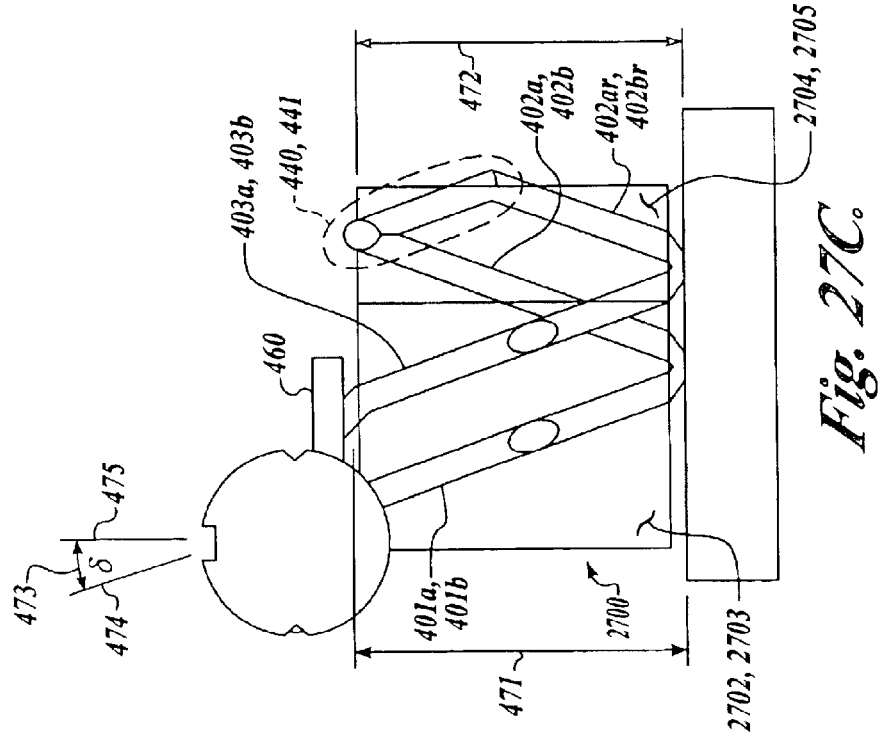
Fig. 27B.
Fig. 27C.

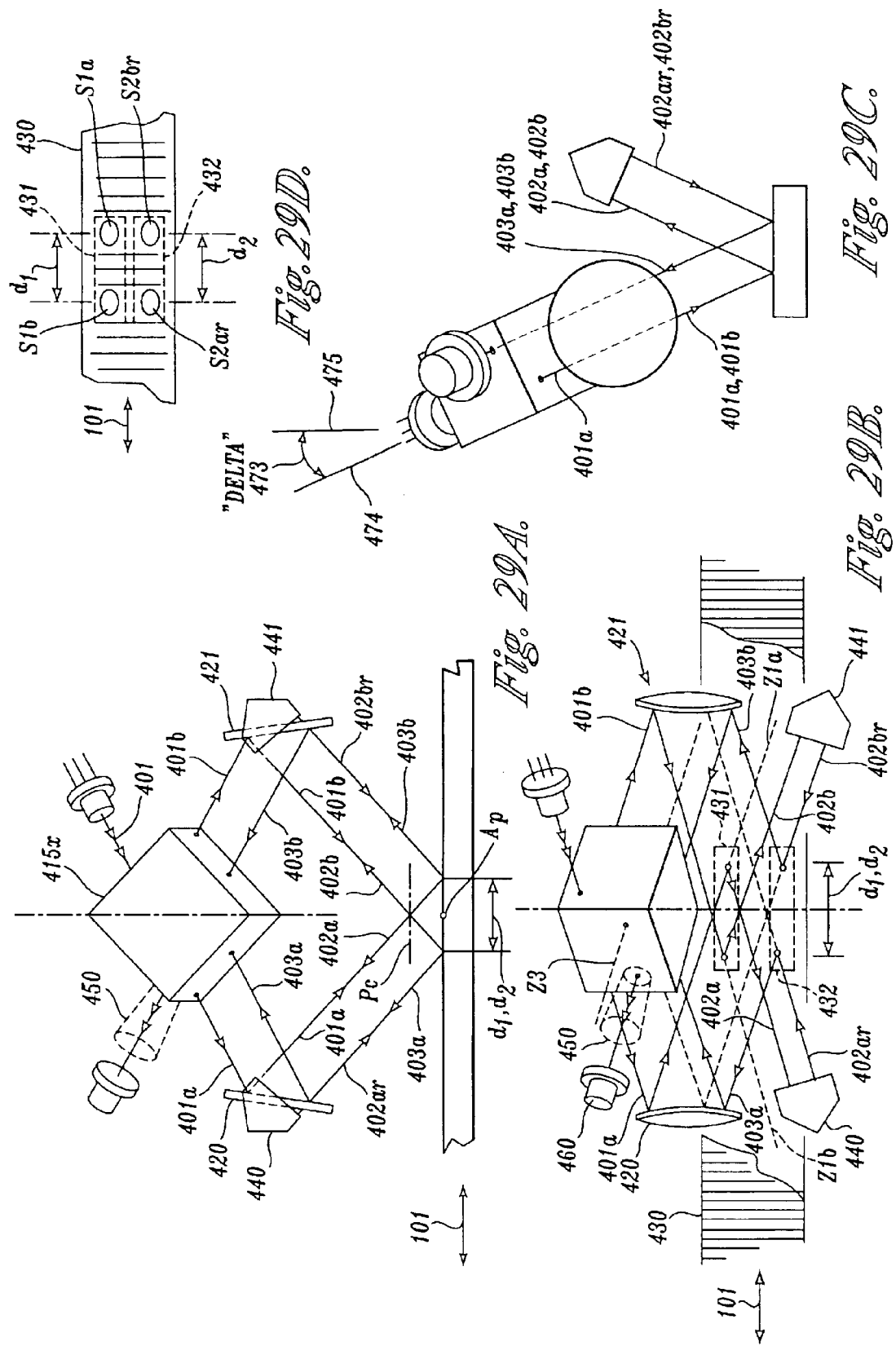

| STATIC MISALIGN-MENTS | | DYNAMIC MISALIGNMENTS | | | | | | |
|---|---|---|---|---|---|---|---|---|
| | | DELTA PITCH, SEC | DELTA ROLL, SEC | DELTA YAW, SEC | DELTA LAMBDA, UM | DELTA CAP, MM | DELTA ALPHA, SEC | DELTA BETA, SEC |
| | | 2 | 2 | 2 | 0.00025 | 0.01 | 20 | 20 |
| PITCH, MIN | 30 | 0.0 | 0.1 | 0.0 | -22.2 | -87.3 | -0.1 | 1.5 |
| ROLL, MIN | 30 | 0.1 | 0.0 | 0.7 | 5.4 | 0.0 | 1.0 | 0.0 |
| YAW, MIN | 1.5 | 0.0 | 0.1 | 0.0 | -0.5 | -4.4 | 0.0 | 0.4 |
| LAMBDA, UM | 0.005 | -0.5 | 0.1 | -0.2 | 0.0 | 0.0 | 0.0 | 0.0 |
| CAP, MM | 0.1 | -1.0 | 0.1 | -1.0 | 0.0 | 0.0 | 0.0 | 0.0 |
| ALPHA, MIN | 30 | 0.0 | 0.1 | 0.8 | 0.0 | 0.0 | 0.0 | 0.0 |
| BETA, MIN | 30 | 0.2 | 0.0 | 0.8 | 0.0 | 0.0 | 0.0 | 0.0 |

TABLE 3203

| STATIC MISALIGN-MENTS | | DELTA PITCH, SEC | DELTA ROLL, SEC | DELTA YAW, SEC | DELTA LAMBDA, UM | DELTA GAP, MM | DELTA ALPHA, SEC | DELTA BETA, SEC |
|---|---|---|---|---|---|---|---|---|
| | | 2 | 2 | 2 | 0.00025 | 0.01 | 20 | 20 |
| PITCH, MIN | 30 | 0.0 | 0.2 | 0.0 | -24.2 | -87.3 | -0.1 | 1.6 |
| ROLL, MIN | 30 | 0.2 | 0.0 | 0.8 | 5.6 | 0.0 | 1.1 | 0.0 |
| YAW, MIN | 1.5 | 0.0 | 0.0 | 0.0 | -0.6 | -4.4 | 0.0 | 0.4 |
| LAMBDA, UM | 0.005 | -0.5 | 0.1 | -0.3 | -3.4 | 0.0 | -0.3 | 0.1 |
| GAP, MM | 0.1 | -1.0 | 0.1 | -1.0 | -0.1 | 0.0 | 0.0 | 0.0 |
| ALPHA, MIN | 30 | 0.0 | 0.0 | 0.0 | -1.5 | 0.0 | 0.0 | 0.1 |
| BETA, MIN | 30 | 0.2 | 0.0 | 0.8 | 0.3 | 0.0 | 0.1 | 0.0 |

DYNAMIC MISALIGNMENTS

TABLE 3401

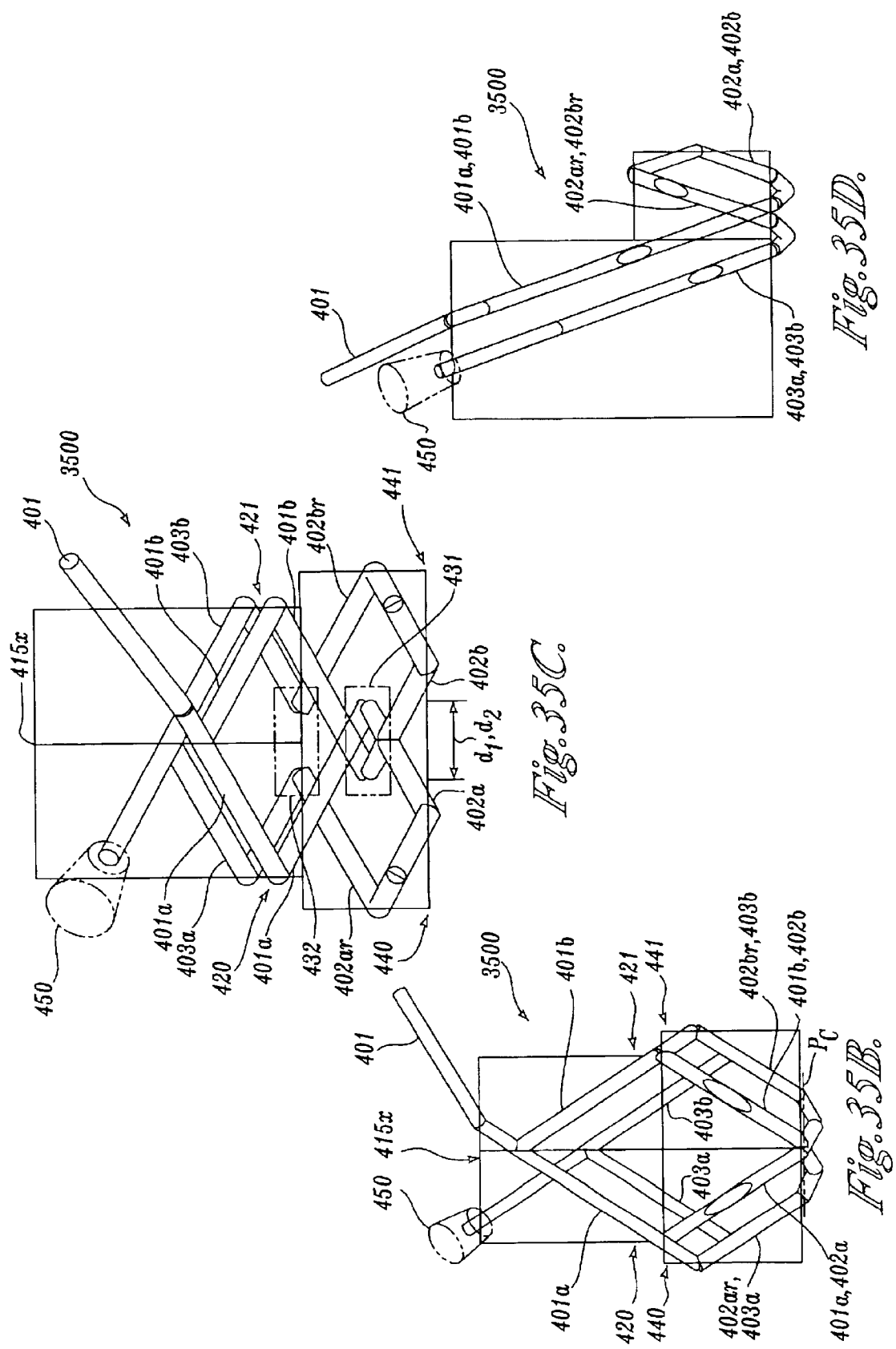

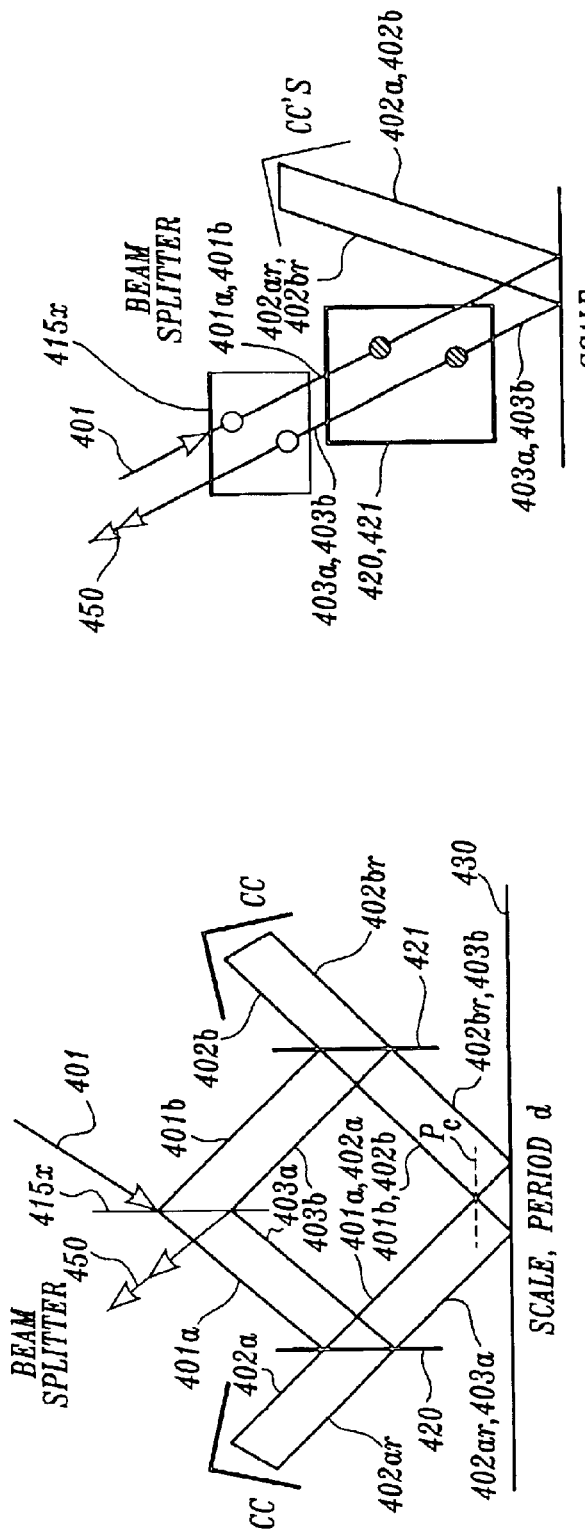
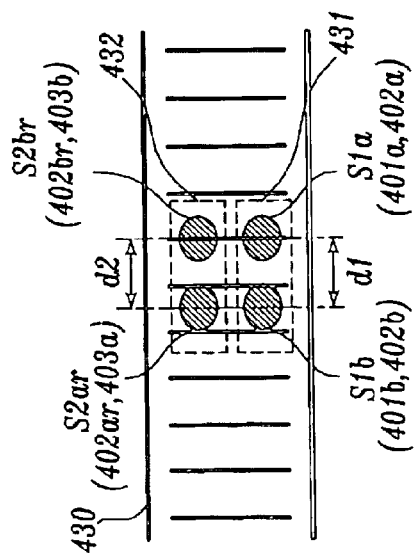
Fig. 35E.
Fig. 35F.
Fig. 35G.

OPTICAL DISPLACEMENT SENSING DEVICE WITH REDUCED SENSITIVITY TO MISALIGNMENT

CROSS-REFERENCE(S) TO RELATED APPLICATION(S)

This application is a continuation-in-part of U.S. patent application Ser. No. 10/101,031, filed Mar. 18, 2002, now abandoned, priority from the filing date of which is hereby claimed under 35 U.S.C. § 120.

FIELD OF THE INVENTION

This invention relates to a sensing device and, more particularly, to an optical displacement sensing device that utilizes the interference of light beams for detecting relative displacements of a diffraction grating with reduced sensitivity to misalignments.

BACKGROUND OF THE INVENTION

An optical displacement sensing device, or optical encoder, is described that can overcome several of the most significant problems faced by designers of these types of devices for practical high precision measurement. If an optical displacement sensing device is to be used to make high precision measurements of a grating surface displacement, e.g., sub-micron resolution and accuracy, it must effectively eliminate or attenuate any distortions of such measurements at a very high level. Current optical displacement sensing devices are incapable of economically and practically eliminating or significantly reducing the effects of certain distortions or parameter drifts from their measurements at the desired levels of accuracy and resolution. Among the problems frequently encountered while using such devices are those arising from a change in wavelength of the light source used for performing measurements, such as associated changes in diffraction angles, changed lights paths, and changes in the number of wavelengths occurring in two light paths of differing length, which affects their relative phase and interference pattern.

Another problem is associated with very small grating periods. To achieve high measurement resolution, it is desirable to use a scale grating with as short a grating period, d, as possible. The lower limit is set by the wavelength $\lambda$ of the light source, according to the formula $d > \lambda/2$. However, unless special design measures are taken, an encoder using such a short scale grating period is too difficult to align with sufficient yaw accuracy, requiring expensive equipment or excessive time and care during installation. Yaw misalignment is a rotation of the optical readhead relative to the grating, in a plane parallel to the grating.

With a yaw misalignment, the desired output beams arising from the scale are no longer parallel and related "distortion" interference fringes are created. If the distortion interference fringe period is small relative to the diameter of the detector area illuminated by the interfering beams, the desired modulation of the signal due to grating motion will be significantly attenuated because several distortion fringe periods will fit within the detector area, and the detector signal will tend toward the constant average intensity of these distortion fringes. To avoid this effect when using practical types of optical detectors and a grating period that approaches the previously discussed $\lambda/2$ limit, the yaw misalignment must be smaller than approximately 0.1 milliradians, in the absence of special design measures. Such alignment requirements are impractical for many users and applications. It is known to incorporate retroreflectors in the light paths of optical encoders in order to overcome such yaw problems, as shown in U.S. Pat. Nos. 5,079,418 to Dieter and 4,930,895 to Nishimura, each of which is incorporated herein by reference, in its entirety. However, such arrangements of retroreflectors have not simultaneously considered compact and economical optical readhead design and packaging, the versatility to work with grating periods both greater and lesser than the wavelength of the light source, and measurement insensitivity to various parameter drifts—including misalignments other than yaw. All of these design factors must be considered simultaneously, and the proper tradeoffs chosen, in order to robustly achieve currently desired measurement resolutions and accuracies.

In particular, parameter drifts including dynamic position misalignments are important error sources in an optical displacement sensing device. Herein, the term dynamic misalignment or drift means the change in an alignment component or parameter that occurs between one displacement position and another displacement position, or at the same displacement position over a period of time, for any reason. Among the range of possible dynamic position misalignments and drift that are introduced in practical applications are changes in the gap between the readhead and grating, pitch (rotation about an axis parallel to the grating and normal to the measuring axis), yaw, roll (rotation about an axis parallel to the measuring axis), and drift in the wavelength of a light source. U.S. Pat. No. 5,146,085 to Ishizuka, incorporated herein by reference, in its entirety, and the '895 patent, previously incorporated, both disclose optical readhead configurations which are relatively insensitive to errors associated with pitch. However, these configurations are not versatile and robust enough when considering the placement of retroreflectors in combination with consideration of the other design factors noted for simultaneous consideration above. Thus error sensitivities associated with the relative pitch of the readhead and grating remain as some of the most difficult error sources to reduce in practical high resolution encoder design and application.

Furthermore, the '085 and '895 configurations may introduce problems created by the reflection of a light beam into the light source used for the generation of the light beam, leading to instability in the wavelength of the light source. Also, these configurations require polarizers, which attenuate the light available to the optical detector and which may limit or prohibit the configuration for use with certain detectors and/or impose relatively higher system power requirements, which may complicate or limit their use in certain applications.

The present invention is directed to optical readhead configurations which are suitable for compact and economical design and packaging, versatile enough to apply with grating periods both greater and lesser than the wavelength of the light source, and which are substantially simultaneously insensitive to various parameter drifts including at least dynamic yaw and pitch misalignments. Some configurations also avoid or limit attenuation of the light available to the detector and/or avoid reflection of light beams into the light source.

SUMMARY OF THE INVENTION

In accordance with this invention, an optical displacement sensing device or optical encoder readhead is provided for determining the relative displacement of a diffraction grating scale along a measuring axis. The grating may be reflective and the grating pitch may be less than the wavelength of the light of the encoder readhead. In one embodiment, the sensing device includes a split light beam input portion for inputting two split light beams along respective light paths; light beam directing elements for directing the two split beams along respective converging light paths toward a first zone on the scale grating to give rise to two diffracted beams along respective light paths which diverge to enter two retroreflector elements that receive the two diffracted beams and retroreflect them as two respective retroreflected beams along converging light paths toward a second zone on the scale grating to give rise to two later-diffracted light beams. The two later-diffracted light beams are then directed to a shared zone, and an optical detector. The optical detector detects at least one illumination characteristic arising from the shared zone, thus sensing displacement of the grating scale along a measuring axis.

In accordance with one aspect of the invention, by directing the two split beams along respective converging light paths toward a compact first zone on the scale grating, the device sensitivity to dynamic pitch misalignments can be reduced.

In accordance with another aspect of the invention, by retroreflecting the two diffracted beams along respective converging light paths toward a compact second zone on the scale grating, yaw sensitivity is substantially eliminated while the device sensitivity to dynamic pitch misalignments is further reduced.

In accordance with another aspect of the invention, the sensing device configuration may be aligned with two different inclined planes inclined away from each and parallel to the measuring axis. Various inclined configurations can prevent undesirable mixing of various light beams, while at the same time facilitating compact design and packaging of the device.

In accordance with a further aspect of the invention, in one embodiment the two split beams converge along respective light paths until reaching the first zone on a scale grating, and the retroreflectors are located and oriented relative to their received beams such that their two retroreflected beams converge back along respective converging optical paths until reaching a hypothetical plane parallel and proximate to the second zone on the scale grating and then diverge over a small remaining distance to the second zone on the scale grating. This arrangement produces a configuration of path lengths and light spots on the scale grating that further reduces the device sensitivity to dynamic pitch misalignments, while at the same time facilitating compact design and packaging of the device.

In accordance with a further aspect of the invention, in a separate embodiment the two split beams converge along respective light paths until reaching a hypothetical plane parallel and proximate to the first zone on the scale grating and then diverge over a small remaining distance to the first zone on the scale grating, and the retroreflectors are located and oriented relative to their received beams such that their two retroreflected beams converge back along respective converging optical paths until reaching the second zone on a scale grating. This arrangement produces a configuration of path lengths and light spots on the scale grating that further reduces the device sensitivity to dynamic pitch misalignments, while at the same time facilitating compact design and packaging of the device.

In accordance with another aspect of the invention, the respective light paths which diverge to enter the two retroreflector elements each receive a diffracted light beam arising from only one of the split beams, avoiding the need for polarizers in the encoder readhead.

In accordance with a further aspect of the invention, the light paths of the two later-diffracted light beams each receive a later-diffracted light beam arising from only one of the retroreflected beams, further avoiding the need for polarizers in the encoder readhead.

In accordance with another aspect of the invention, in various embodiments, the light beams that are directed toward the first zone impinge upon the scale grating at a first respective pair of light spots that are separated by a first distance along the measuring axis direction, and the respective light beams that are directed toward the second zone impinge upon the scale grating at a second respective pair of light spots that are separated by a second distance along the measuring axis direction. In one embodiment, the first and second distances are made to be equal. In a further embodiment, the first respective pair of light spots and the second respective pair of light spots are nominally aligned along a direction perpendicular to the measuring axis.

In accordance with another aspect of the invention, the sensing device configuration may be arranged such that the split light beams nominally impinge on the first zone within a range of angles that attenuates the sensitivity of the device to certain errors associated with at least dynamic pitch changes and wavelength drift, while at the same time facilitating compact design and packaging of the device.

In accordance with another aspect of the invention, the light beam directing elements comprise opposing surfaces of a block of transparent material, providing a compact, economical and robust way to fabricate and precisely position the elements.

In accordance with another aspect of the invention, the retroreflector elements comprise respective corners of a block of transparent material, providing a compact, economical and robust way to fabricate and precisely position the retroreflector elements.

In accordance with another aspect of the invention, a readhead grating produces the two split beams and the sensing device configuration may be arranged such that the readhead grating and retroreflectors are in a configuration that attenuates the sensitivity of the device to certain errors associated with at least dynamic pitch changes and wavelength drift.

In accordance with a further aspect of the invention, the sensing device configuration includes an input grating at a first height and an output grating at a second height, wherein the retroreflectors are located at a height that is midway between the height of the input grating and the height of the output grating.

In accordance with another aspect of the invention, a beamsplitter produces the two split beams and the sensing device configuration may be arranged such that the beamsplitter and retroreflectors are in a configuration that attenuates the sensitivity of the device to certain errors associated with at least dynamic pitch changes and wavelength drift.

In accordance with a further aspect of the invention, in various embodiments a polarizing configuration may be used for the optical detector and in various other embodiments a compact optical array may be used for the optical detector.

Hence the invention overcomes the disadvantages of prior art optical displacement sensing devices with a compact, economical and versatile configuration applicable to grating periods both greater and lesser than the wavelength of the light used, and which is substantially simultaneously insensitive to various parameter drifts including at least dynamic yaw and pitch misalignments.

BRIEF DESCRIPTION OF THE DRAWINGS

The foregoing aspects and other attendant advantages of this invention will become more readily appreciated as the same become better understood by reference to the following detailed description, when taken in conjunction with the accompanying drawings, wherein:

FIG. 5A is a three-dimensional conceptual view of an optical displacement sensing device in accordance with a second exemplary embodiment of the invention;

FIG. 5B is a side view of the optical displacement sensing device shown in FIG. 5A;

FIG. 5C is a top view of the optical displacement sensing device shown in FIG. 5A;

FIG. 5D is an end view of the optical displacement sensing device shown in FIG. 5A;

FIG. 8 is an error table showing the errors associated with various initial and dynamic misalignments and drifts for a prior art optical displacement sensing device configuration corresponding to FIG. 1;

FIG. 9 is an error table showing the errors associated with various initial and dynamic misalignments and drifts for an optical displacement sensing device configuration corresponding to FIGS. 5A–5D and FIGS. 12A–12D;

FIG. 12B is a side view of the optical displacement sensing device shown in FIG. 12A, including a portion of an exemplary readhead housing;

FIG. 12C is a top view of the optical displacement sensing device shown in FIG. 12A;

FIG. 12D is an end view of the optical displacement sensing device shown in FIG. 12A;

FIG. 19 is a three-dimensional conceptual view of an optical displacement sensing device in accordance with a fourth exemplary embodiment according to the invention;

FIG. 22A is a conceptual side view of an optical displacement sensing device in accordance with a sixth exemplary embodiment according to the invention;

FIG. 22B is a top view of the optical displacement sensing device shown in FIG. 22A;

FIG. 22C is an end view of the optical displacement sensing device shown in FIG. 22A;

FIG. 26B is a side view of the transparent block configuration shown in FIG. 26A;

FIG. 26C is an end view of the transparent block configuration shown in FIG. 26A;

FIG. 27A is a three-dimensional view showing a third exemplary transparent block configuration usable in various exemplary embodiments according to the invention;

FIG. 27B is a side view of the transparent block configuration shown in FIG. 27A;

FIG. 27C is an end view of the transparent block configuration shown in FIG. 27A;

FIG. 29A is a conceptual side view of an optical displacement sensing device in accordance with a ninth exemplary embodiment according to the invention;

FIG. 29B is a top view of the optical displacement sensing device shown in FIG. 29A;

FIG. 29C is an end view of the optical displacement sensing device shown in FIG. 29A;

FIG. 29D is a top view of one exemplary spot pattern formed on a scale according to the ninth exemplary embodiment shown in FIGS. 29A–29C;

FIG. 35B is a side view of the transparent block configuration shown in FIG. 35A;

FIG. 35C is a top view of the transparent block configuration shown in FIG. 35A;

FIG. 35D is an end view of the transparent block configuration shown in FIG. 35A;

FIG. 35E is a schematic side view of the eleventh exemplary embodiment shown in FIGS. 35A–35D;

FIG. 35F is a schematic end view of the eleventh exemplary embodiment shown in FIGS. 35A–35D;

FIG. 35G is a top view of a nominal spot pattern formed on the scale grating according to the eleventh exemplary embodiment shown in FIGS. 35A–35F.

DETAILED DESCRIPTION OF THE PREFERRED EMBODIMENT

The invention provides a configuration for a high resolution displacement sensing device or optical encoder that is compact, relatively economical to construct, and which is substantially simultaneously insensitive to various parameter drifts including at least dynamic yaw and pitch misalignments. The configuration is versatile enough to be applicable to grating periods both greater and lesser than the wavelength of the light used.

Figure 1:
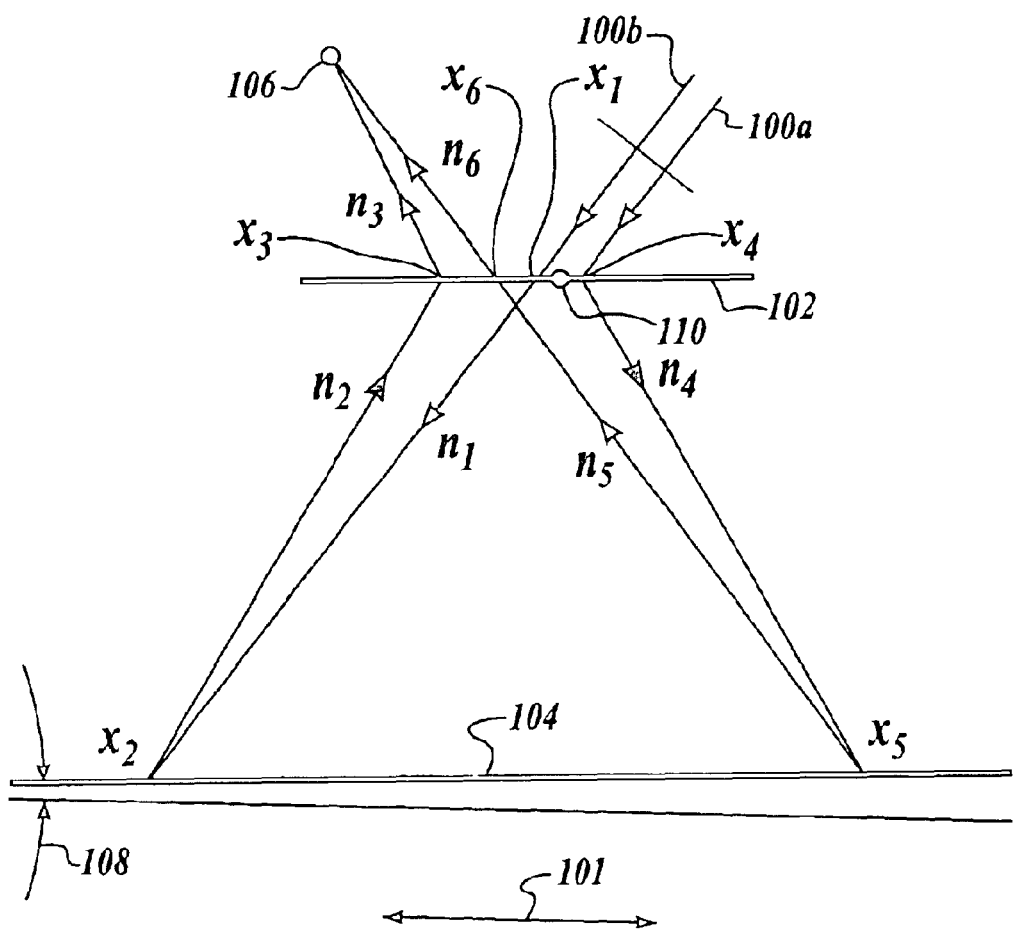
FIG. 1 is a diagram showing a side view of light beam paths in a first prior art optical displacement sensing device.

FIG. 1 is a diagram showing a side view of light beam paths in a first prior art optical displacement sensing device. The separation of light rays in the diagram are exaggerated for clarity. A relative displacement axis and/or measuring axis direction 101 is indicated. A beam, which is the source of input rays 100a and 100b, is transmitted toward readhead grating 102. Readhead grating 102 is a transmissive diffraction grating. A ray tracing process is started at location 110, which is a wavefront at which input rays 100a and 100b have the same optical phase. The starting points of the rays on the wavefront are chosen so that, when traced through the system, both rays arrive at the same output detection point 106.

Light ray 100a is diffracted at deflection point $X_4$ and produces a light ray $N_4$, a chosen diffraction order. Light ray $N_4$ is diffracted from scale surface 104 at reflection point $X_5$ and forms diffracted ray $N_5$. Diffracted ray $N_5$ is transmitted in the gap between scale surface 104 and readhead grating 102. Light ray $N_5$ is subsequently transmitted through readhead grating 102 at transmission point $X_6$ and produces a zero order transmitted light ray $N_6$ which is transmitted to output detection point 106. In a similar fashion, input ray 100b is transmitted through readhead grating 102 at transmission point $X_1$ and produces a zero order transmitted light ray $N_1$, which is subsequently transmitted through the gap between readhead grating 102 and scale surface 104. Light ray $N_1$ is diffracted from scale surface 104 at reflection point $X_2$, and produces a light ray $N_2$, a chosen diffraction order. Light ray $N_2$ is diffracted from readhead grating 102 at deflection point $X_3$ and produces light ray $N_3$, a chosen diffraction order. Light ray $N_3$ is subsequently transmitted in a direction parallel or nearly parallel to transmitted light ray $N_6$ to output detection point 106. It should be appreciated that the deflection points $X_1$ and $X_4$ may be the same point and the deflection points $X_3$ and $X_6$ may be the same point.

The prior art configuration shown in FIG. 1 is intended to demonstrate the fundamental problems that exist in the absence of modifications to overcome the effect of dynamic misalignments. One primary objective of the claimed invention is to provide accurate output beam signals and related measurements while rejecting various combinations of static and dynamic misalignments. Among the potential sources of dynamic misalignments to be overcome by the invention are misalignments during the travel of the displacement sensing device relative to a target object due to bearing imperfections, and due to misalignments arising from warping and waviness of the surface of the grating. Warping and waviness, for example, result from thickness variations in the measuring scale and/or a bonding layer attaching the measuring scale to the target object or an intermediate mounting member, as well as from the measuring scale conforming to surface distortions of a mounting member. FIG. 1 shows scale surface 104 elevated from an initial or ideal surface parallel to readhead grating 102 and or measuring axis direction 101 by an angle 108. Angle 108 represents a dynamic pitch misalignment of the scale surface 104 relative to an optical displacement sensing device.

The dynamic pitch misalignment of angle 108, for example due to distortion, thermal deformation, or displacement creating a change in elevation between reflection points $X_2$ and $X_5$, would change the positions of the points $X_1$–$X_6$, where the rays intersect with the gratings. This change of where the rays intersect the gratings creates a change in the phase difference between the two light rays, $N_3$ and $N_6$, that will be indistinguishable from any change in phase difference due to the intended displacement of the scale surface 104 along measuring axis direction 101, resulting in measurement errors. The errors will be proportional to the magnitude of the dynamic misalignment encountered between successive measurements of the displacement of the scale surface 104. An alternative configuration is required to overcome such inaccuracies that will be produced from dynamic misalignments that occur when making measurements with a device having the prior art configuration shown in FIG. 1.

Figure 2:
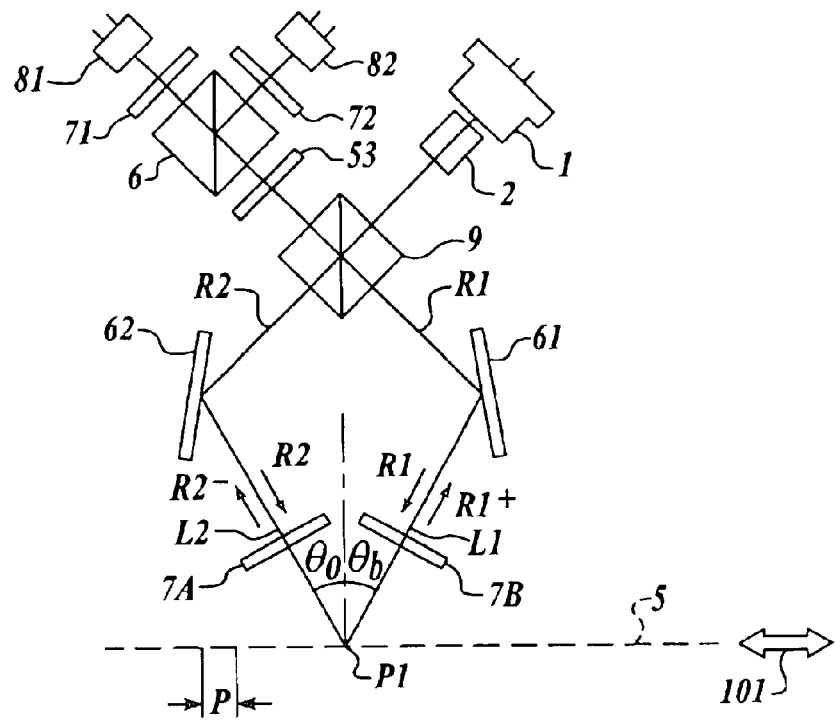
FIG. 2 is a diagram showing a schematic side view of a second prior art optical displacement sensing device.

FIG. 2 is a diagram showing a schematic side view of a second prior art optical displacement sensing device disclosed in the incorporated '085 patent. In FIG. 2, the reference numeral 1 designates a light source comprising a laser diode, the reference numeral 2 denotes a collimator lens, the reference numeral 9 designates a polarizing beam splitter, the reference numeral 5 denotes a diffraction grating having a pitch P formed on a linear scale or a rotary scale, the reference numerals 61 and 62 designate mirrors, the reference numerals 7A and 7B denote quarter-wavelength plates, the reference numeral 6 designates a non-polarizing beam splitter, the reference numerals 71 and 72 denote polarizing elements (such as polarizing plates or polarizing beam splitters), and the reference numerals 81 and 82 designate light receiving elements. A laser beam of wavelength $\lambda$ emitted from the light source 1 is collimated by the collimator lens 2, and the parallel light beam is caused to enter the polarizing beam splitter 9, whereby it is divided into two light beams R1 and R2 whose polarization azimuths are orthogonal to each other. The light beam R1 is an S-polarized light reflected by the polarizing beam splitter 9, and the light beam R2 is a P-polarized light transmitted through the polarizing beam splitter 9. The light beam R1 travels along an optical path L1 formed via the mirror 61, and the light beam R2 travels along an optical path L2 formed via the mirror 62. The light beams R1 and R2 pass through the quarter wavelength plates 7A and 7B, whereafter they are incident on a point P1 on the diffraction grating 5 at an angle of incidence $\theta o=\theta b=\sin^{-1}(\lambda/2P)$, and light beams R1 and R2 are obtained by being reflected and diffracted by the diffraction grating 5. The +1st-order diffracted light (R1+) of the light beam R1 and the −1st-order diffracted light (R2−) of the light beam R2 travel toward the original optical paths L1 and L2, respectively, through the quarter wavelength plates 7A and 7B. The +1 st-order diffracted light traveling reversely along an optical path L1 and the −1st-order diffracted light traveling reversely along an optical path L2 are reflected by the mirrors 61 and 62, respectively, and are directed to the polarizing beam splitter 9, and are again superposed one upon the other by the polarizing beam splitter 9. The +1st-order diffracted light is made into a P-polarized light by the action of the quarter wavelength plate 7B and the −1st-order diffracted light is made into an S-polarized light by the action of the quarter wavelength plate 7A and therefore, these light beams emerge from the polarizing beam splitter 9 while overlapping with each other, without any loss. The overlapping two light beams pass through the quarter wavelength plate 53 and become circularly polarized lights.

After this the light beam is divided into two light beams equal in quantity of light by the non-polarizing beam splitter 6. Only a particular polarized component is separated and taken out from one of the two light beams by the use of the polarizing element 72 and is caused to enter the light receiving element 82, and only a particular polarized component is separated and taken out from the other light beam by the use of the polarizing element 71 and is caused to enter the light receiving element 81. Periodic signals are output from the light receiving elements 82 and 81, respectively in conformity with the displacement of the scale. The periodic signals are output in "quadrature", according to methods known to one skilled in the art. The structure and operation of the configuration shown in FIG. 2 are described in further detail in the incorporated '085 patent.

The prior art configuration shown in FIG. 2 substantially eliminates the dynamic pitch misalignment sensitivity previously discussed with respect to FIG. 1. However, the configuration has undesirable limitations. The configuration includes no means for reducing yaw sensitivity. With yaw misalignment, the output beams returning from the scale are no longer parallel and the signals provided by the optical detection scheme will produce large errors at small yaw misalignments. Thus the configuration is not robust and requires a level of care in installation and use that is not desirable. This is particularly true when the pitch P of diffraction grating 5 is made small, as previously discussed. In addition, the zero order beams "cross-over" to the opposite optical path by reflection at the point P1. Thus "cross-over beams" are undesirably combined with the desired diffracted beams described above. Light from the cross-over beams must be removed from the respective optical paths by the effects of polarizing beam splitter 9. Thus the configuration must use polarizers, which impose unwanted encoder readhead fabrication and/or assembly constraints in some situations. Optical energy is also wasted. Furthermore, the disclosed configuration lies in a plane, which is normal to the scale. Thus a portion of the reflected and diffracted light may be returned to the light source, causing instability in the light source. Furthermore, the wavelength $\lambda$ and the grating pitch P completely determine the incident angle, which imposes unwanted encoder readhead packaging and size constraints in some situations. An alternative configuration is required to overcome such undesirable limitations.

Figure 3:
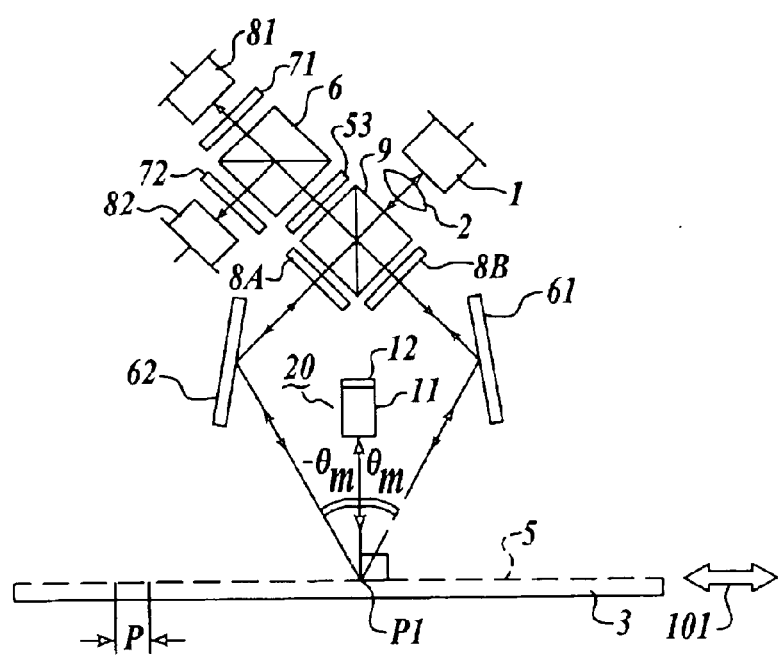
FIG. 3 is a diagram showing a schematic side view of a third prior art optical displacement sensing device.

FIG. 3 is a diagram showing a schematic side view of a third prior art optical displacement sensing device that is disclosed in the incorporated '895 patent. In FIG. 3, the reference numeral 1 designates a semiconductor laser, the reference numeral 2 denotes a collimator lens, the reference numeral 9 designates a polarizing beam splitter, the reference numeral 5 denotes an optical scale having a diffraction grating having a pitch P, the reference numerals 61 and 62 designate reflecting mirrors, the reference numerals 8A and 8B denote quarter-wavelength plates, the reference numeral 6 designates a beam splitter, the reference numerals 71 and 72 denote polarizing plates whose polarization axes form an angle of 45° with each other. The reference numerals 81 and 82 designate light receiving elements which photoelectrically convert interference fringes. The reference numeral 11 denotes an index distribution type stick lens carrying a reflecting film 12, which together constitute a reflecting element 20 that returns light substantially along the optical path by which it entered the reflecting element 20. A coherent light beam from the semiconductor laser 1 is collimated by the collimator lens 2 and enters the polarizing beam splitter 9, whereby it is divided into transmitted and reflected light beams whose polarizations are orthogonal to each other. The transmitted and reflected light beams are made into circularly polarized lights through the quarter wavelength plates 8A and 8B, respectively, and are reflected by the reflecting mirrors 62 and 61, and are caused to obliquely enter the optical scale 5 at a point P1 so that the mth-order diffracted light from the optical scale 5 emerges substantially perpendicularly from the diffraction grating surface of the optical scale 5. That is, each light beam is caused to enter the optical scale 5 so that $\theta_m \approx \sin^{-1}(m\lambda/P)$, where P is the grating pitch, $\lambda$ is the wavelength of the light from the semiconductor laser 1, m is an integer, and $\theta_m$ is the incident angle, from the light beam to the perpendicular to the diffraction grating surface. The diffracted lights emerging substantially perpendicularly from the diffraction grating surface form a common optical path and enter the reflecting element 20 where they are reflected to return along the original optical path, are reflected by the reflecting mirrors 61 and 62, are transmitted through the quarter wavelength plates 8A and 8B and again enter the polarizing beam splitter 9. The diffracted lights emerge from the polarizing beam splitter 9 superimposed and are made into circularly polarized lights opposite in direction to each other through the quarter wavelength plate 53.

After this the superimposed lights are divided into two light beams by the beam splitter 6, and are made into linearly polarized lights through the polarizing plates 72 and 71 and then enter the light receiving elements 82 and 81, respectively. Periodic signals are output from the light receiving elements 82 and 81, respectively in conformity with the displacement of the scale. The periodic signals are output in "quadrature", according to methods known to one skilled in the art. Because the received light is twice diffracted by the optical scale 5 as mth-order light, once before entering the reflecting element 20 and once after, when the grating moves by one pitch increment the periodic signals undergo 4 m cycles. The structure and operation of the configuration shown in FIG. 3 are described in further detail in the incorporated '895 patent.

The prior art configuration shown in FIG. 3 substantially eliminates the dynamic pitch misalignment sensitivity previously discussed with respect to FIG. 1. Furthermore, the configuration substantially eliminates yaw sensitivity through the effects of the reflecting element 20, which is one type of retroreflector. Nevertheless, the configuration has all the other undesirable limitations previously discussed with respect to FIG. 2, as well as one additional major limitation. The additional limitation is that the configuration will not operate with a grating pitch P that is less than the wavelength $\lambda$ of the light. That is, there is no solution to the required equation $\theta_m \approx \sin^{-1}(m\lambda/P)$, in this situation. In addition, even when the configuration is operable, the zero order beams and "cross-over" to the opposite optical path by reflection at the point P1, and the diffracted beams are otherwise mixed in the common path to and from the reflecting element 20. Thus "cross-over beams" are undesirably combined with the desired diffracted beams. Light from the cross-over beams must be removed from the respective optical paths by the effects of polarizing beam splitter 9. Thus the configuration must use polarizers, which impose unwanted encoder readhead fabrication and/or assembly constraints in some situations. Optical energy is also wasted. Furthermore, the disclosed configuration lies in a plane, which is normal to the scale. Thus a portion of the reflected and diffracted light may be returned to the light source, causing instability in the light source. Furthermore, the wavelength $\lambda$ and the grating pitch P completely determine the incident angle, which imposes unwanted encoder readhead packaging and size constraints in some situations. An alternative configuration is required to overcome such undesirable limitations.

In the following discussions of various exemplary embodiments according to the principles of this invention, only operable light beams and/or light paths are shown, as necessary to explain and clarify the invention. However, it should be appreciated that various beam splitting elements and gratings shown and discussed below will give rise to various other split beams and/or diffracted light beam orders which are "lost" from the various operable light path configurations according to this invention. Such "lost light" paths and/or beams are generally not shown or discussed except herein, except with regard to their potential for light source wavelength disturbance or cross-over light in a particular embodiment. Accordingly, it should be appreciated that for simplicity and clarity terms such as "light beam" or "light path" are used herein to refer to the operable light beams or operable light paths that contribute light that is eventually detected in a shared zone according to the principles of this invention, unless otherwise indicated. The various other "lost light" paths and/or beams which may be present in various embodiments according to this invention will be apparent to one of ordinary skill in the art. It is to be understood that in addition to the operable light paths and/or beams described and claimed below, such lost light paths and/or beams are present in various embodiments according to this invention regardless of whether or not they are explicitly indicated.

Figure 4:
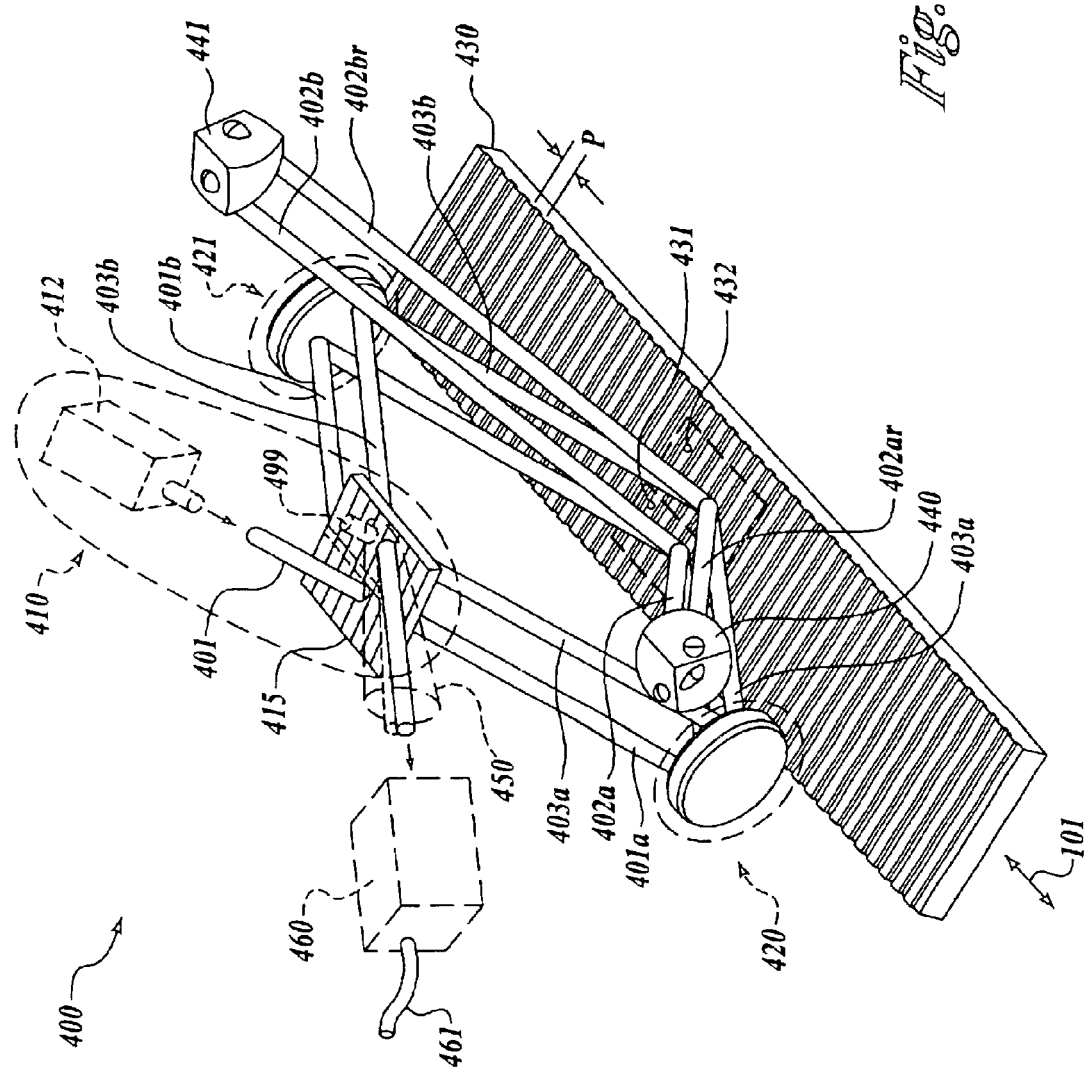
FIG. 4 is a three-dimensional conceptual view of an optical displacement sensing device configuration in accordance with a first exemplary embodiment of the invention.

FIG. 4 is a three-dimensional conceptual view of an optical displacement sensing device configuration in accordance with a first exemplary embodiment of this invention. This first exemplary embodiment is discussed as a generic embodiment, which may include the specific exemplary elements shown in FIG. 4. It should be appreciated that the generic portions of the following discussion are indicative of large number of configurations, which vary in their combination of elements and dimensions from the specific elements and dimensions indicated in FIG. 4. Thus FIG. 4 should not be interpreted as limiting with regard to the meaning and intent of the generic portions of the following discussion.

FIG. 4 shows an encoder readhead configuration 400. This embodiment is a practical configuration that is substantially insensitive to various misalignments and dynamic misalignments, yet offers substantial flexibility to locating and fabricating and assembling various optical components in a compact and economical way in an encoder readhead. The encoder readhead includes a split light beam input portion 410, light beam directing elements 420 and 421, retroreflectors 440 and 441, a shared zone 450 and an optical detector 460 having one or more power and/or signal connections 461. The configuration also includes a scale grating 430, a first zone 431 on the grating scale, and a second zone 432 on the grating scale.

In the exemplary embodiment shown in FIG. 4, the split light beam input portion 410 includes a light source 412 and a beam splitting element 415. The light source 412 emits coherent radiation and in various exemplary embodiments, the light source 412 includes a collimating element and emits collimated light. In various exemplary embodiments according to this invention, the light source 412 may be a fiber optic element which conveys light from a remote light source, or a light emitting diode or a laser diode included in the encoder readhead. In various exemplary embodiments, a laser diode is used due to the longer coherence length of the emitted light. In various other exemplary embodiments, a vertical cavity surface emitting laser diode is used due to the greater temperature stability of the emitted wavelength. The beam splitting element 415 receives a light beam 401 from the light source 412 and produces two split light beams 401a and 401b along respective light paths according to known optical principles and inputs the beams to the remainder of the encoder readhead configuration 400.

It should be appreciated that in the exemplary embodiment shown in FIG. 4, the beam splitting element 415 is conceptually illustrated as a readhead grating having a first portion impinged upon by the light beam 401. However, in this and various other exemplary embodiments herein, the beam splitting element 415 impinged upon by the light beam 401 is more generally intended to represent any now known or later developed light beam splitting element or combination of elements, such as a suitably arranged "half-silvered" beamsplitter or a polarizing beamsplitter or portions thereof, or portions of a grating or multiple gratings or the like, including any of the configurations discussed below and shown in 10A–10E or 11A–11D, which is operable to produce split light beams according to the principles of this invention.

Furthermore, it should be appreciated that in various exemplary embodiments, according to known optical miniaturization and assembly techniques the split light beam input portion 410 may incorporate a light source, collimation, beam splitting, and polarizing functions, into a single integrated optical element or assembly, such that the light source 412 and the beam splitting element 415 are difficult or impossible to distinguish as separate elements.

The split light beams 401a and 401b are directed along respective light paths by the light beam directing elements 420 and 421 such that the split light beams 401a and 401b converge proximate to the first zone 431 on the grating scale. In the embodiment shown in FIG. 4, and various other embodiments shown herein, the light beam directing elements 420 and 421 are each represented as exemplary plane mirrors that reflect the split light beams 401a and 401b, respectively, once from a first portion of each plane mirror. However, more generally, each of the light beam directing elements 420 and 421 impinged upon by the split light beams 401a and 401b may be any now known or later developed light beam directing element or combination of elements, such as suitably arranged mirrors and/or portions of a grating or multiple gratings or the like, that are operable through one or more reflections or deflections to direct the light beams 401a and 401b along respective light paths to converge proximate to the first zone 431.

The first zone 431 is a nominal zone on the nominal plane of the scale grating 430 that has a dimension along the measuring axis direction 101 that bounds the light spots where the light beams 401a and 401b impinge on a nominally aligned scale grating 430. Generally, the ability of various encoder reader configurations according to this invention to minimize errors related to pitch misalignment and dynamic pitch misalignment is improved as the dimension of the first zone along the measuring axis direction 101 is reduced. Therefore, the dimension of the first zone along the measuring axis direction 101 generally provides the proper balance between reducing errors related to pitch misalignment and dynamic pitch misalignment and achieving the other design objectives of a particular embodiment according to this invention. In various exemplary embodiments, the dimension of the first zone along the measuring axis direction 101 is longer, to provide clearance between various diffracted and reflected light beams and various elements of the encoder readhead, as discussed below with reference to FIGS. 22A–22C, for example. In various other exemplary embodiments, the dimension of the first zone along the measuring axis direction 101 is equal to or less than 4 times the nominal spot length along the measuring axis direction 101. Exemplary nominal spot lengths are discussed below with reference to FIG. 14. It should be appreciated that the sensitivity to static and dynamic pitch misalignments is primarily related to the distance between the spots in the first zone 431. Thus it should be appreciated that due to design choices or various misalignments the light beams 401a and 401b may actually diverge for a small distance before impinging on the scale grating 430 and after converging proximate to the first zone, provided that the light beams 401a and 401b nevertheless impinge on a nominally aligned scale grating 430 in a first zone 431 according to the principles of this invention.

The split light beams 401a and 401b enter the first zone 431, giving rise to respective diffracted light beams 402a and 402b, respectively, which are respective diffraction orders diffracted along respective light paths which diverge proximate to the first zone 431. The retroreflectors 440 and 441 receive the diffracted light beams 402a and 402b, respectively, along their respective light paths. It should be appreciated that if the light beams 401a and 401b actually diverge for a small distance before impinging on the scale grating 430 and after converging proximate to the first zone, then in a complementary way the diffracted light beams 402a and 402b beams may actually converge for a small distance after leaving the scale grating 430 and before diverging proximate to the first zone, provided that the diffracted light beams 402a and 402b beams nevertheless diverge proximate to the first zone along respective optical paths to be received by the retroreflectors 440 and 441 according to the principles of this invention.

The retroreflectors 440 and 441 receive the diffracted light beams 402*a* and 402*b*, respectively, along their respective light paths and reflect them as light beams 402*ar* and 402*br*, respectively. Thus the light paths of the light beams 402*ar* and 402*br* are parallel to the light paths of the diffracted light beams 402*a* and 402*b* according to the principles of this invention. As a result, according to the principles of this invention, the exemplary encoder readhead configuration 400 is substantially insensitive to errors related to yaw misalignment and dynamic yaw misalignment. The retroreflectors 440 and 441 shown in FIG. 4 are represented by exemplary corner-cube type retroreflectors. However, a catseye type retroreflector or any other now known or later developed type of retroreflector may be used, provided that it is operable according to the principles of this invention.

In various exemplary embodiments, depending on the location of the retroreflectors 440 and 441 relative to the diffracted light beams 402*a* and 402*b*, respectively, the light paths of the light beams 402*ar* and 402*br* may be offset, that is, separated from the diffracted light beams 402*a* and 402*b* in a direction transverse to the measuring axis direction 101 as shown in FIG. 4, or along the measuring axis direction 101, or both. Such an offset prevents light from reentering the light source and causing light source instability in various embodiments according to this invention, and also helps to eliminate "cross-over beams" in various other embodiments according to this invention. Thus these problems present in the prior art configurations previously described with reference to FIGS. 1 and 2 may be avoided in the exemplary encoder readhead configuration 400, and in various other embodiments according to this invention which include such a beam separation offset due to the placement of retroreflectors 440 and 441 relative to the diffracted light beams 402*a* and 402*b*, respectively. It should be appreciated that such embodiments according to this invention need not include polarizers, thus avoiding unwanted encoder readhead fabrication and/or assembly constraints in some situations. However, it should be further appreciated that polarizers may be optionally included in such embodiments, as desired for compatibility with a particular optical detector 460 in a particular embodiment, for example.

In any case, the light beams 402*ar* and 402*br* are retroreflected along light paths parallel to the light paths of the diffracted light beams 402*a* and 402*b*, thus converging proximate to the second zone 432 in a manner similar to the convergence of the light beams 401*a* and 401*b* proximate to the first zone 431.

The second zone 432, similar to the first zone 431, is a nominal zone on the nominal plane of the scale grating 430 that has a dimension along the measuring axis direction 101 that bounds the light spots where the light beams 402*ar* and 402*br* impinge on a nominally aligned scale grating 430. The design considerations related to the second zone 432 and the ability of various encoder reader configurations according to this invention to minimize errors related to pitch misalignment and dynamic pitch misalignment are the same as those previously described with reference to the first zone 431. The dimension of the second zone 432 along the measuring axis direction 101 is determined similarly to the dimension of the first zone 431. As previously discussed, in various exemplary embodiments, depending on the location of the retroreflectors 440 and 441 relative to the diffracted light beams 402*a* and 402*b*, respectively, the light paths of the light beams 402*ar* and 402*br* may be offset, that is, separated from the diffracted light beams 402*a* and 402*b* in a direction transverse to the measuring axis direction 101 as shown in FIG. 4. In such a case the second zone is dimensioned similarly to the first zone 431, and is offset from the first zone 431 in a direction transverse to the measuring axis direction 101 as shown in FIG. 4, corresponding to the offset of the light paths of the light beams 402*ar* and 402*br*. More generally, in various exemplary embodiments the second zone 432 is nominally offset from the first zone 431 in the same direction as any offset of the light paths of the light beams 402*ar* and 402*br* relative to the diffracted light beams 402*a* and 402*b*. Furthermore, in various embodiments according to this invention the light paths of the light beams 402*ar* and 402*br* may fully or partially overlap the light paths of the diffracted light beams 402*a* and 402*b*, and in such cases the second zone 432 similarly may fully or partially overlap the first zone 431.

The retroreflected light beams 402*ar* and 402*br* enter the second zone 432, giving rise to respective later-diffracted light beams 403*a* and 403*b*, respectively, which are respective diffraction orders diffracted along respective light paths which diverge proximate to the second zone 432 in a manner similar to the divergence of the light beams 402*a* and 402*b* proximate to the first zone 431. The later-diffracted light beams 403*a* and 403*b* are then directed by the light beam directing elements 420 and 421 such that the light beams later-diffracted light beams 403*a* and 403*b* converge proximate to the beam splitting element 415.

It should be appreciated that in the embodiment shown in FIG. 4, and various other embodiments shown herein, the light beam directing elements 420 and 421 are represented as exemplary plane mirrors and the later-diffracted light beams 403*a* and 403*b* each impinge upon and are reflected once from a second portion of the same plane mirrors having a first portion impinged upon by the split light beams 401*a* and 401*b*, respectively. However, as previously discussed, in various embodiments according to this invention the light paths of the light beams 402*ar* and 402*br* may fully or partially overlap the light paths of the diffracted light beams 402*a* and 402*b*, and in such cases the light paths of the later-diffracted light beams 403*a* and 403*b* may fully or partially overlap the light paths of the split light beams 401*a* and 401*b*, respectively. In such cases, previously discussed second portions and first portions of each plane mirror may similarly fully or partially overlap. More generally, each of the light beam directing elements 420 and 421 impinged upon by the later-diffracted light beams 403*a* and 403*b* may be any now known or later developed light beam directing element or combination of elements, such as suitably arranged mirrors and/or portions of a grating or multiple gratings or the like, that are operable through one or more reflections or deflections to direct the later-diffracted light beams 403*a* and 403*b* to converge proximate to the beam splitting element 415.

The beam splitting element 415 receives the later-diffracted light beams 403*a* and 403*b* and reflects or deflects at least one of the beams according to known optical principles to bring the later-diffracted light beams 403*a* and 403*b* into alignment or near alignment in the shared zone 450, as shown in FIG. 4. The aligned or nearly aligned later-diffracted light beams 403*a* and 403*b* then enter a suitably-chosen optical detector 460.

As illustrated in FIG. 4, and various other figures shown herein, the beam splitting element 415 is conceptually represented as a readhead grating element and the later-diffracted light beams 403*a* and 403*b* each impinge upon a second portion of the same readhead grating element which has a first portion impinged upon by the light beam 401. Furthermore, in the illustration in FIG. 4, the later-diffracted light beams 403a and 403b beams are shown partially aligned in the shared zone 450. The structure and operation of exemplary readhead grating elements, which are consistent with this illustration, are discussed below with reference to FIG. 10B or 10C. However, in this and various other exemplary embodiments herein, the beam splitting element 415 impinged upon by the later-diffracted light beams 403a and 403b is more generally intended to represent any now known or later developed light beam splitting element or combination of elements, such as a suitably arranged "half-silvered" beamsplitter or a polarizing beamsplitter or portions thereof, or portions of a grating or multiple gratings or the like, including any of the configurations discussed below and shown in 10A–10E or 11A–11D, which is operable to produce split light beams according to the principles of this invention.

Various alternative ways of bringing the later-diffracted light beams 403a and 403b into alignment or near alignment in the shared zone 450, as well as the operation of respective suitably-chosen optical detectors, will be apparent to one skilled in the art. Applicable descriptions of various beam alignment and detection techniques are also included in the discussion of FIGS. 1 and 2 above and in the incorporated '895, '085 and '833 patents, as well as in related discussion further below. It should be appreciated that the aligned or partially aligned beams in the shared zone 450 will give rise to an illumination characteristic in the shared zone which varies periodically in correspondence with the relative displacement between the encoder readhead and the scale grating 430. Because each of the aligned or partially aligned beams in the shared zone 450 have been twice diffracted by the scale 430, once before entering the reflecting elements 440 or 441 and once after, when the grating scale 430 moves by one pitch increment the illumination characteristic in the shared zone will undergo 4 periodic cycles.

In various embodiments according to this invention, certain portions of the light from the later-diffracted light beams 403a and 403b may be lost due to the operation of the beam splitting element 415. Such lost light is symbolically indicated by the lost light 499 shown in FIG. 4. However, other than possible disturbance of the stability of the light source 412 as discussed herein, such lost light is not significant to the operation of this invention. As previously discussed, in general, lost light is not discussed herein, unless it is relevant to light source disturbance or cross-over light in a particular embodiment.

In the embodiment shown in FIG. 4, and various other embodiments shown herein, the exemplary beam paths associated with the beams 401a, 401b, 403a and 403b are inclined in a respective first direction away from a plane aligned parallel to the measuring axis direction 101 and normal to the nominal plane of the scale grating 430. The exemplary beam paths associated with the beams 402a, 402b, 402ar and 402br are inclined in an opposite direction away from the plane aligned parallel to the measuring axis direction 101 and normal to the nominal plane of the scale grating 430. However, it should be appreciated that in various other embodiments according to the principles of this invention, these inclinations can be greater or lesser than indicated in the various exemplary embodiments shown herein and still prevent undesirable mixing or cross-over of various light beams, while at the same time facilitating compact design and packaging of the device.

FIG. 5A is a three-dimensional conceptual view of an optical displacement sensing device configuration in accordance with a second exemplary embodiment of the invention. FIGS. 5B, 5C and 5D are, respectively, a side view, a top view and an end view of the optical displacement sensing device shown in FIG. 5A. In FIGS. 5A–5D, evidently corresponding elements and/or elements having similar reference numbers are arranged and operate as previously described with reference to FIG. 4 unless otherwise indicated. The generic discussions with reference to FIG. 4 apply in a corresponding manner to FIGS. 5A–5D, unless otherwise indicated. Furthermore, in FIGS. 5A–5D the reference numbers of several elements evidently corresponding to previously discussed generic or specific elements are omitted, since their arrangement and operation have already been made evident and are not further described with reference to FIGS. 5A–5D. Conversely, in FIGS. 5A–5D the reference numbers of elements are generally repeated or added if there is a related description or if the FIGS. 5A–5D serve to further clarify such elements.

The embodiment shown in FIGS. 5A–5D is a practical configuration that is substantially insensitive to various misalignments and dynamic misalignments, yet offers substantial flexibility to locating and fabricating and assembling various optical components in a compact and economical way in an encoder readhead. FIG. 5A emphasizes the split light beam input portion 410 including a laser diode light source 412A and a beamsplitter 415X, the scale grating 430 having a grating pitch P, the shared zone 450, and an optical detector assembly 460A (shown symbolically) having one or more power and signal connections 461. In various exemplary embodiments herein the grating pitch P is chosen to be 0.4 $\mu$m. However, in various other exemplary embodiments the pitch P may be chosen in a range from less than 0.4 $\mu$m up to many microns.

The laser diode light source 412A receives power, emits coherent radiation, and in various exemplary embodiments includes an integrated collimating element and emits collimated light. In various exemplary embodiments the laser diode light source 412A is chosen to emit light having a wavelength of approximately 635 nm and in various other embodiments to emit light having a wavelength of 405 nm, but any convenient wavelength may be used. In various exemplary embodiments, a vertical cavity surface emitting laser diode is used for the laser diode light source 412A. The beamsplitter element 415X receives the light beam 401 from the laser diode light source 412A and produces two split light beams 401a and 401b according to known optical principles.

It should be appreciated that in the embodiment shown in FIGS. 5A–5D, and in various other embodiments shown herein, the exemplary beamsplitter 415X is a beamsplitter such as one of the beamsplitters described below with reference to FIG. 11C or 11D having a first portion impinged upon by the light beam 401, or any now known or later developed polarizing beamsplitter which provides similar functions. However, in various other exemplary embodiments, the beamsplitter 415X impinged upon by the light beam 401 may be any now known or later developed beamsplitter element or combination of elements, such as a suitably arranged "half-silvered" beamsplitter or a polarizing beamsplitter or portions thereof, or the like, including any of the configurations discussed below and shown in FIGS. 11A–11D, which is operable to produce split light beams according to the principles of this invention, and which is also usable in conjunction with the particular optical detector type chosen for a particular embodiment.

The beamsplitter element 415X inputs the two split light beams 401a and 401b to the remainder of the encoder readhead 500, as previously described. FIGS. 5B–5D further clarify one exemplary path configuration for the previously described series of light beams 401, 401a, 401b, 402a, 402b, 402ar, 402br, 403a, and 403b.

As best shown in FIG. 5B, the later-diffracted light beams 403a and 403b converge proximate to the beamsplitter 415X. The beamsplitter 415X receives the later-diffracted light beams 403a and 403b, and reflects and transmits them, respectively, into alignment in the shared zone 450. The beamsplitter 415X further operates such that the reflected and transmitted light beams aligned in the shared zone are orthogonally polarized relative to each other. The aligned orthogonally polarized beams then enter the optical detector assembly 460A.

It should be appreciated that in the embodiment shown in FIGS. 5A–5D, and in various other embodiments shown herein, the later-diffracted light beams 403a and 403b each impinge upon a second portion of the same exemplary beamsplitter 415X which has a first portion impinged upon by the light beam 401. However, in various other exemplary embodiments, the beamsplitter/combiner impinged upon by the later-diffracted light beams 403a and 403b may be any now known or later developed light beam splitting/combining element or combination of elements, such as a suitably arranged "half-silvered" beamsplitter or a polarizing beamsplitter or portions thereof, or the like, including any of the configurations discussed below and shown in FIGS. 11A–11D, which is operable in conjunction with the particular type of optical detector selected for a particular embodiment.

The aligned orthogonally polarized beams then enter the optical detector assembly 460A, which in the embodiment shown in FIGS. 5A–5D is arranged and operates similarly to the optical detector 460P described below with reference to FIG. 21. The optical detector assembly 460A then outputs one or more signals on the one or more power and signal connections 461, the signals usable to determine the displacement of the scale grating 430 relative to the encoder readhead. More generally, the optical detector assembly 460A can be any now known or later developed optical detector which provides signals that are usable to determine the relative phase between the lights of the orthogonally polarized beams entering the optical detector. Various alternative detector schemes will be apparent to one skilled in the art. Instructive descriptions of detector schemes are also included in the discussion of FIGS. 1 and 2 above and in the incorporated '895, '085 and '833 patents.

As previously described, in various embodiments shown herein, the exemplary beam paths associated with the beams 401a, 401b, 403a and 403b are inclined in a respective first direction away from a plane aligned parallel to the measuring axis direction 101 and normal to the nominal plane of the scale grating 430, and the exemplary beam paths associated with the beams 402a, 402b, 402ar and 402br are inclined in an opposite direction away from the plane aligned parallel to the measuring axis direction 101 and normal to the nominal plane of the scale grating 430. For purposes of clarification, FIG. 5D shows an exemplary normal plane 475 aligned parallel to the measuring axis direction 101 and normal to the nominal plane of the scale grating 430, an exemplary inclination plane 474 inclined in a respective first direction away from the normal plane 475, and the inclination angle 473 between them. The inclination angle 473 is also referred to as the angle "delta" or "δ" herein. It should appreciated that the inclination angle 473 can be greater or lesser than indicated in the exemplary embodiment shown in FIG. 5D and still prevent undesirable mixing or cross-over of various light beams, while at the same time facilitating compact design and packaging of the device.

Also shown in FIG. 5D is a nominal beam splitting height dimension 471, corresponding to the height of the beam splitting portion of any beam splitting element, such as the beamsplitter 415X, above the nominal plane of the scale grating 430. Also shown in FIG. 5D is a nominal retroreflector height dimension 472, corresponding to the maximum height of any reflective surface of any retroreflector 440 or 441 above the nominal plane of the scale grating 430. It has been found that in embodiments according to this invention where the beam splitting element is a beamsplitter such as the beamsplitter 415X, or any of the beamsplitters shown in FIGS. 11A–11D, or the like, that the errors in such embodiments related to pitch misalignment and dynamic pitch misalignment and the like tend to be relatively reduced when the retroreflector height dimension 472 is made smaller. It has also been found that in embodiments according to this invention where the beam splitting element is a readhead grating such as the readhead gratings shown in FIGS. 10A–10E, or the like, that the errors in such embodiments related to pitch misalignment and dynamic pitch misalignment and the like tend to be relatively reduced as the beam splitting height dimension 471 is made smaller and/or as the retroreflector height dimension 472 approaches equality with the beam splitting height dimension 471.

It should be appreciated that the planes 474 and 475, the angle 473 and the heights 471 and 472 are intended to be generically illustrative of similarly numbered or evidently analogous planes, angles and heights in various other embodiments, Thus their locations and values are not limited by the exemplary embodiment shown in FIG. 5D. More generally, it should be appreciated that any new generic discussions included in the preceding discussion of FIGS. 5A–5D are indicative of a number of configurations which vary in their combination of elements and dimensions from the specific elements and dimensions indicated in FIGS. 5A–5D. Thus FIGS. 5A–5D should not be interpreted as limiting with regard to the meaning and intent of the generic portions of the preceding discussion.

Figure 6:
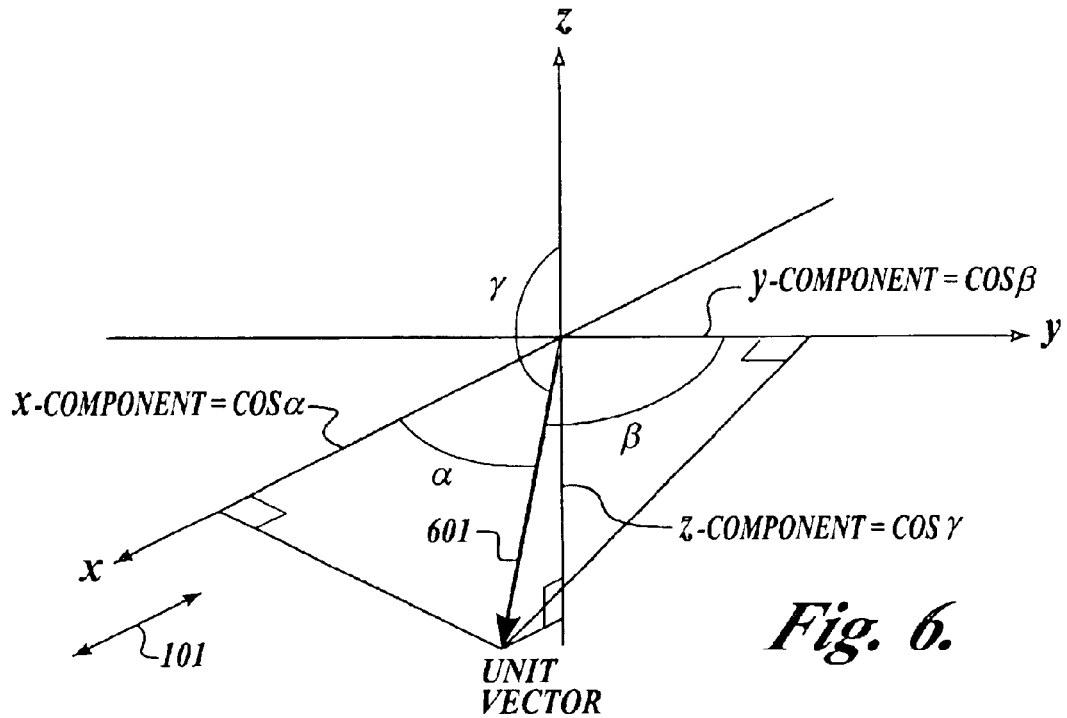
FIG. 6 is a three-dimensional schematic view clarifying the geometric components and symbols used for describing light path directions herein.

FIG. 6 is a three-dimensional schematic view clarifying conventional geometric components and symbols used for describing light path directions herein. FIG. 6 shows a set of orthogonal X, Y and Z axes. The X axis is aligned parallel to the measuring axis direction 101. The Z axis is aligned normal to the grating surface of a nominally aligned scale grating, and the Y axis is aligned orthogonal to the X and Z axes at the grating surface of a nominally aligned scale grating. Three angles are used to indicate the orthogonal components of unit vector 601, each of which are measured from a respective principal axis as shown in FIG. 6. The angle formed between the unit vector 601 and the x axis is $\alpha$, the angle formed between the unit vector 601 and the y axis is $\beta$, and the angle formed between the unit vector 601 and the z axis is $\gamma$. The respective x axis, y axis and z axis components of the unit vector 601 are Thus $\cos\alpha$, $\cos\beta$ and $\cos\gamma$, respectively, as shown in FIG. 6. This same terminology is useful for describing the orientation and relationship of various light beam paths in various exemplary embodiments according to this invention.

Figure 7:
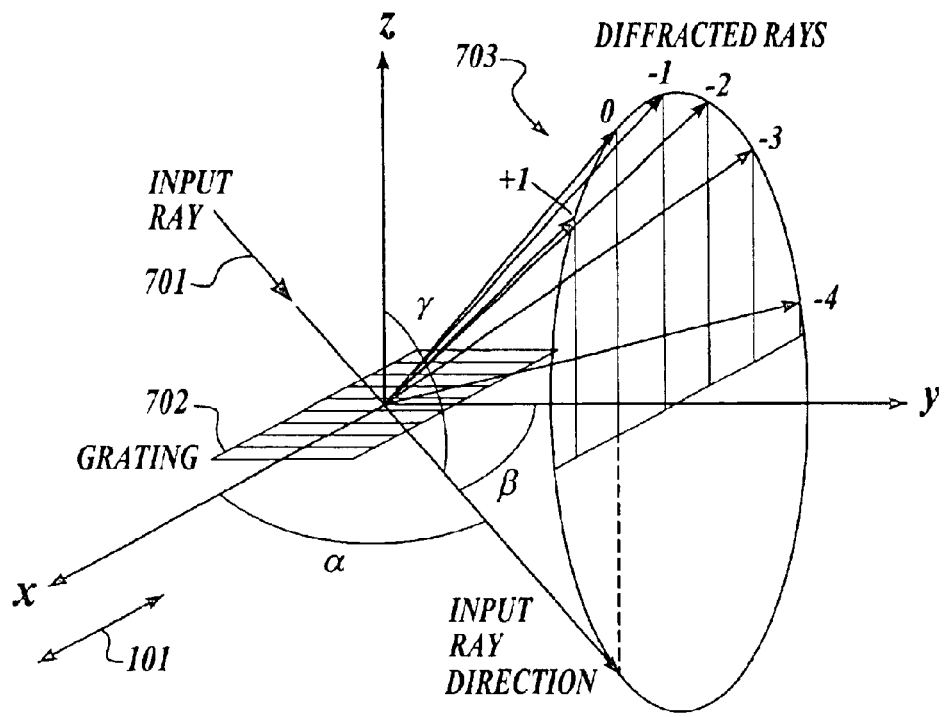
FIG. 7 is a three-dimensional schematic view showing a generic input light ray direction and the resulting conical distribution of diffracted light rays from a diffraction grating, using the geometric components and symbols shown in FIG. 6.

FIG. 7 is a three-dimensional schematic view showing a generic input light ray direction and the resulting conical distribution of diffracted light rays from a grating analogous to the scale grating 430 described herein, using the terminology of FIG. 6. In FIG. 7 an input light ray 701 impinges on grating 702 with input angles ($\alpha$, $\beta$, $\gamma$) and various diffracted output beams each having a respective set of output angles ($\alpha_1$, $\beta_1$, $\gamma_1$) result. The various diffracted output beams, shown as arrows in FIG. 7, together define a cone 703. The relationship between the input angles for a beam incident on the grating 702, and the output angles for the nth diffraction order are as follows:

$$\begin{cases} \cos\alpha_1 = \cos\alpha + n\dfrac{\lambda}{d} & (1) \\ \cos\beta_1 = \cos\beta & (2) \\ \cos\gamma_1 = \pm\sqrt{1 - \cos^2\alpha_1 - \cos^2\beta_1} & (3) \end{cases}$$

where n is the diffraction order, $\lambda$ is the wavelength of the light, and d is the grating pitch. The grating pitch is also referred to as P herein. One skilled in the art will readily understand that these equations may be used to determine an operable arrangement of encoder readhead components for any embodiment of an encoder readhead configuration according to the principles of this invention, including configurations where the inclination angle 473, best shown in FIG. 5D, is not equal to zero.

FIG. 8 shows an error table 801, which lists as entries the error magnitudes associated with various dynamic misalignments and drifts for a prior art optical displacement sensing device configuration corresponding to FIG. 1. The individual dynamic misalignments and drifts listed across the tops of the columns occur in various combinations with the individual initial misalignments or deviations from nominal (also referred to as initial "static" misalignments or deviations, herein) listed down the left end of the rows. "Gap" refers to the separation between an encoder readhead and a scale grating surface along a direction normal to the nominal scale grating surface. A scale grating surface in its intended nominal design plane in an encoder readhead configuration according to the principles of this invention has a gap misalignment of zero.

For all entries in table 801, the nominal wavelength $\lambda$ is 0.635 $\mu$m, the nominal angle $\alpha$ is 38 degrees, the nominal angle $\beta$ is 80 degrees, and the grating period of the scale is 0.4 $\mu$m. Additionally, the results are for an encoder readhead configuration approximately as shown in FIG. 1, where the element corresponding to element 102 shown in FIG. 1 is a readhead grating positioned at a beam splitting height dimension of 10 mm relative the to the scale grating surface and having a grating pitch of 0.8 $\mu$m. Each entry in the table corresponds to the displacement measurement error, in nanometers, that arises when the individual initial installation misalignment listed at the left of the entry row is combined with the individual dynamic misalignments listed at the top of the entry column. Each dynamic misalignment represents a change in alignment that occurs between the time a reference position measurement is made, and the time the displacement measurement is made. Accordingly, each entry is the measurement error that is included in the apparent displacement indicated by the encoder readhead signals, between the reference position and the displacement position, due to the dynamic misalignment or deviation.

As a clarifying example, in table 801, given an installation pitch misalignment of 30 minutes, the error associated with either a dynamic roll, or yaw misalignment of 2 seconds is 0.0 nm. For the same installation pitch misalignment, a dynamic wavelength drift of 0.00025 $\mu$m produces an error of 1.0 nm magnitude and a dynamic gap change of 0.01 mm produces an error of 87.3 nm. It should be appreciated that this 87.3 nm error is the result of an "apparent" geometric translation of the encoder readhead relative to the scale grating along the measuring axis, and is thus an error that will appear for a wide variety of encoder readhead configurations, regardless of their design. More importantly, for purposes of comparison with various encoder readhead embodiments according to this invention, the significant aspect of table 801 is that a dynamic pitch of only 2 seconds of are in this prior art configuration produces 97.0 nm displacement measuring error for all initial alignment conditions. As previously discussed, dynamic pitch misalignment is one of the most prevalent and/or difficult to eliminate conditions in many practical encoder applications, and is thus of particular significance for encoder readhead design. As previously discussed, dynamic pitch errors are substantially reduced by the prior art configurations shown in FIGS. 2 and 3, but those configurations have the other limitations previously discussed.

FIG. 9 shows an error table 901, which lists as entries the error magnitudes associated with various dynamic misalignments and drifts for a optical displacement sensing device configuration according to this invention which corresponds to the basic configuration shown in FIGS. 5A–5D, and more closely to basic configuration described with reference to FIGS. 12A–12D below, having the beamsplitter 415X positioned at a beam splitting height dimension 471 of 10 mm and the retroreflectors 440 and 441 positioned at retroreflector height dimension 472 of 5 mm. For all entries in table 901, the nominal wavelength $\lambda$ is 0.635 $\mu$m, the nominal angle $\alpha$ is 38 degrees, the nominal angle $\beta$ is 80 degrees, and the grating period of the scale is 0.4 $\mu$m. The significant aspect of table 901 is that the underlying encoder readhead embodiment according to this invention virtually eliminates dynamic pitch error. It should be further appreciated that the underlying encoder readhead embodiment according to this invention achieves this performance while at the same time overcoming the various previously discussed limitations of the prior art configurations shown in FIGS. 2 and 3. It has been determined that various other encoder readhead embodiments according to this invention, including but not limited to those corresponding to FIGS. 4, 5A–5D, 12A–12D, 19, 20A–20C, 22A–22C, 23 and 24 and their discussed variations, also substantially reduce dynamic pitch errors while overcoming at least one of the previously discussed limitations of the prior art configurations shown in FIGS. 2 and 3.

The most significant errors shown in table 901 are for dynamic wavelength deviation and dynamic gap change. The errors associated with dynamic gap change have the same magnitude in table 901 and table 801, and have been previously discussed. The error associated with dynamic wavelength deviation may be overcome by using more stable light sources and/or improved temperature control in various exemplary embodiments. However, it has also been determined that various encoder readhead configurations according to the principles of this invention also influence the magnitude of the errors associated with dynamic wavelength deviation, which is therefore discussed further with reference to FIGS. 13–18 below.

FIGS. 10A–10E are three-dimensional views clarifying the operation of respective first through fifth readhead grating configurations usable in the beam splitting portion of various exemplary encoder readhead embodiments according to this invention. Each view shows hypothetical apertures on the surfaces of the readhead gratings. These apertures are not physical elements, but are illustrated only to clarify the paths of the light beams in the figures.

Figure 10A:
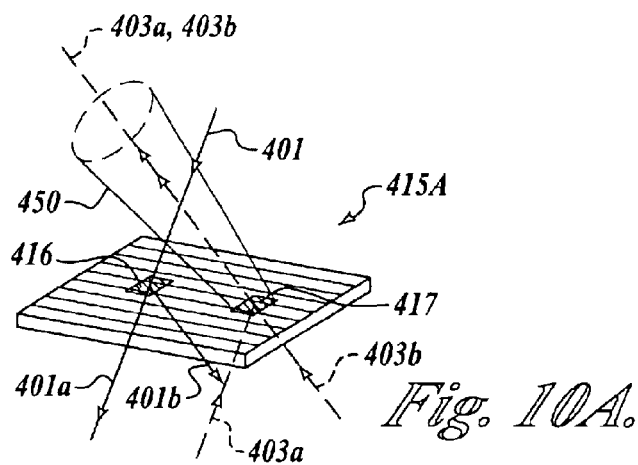
FIG. 10A is a three-dimensional view clarifying the operation of a first readhead grating configuration usable in various exemplary embodiments according to this invention.

FIG. 10A shows readhead grating element 415A having a configuration wherein the input beam 401 impinges on a first portion 416 having a first grating pitch to produce the split beams 401a and 401b by transmission of a zero order beam and by transmission of a first or higher order diffracted beam. The paths of the beams 401, 401a, 401b, 403a and 403b shown in FIGS. 10A–10E have been generally shown and described previously, with reference to FIGS. 4 and 5A–5D. The later-diffracted light beams 403a and 403b impinge on a second portion 417 having the first grating pitch, which transmits the beam 403b as a zero order beam and the beam 403a as a first or higher order diffracted beam, to bring the beams 403a and 403b into alignment in the shared zone 450, as shown. In various exemplary embodiments, the first readhead grating pitch is the same as the pitch of the scale grating used with that embodiment. The readhead grating element 415A may be used in encoder readhead embodiments which prevent "cross-over beams" as previously described, that is, where lights arising from the split beams 401a and 401b do not share a common path before reaching the shared zone 450. However, the resulting illumination characteristic in the shared zone may not, by itself, indicate the direction of the relative displacement and thus has limited application. This problem may be remedied by polarizing the encoder readhead beams in the manner describe below with reference to FIG. 10D or 10E, but inserting the polarizers into the beam path remotely from the readhead grating element, and using a polarization sensitive detector such as the optical detector described with reference to FIG. 21 below.

Figure 10B:
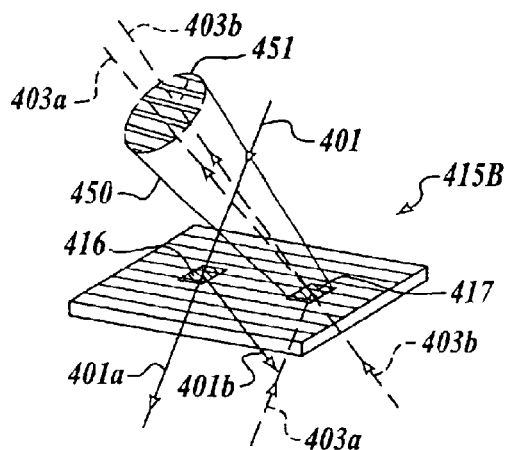
FIG. 10B is a three-dimensional view clarifying the operation of a second readhead grating configuration usable in various exemplary embodiments according to this invention.

FIG. 10B shows readhead grating element 415B having a configuration which operates identically to readhead grating element 415A, except that the second portion 417 has a second grating pitch varying from the first grating pitch of the first portion 416. Thus the beam 403a is diffracted as a first or higher order diffracted beam that is slightly out of alignment with the transmitted beam 403b in the shared zone 450, which gives rise to an interference pattern in the shared zone 450, represented conceptually by the interference pattern 451. The interference pattern 451 translates spatially in correspondence to the scale grating displacement. The translation of the interference pattern 451 can be quantitatively detected by various optical detector array techniques known in the art and/or currently commercially available, including the use of quadrature arrays which directly produce quadrature signals, or arrays which allow the interference pattern translation to be imaged and digitally analyzed at a higher resolution.

Figure 10C:
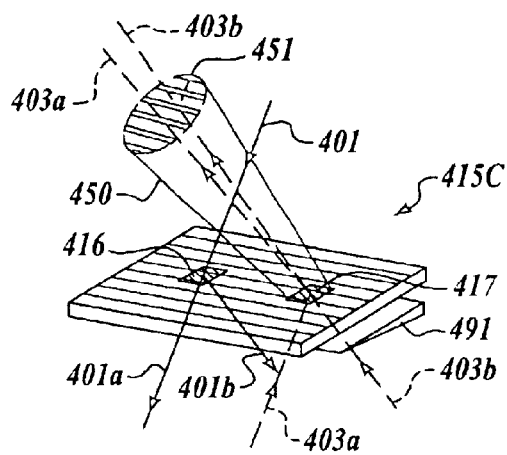
FIG. 10C is a three-dimensional view clarifying the operation of a third readhead grating configuration usable in various exemplary embodiments according to this invention.

FIG. 10C shows readhead grating element 415C having a configuration, which produces the same result as readhead grating element 415B. In the readhead grating element 415C, the first portion 416 and the second portion 417 have the same grating pitch, but an optical wedge element 491 is added. Thus the beam 403b is transmitted as zero order beam that is slightly out of alignment with the diffracted order beam 403a in the shared zone 450, which gives rise to an interference pattern in the shared zone 450, represented conceptually by the interference pattern 451.

The readhead grating elements 415B or 415C have configurations that may be used in any encoder readhead embodiments which prevent "cross-over beams" as previously described, that is, where lights arising from the split beams 401a and 401b do not share a common path before reaching the shared zone 450.

Figure 10D:
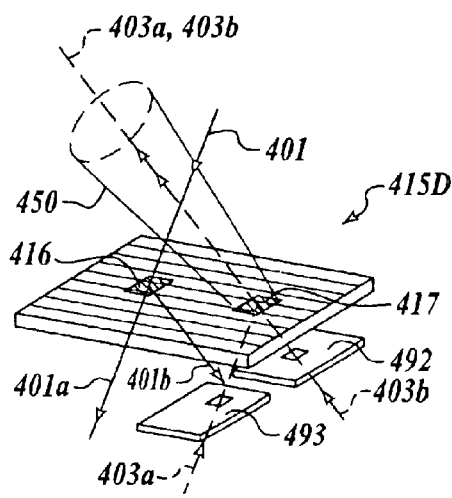
FIG. 10D is a three-dimensional view clarifying the operation of a fourth readhead grating configuration usable in various exemplary embodiments according to this invention.

FIG. 10D shows a readhead grating element 415D having a configuration which produces the same result as readhead grating element 415A, except the beams aligned in the shared zone are, in addition, mutually orthogonally polarized. In the readhead grating element 415D, the first portion 416 and the second portion 417 have the same grating pitch, but a first polarizer 492 and a second polarizer 493 are arranged to ensure that the beams 403a and 403b are mutually orthogonally polarized before entering the shared zone 450. The readhead grating element 415A may be used in any encoder readhead embodiments which prevent "cross-over beams" as previously described, that is, where lights arising from the split beams 401a and 401b do not share a common path before reaching the polarizers 493 and 492, respectively. The illumination characteristic in the shared zone 450 may be sensed using a polarization sensitive detector such as the optical detector described with reference to FIG. 21 below.

Figure 10E:
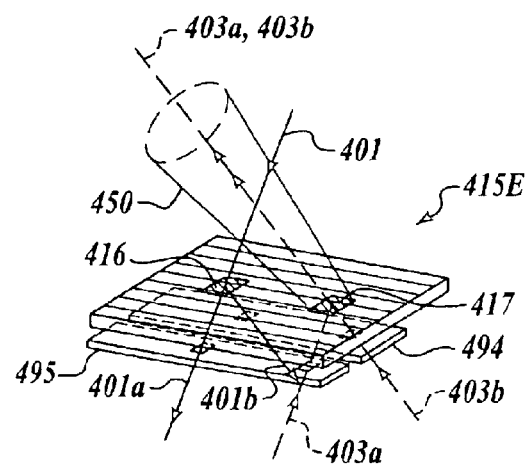
FIG. 10E is a three-dimensional view clarifying the operation of a fifth readhead grating configuration usable in various exemplary embodiments according to this invention.

FIG. 10E shows a readhead grating element 415E having a configuration which produces the same result as readhead grating element 415A, except the split beams 401a and 401b are, in addition, mutually orthogonally polarized. In the readhead grating element 415E, the first portion 416 and the second portion 417 have the same grating pitch. A first polarizer 494 and a second polarizer 495 are arranged to ensure that the beams 401a and 401b are mutually orthogonally polarized before any of the resulting beams "cross-over" or share a common beam path. Furthermore, after any beams "cross-over" or share a common beam path in the encoder readhead, the first polarizer 494 and the second polarizer 495 are also arranged to filter the beams 403a and 403b such that they are mutually orthogonally polarized in the same orientation as the beams 401a and 401b, respectively. Because of the initial polarization of the split beams 401a and 401b, any cross-over beams and/or beams sharing common beam paths can be removed by this final filtering of the beams 403a and 403b. Thus the configuration of readhead grating element 415E may be used in any encoder readhead embodiments according to this invention, including configurations which do not include the beam offsets, as previously described, and/or which do not include an appreciable inclination angle, as previously described. The illumination characteristic in the shared zone 450 may be sensed using a polarization sensitive detector such as the optical detector described with reference to FIG. 21 below.

FIGS. 11A–11D are three-dimensional views clarifying the operation of respective first through fourth beamsplitter configurations usable in the beam splitting portion of various exemplary encoder readhead embodiments according to this invention. Each view shows hypothetical apertures on the surfaces of the beamsplitters. These apertures are not physical elements, but are illustrated only to clarify the paths of the light beams in the figures. The beamsplitter configurations shown in FIGS. 11A–11D are described by analogy with corresponding readhead grating configurations shown in the FIGS. 10A and 10C–10E. However, in each FIGS. 11A–11D, at the first portion 416 and the second portion 417, the beams 401b and 403a, respectively, are reflected at a partially reflective beamsplitter interface 418 arranged vertically, rather than diffracted at a horizontal grating surface as in the FIGS. 10A and 10C–10E. Each beamsplitter configuration has the same result in the shared zone 450 as the indicated analogous readhead grating configuration, and may be similarly used with similar encoder readhead embodiments according to this invention. Their operation will be apparent to one skilled in the art.

Figure 11A:
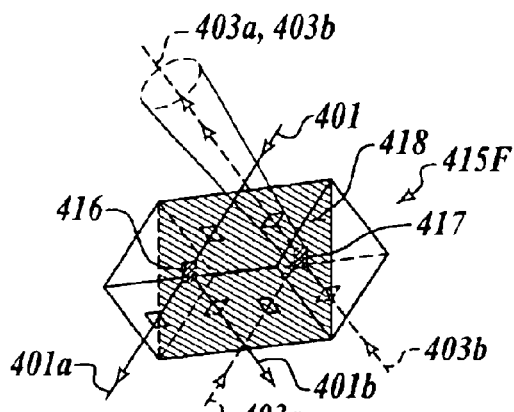
FIG. 11A is a three-dimensional view clarifying the operation of a first beamsplitter configuration usable in various exemplary embodiments according to this invention.
Figure 11B:
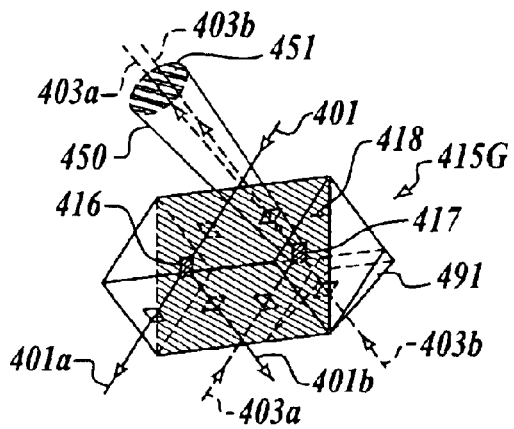
FIG. 11B is a three-dimensional view clarifying the operation of a second beamsplitter configuration usable in various exemplary embodiments according to this invention.
Figure 11C:
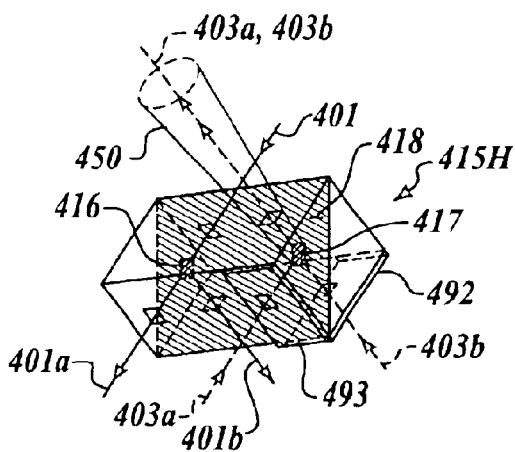
FIG. 11C is a three-dimensional view clarifying the operation of a third beamsplitter configuration usable in various exemplary embodiments according to this invention.
Figure 11D:
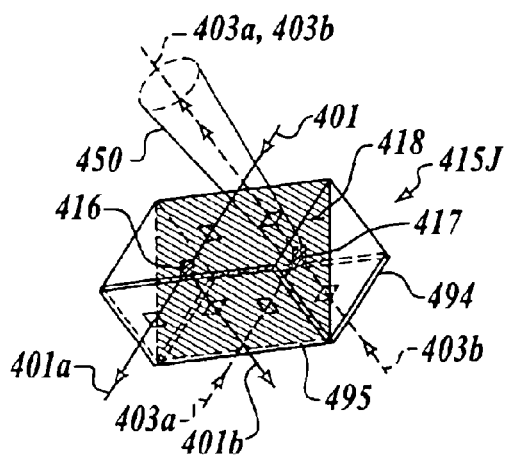
FIG. 11D is a three-dimensional view clarifying the operation of a fourth beamsplitter configuration usable in various exemplary embodiments according to this invention.

FIG. 11A shows beamsplitter element 415F, which has a configuration analogous to the configuration of readhead grating element 415A shown in FIG. 10A. FIG. 11B shows beamsplitter element 415G which has an optical wedge element 491 added in a configuration analogous to the configuration of readhead grating element 415C shown in FIG. 10C. FIG. 11C shows beamsplitter element 415H, which has a first polarizer 492 and a second polarizer 493 arranged to ensure that the beams 403a and 403b are mutually orthogonally polarized before entering the shared zone 450 in a configuration analogous to the configuration of readhead grating element 415D shown in FIG. 10D. FIG. 11D shows a beamsplitter element 415J, which has a first polarizer 494 and a second polarizer 495 arranged in a configuration analogous to the configuration of readhead grating element 415E shown in FIG. 10D to ensure that the beams 401a and 401b are mutually orthogonally polarized before any of the resulting beams "cross-over" or share a common beam path, and that after any beams "cross-over" or share a common beam path in the encoder readhead, the first polarizer 494 and the second polarizer 495 filter the beams 403a and 403b such that they are mutually orthogonally polarized in the same orientation as the beams 401a and 401b, respectively.

It should be appreciated for all of the readhead grating configurations shown in FIGS. 10A–10E and 11A–11D, the operable portions of each element are the portions struck by the light beams. Thus in various exemplary embodiments, these portions may be more separated, less separated, provided as integrated assemblies or as separate elements, or the like, so long as they are positioned with respect to operable encoder readhead beam paths in accordance with the principles of this invention.

Figure 12A:
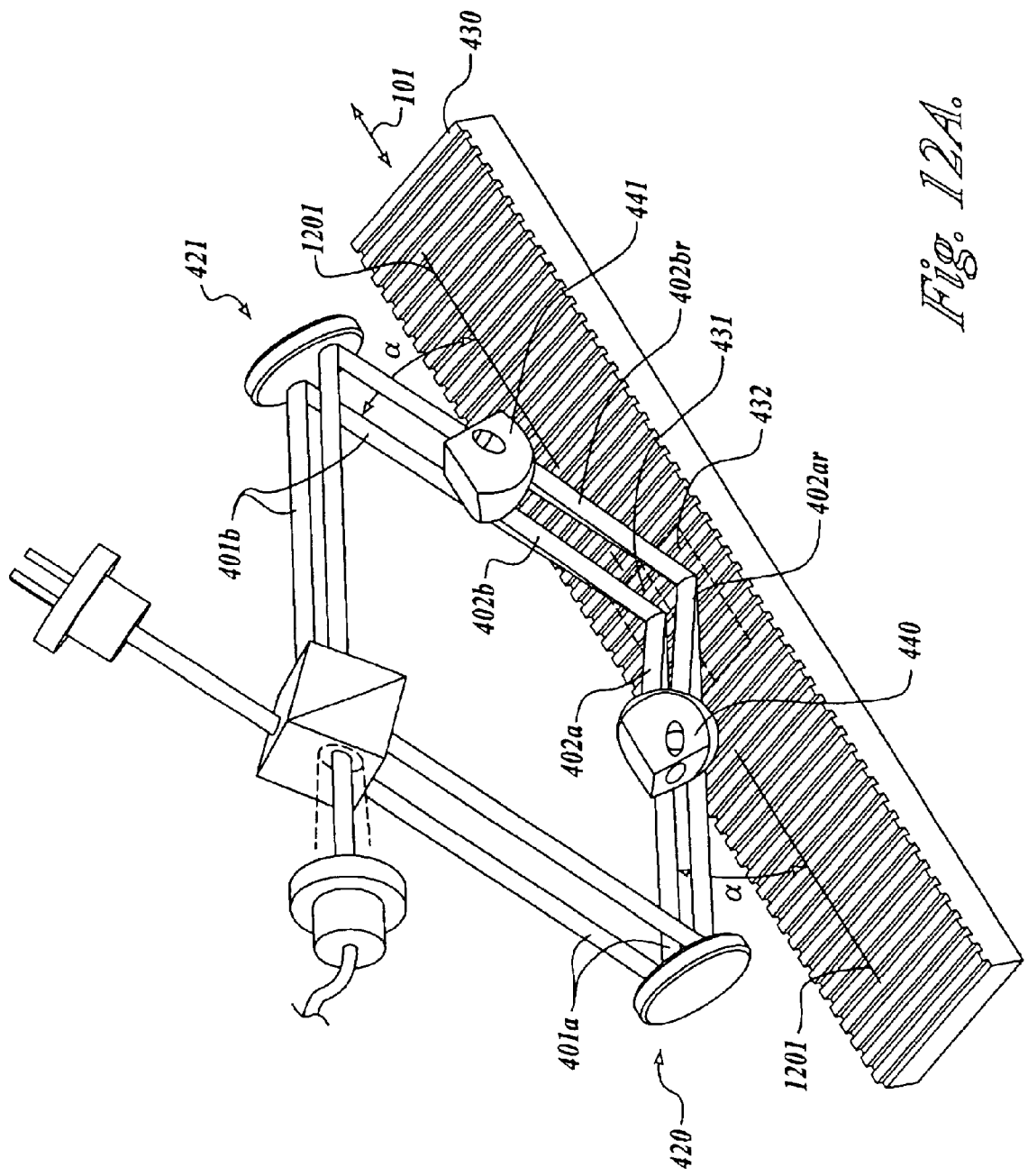
FIG. 12A is a three-dimensional conceptual view of an optical displacement sensing device in accordance with a third exemplary embodiment of the invention.

FIG. 12A is a three-dimensional conceptual view of an optical displacement sensing device in accordance with a third exemplary embodiment of the invention. FIGS. 12B, 12C, and 12D are, respectively, a side view, a top view, and an end view of the optical displacement sensing device in shown in FIG. 12A. The embodiment shown in FIGS. 12A–12D is analogous to the embodiment shown in FIGS. 5A–5D, except for the location of the retroreflectors 440 and 441. The generic discussions with reference to FIGS. 5A–5D apply in a corresponding manner to FIGS. 12A–12D, unless otherwise indicated. Thus in FIGS. 12A–12D the reference numbers of several elements evidently corresponding to previously discussed generic or specific elements are omitted, since their arrangement and operation have already been made evident. Conversely, in FIGS. 12A–12D the reference numbers of elements are generally repeated or added if there is a related description or if the FIGS. 12A–12D serve to further clarify such elements.

The embodiment shown in FIGS. 12A–12D is a practical configuration that is substantially insensitive to various misalignments and dynamic misalignments, yet exhibits substantial flexibility for fabricating, locating and assembling various optical components in a compact and economical way in an encoder readhead. FIG. 12A emphasizes the angle α formed between the split light beams 401a and 401b that impinge on the scale grating 430 in the first zone 431 and a hypothetical line 1201 which extends parallel to the measuring axis direction 101 through the respective points of impingement of the light beams 401a and 401b. The angle α shown in FIG. 12A corresponds to the angle α defined with reference for FIG. 6. Thus the angle α lies in the plane 474, best seen in FIG. 12D. Various errors related to dynamic misalignment or drift are discussed further below in relation to various design values for the angle α.

FIGS. 12A–12D also emphasize a configuration and/or height for the retroreflectors 440 and 441 that results in relatively short optical path lengths for the light beams 402a, 402ar, 402b and 402br, respectively. As previously discussed, it has been found that in embodiments according to this invention where the beam splitting element is a beamsplitter, such as any of the beamsplitters shown in FIGS. 11A–11D, or the like, the errors in such embodiments related to pitch misalignment and dynamic pitch misalignment and the like tend to be reduced as the retroreflector height dimension 472 is decreased. Furthermore, shorter optical path lengths tend to reduce the sensitivity of the encoder readhead to dynamic variations in the wavelength of the light source. It also generally permits the encoder readhead to be made more compact. The beam splitting height dimension 471 and retroreflector height dimension 472 for this exemplary configuration are best seen in FIGS. 12B and 12D.

FIG. 12B also shows portions of an exemplary readhead component housing 1225 and a gap dimension 1220 between the bottom of the readhead component housing 1225 and the surface of the scale grating 430. The portions of the readhead component housing 1225 are not shown in FIGS. 12A, 12C and 12D so that the optical paths may be seen more clearly. It should be appreciated that factors limiting how close the light beam directing elements 420 and 421, and the retroreflectors 440 and 441 can be placed to the scale, in order to shorten the related optical paths, are the desired operating gap dimension 1220 and practical wall thicknesses and mounting arrangements within the readhead component housing 1225. In various exemplary embodiments, to achieve short optical path lengths and a compact encoder readhead, the bottom edges of light beam directing elements 420 and 421, and/or the retroreflectors 440 and 441 are operatively positioned proximate to the bottom of the readhead component housing 1225 with due consideration to any design constraints imposed by optical path clearance considerations and the desired operating gap dimension 1220. Considering that a smaller gap dimension shortens various optical paths to reduce errors and a larger gap dimension simplifies installation, in various exemplary embodiments the desired gap dimension 1220 may be on the order of 1–2 mm, for example.

As shown in FIGS. 12A–12D, the light beam paths 402a, 402ar, 402b and 402br are offset from the light beam paths 401a, 403a, 401b and 403b, respectively, by both a vertical separation angle component 1221, best seen in FIG. 12B, and by the inclination angle 473, "delta," best seen in FIG. 12D. It should be appreciated that the vertical separation angle component 1221 and the inclination angle 473 may be chosen in combination to reduce the height and/or the width of the associated encoder readhead, as emphasized by the hypothetical dimension box 1230 shown in FIG. 6D. It can be seen that if the inclination angle 473 is decreased, to maintain light beam clearance between the light beam directing elements 420, 421 and the retroreflectors 440, 441 the height of the dimension box 630 must increase, corresponding to increased encoder readhead height. Similarly, if the vertical separation angle component 1221 is decreased, to maintain light beam clearance the width of the dimension box 630 must increase, corresponding to increased encoder readhead width. It should be appreciated that the planes 474 and 475, the angles 1221 and 473 and the heights 471 and 472 are intended to be generically illustrative of analogous planes, angles and heights in various other embodiments, Thus their locations and values are not limited by the exemplary embodiment shown in FIGS. 12A–12D, but are to be chosen to achieve the overall encoder readhead dimension desired in a particular application. Furthermore, FIGS. 12A–12D are indicative of a number of additional embodiments according to this invention, which vary in their combination of elements and dimensions from the specific elements and dimensions indicated. Thus FIGS. 12A–12D should not be interpreted as limiting with regard to the teachings discussed above.

FIGS. 13–18 show information useful for determining desirable design dimensions for the angle α, previously discussed with reference to FIGS. 6, 7 and 12A, and for the inclination angle "delta", previously discussed with reference to FIGS. 5D and 12D.

Figures 13, 14:
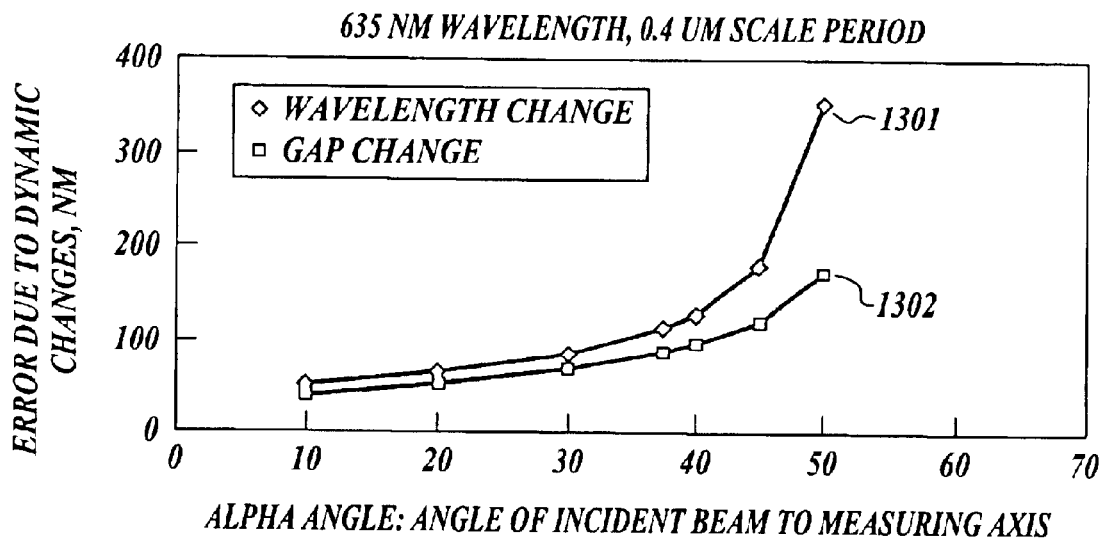
FIG. 13 is a graph showing error sensitivity data for dynamic gap misalignment and wavelength change at various incident beam angles in an optical displacement sensing device in accordance with this invention.
FIG. 14 is a table showing illumination spot length data and data indicative of readhead size, for various incident beam angles in an optical displacement sensing device in accordance with this invention.

FIG. 13 is a graph showing error sensitivity data for dynamic gap misalignment and wavelength change at various incident beam angles α in an optical displacement sensing device in accordance with this invention where the scale grating pitch is 0.4 μm, the light source has a nominal 635 nm wavelength, a beam splitter is positioned at a height 10 mm above the scale grating surface, the retroreflectors are positioned such that the path length from the scale to the corner of the retroreflectors is 10 mm, the angle α lies in a plane of incidence which is perpendicular to the scale grating grooves and to the scale (that is, the angle delta is 0°), and the static pitch misalignment is set at 0.5°. A curve 1301 shows the dynamic errors resulting at various values of the angle α when the light source wavelength dynamically changes by 0.25 nm. A curve 1302 shows the dynamic errors resulting at various values of the angle α when there is a dynamic gap change of 10 μm. As previously discussed with reference to FIG. 9, these tend to be the largest remaining dynamic errors in various exemplary embodiments according to this invention, therefore, it is especially useful to choose design values which further reduce these dynamic errors.

With the stated combination of wavelength and scale grating pitch, the associated encoder readhead is operable when a ranges from approximately 50 degrees to 10 degrees. However, as shown by the curves 1301 and 1302, for the stated combination of readhead parameters, the errors associated with dynamic wavelength change and gap change increase rapidly when a is greater than approximately 40 degrees. Therefore, in various exemplary embodiments according to this invention, the components of the encoder readhead are configured such that a is less than or equal to 40 degrees.

FIG. 14 shows additional design considerations for selecting a design value for the angle α. FIG. 14 assumes a beam having a nominal diameter of 1.0 mm and a wavelength of 635 nm is directed onto a scale grating having a grating pitch of 0.4 μm from a height 5.0 mm above the surface of the scale grating, at various values of the angle α. The second column of the table shown in FIG. 14 shows data comparing the resulting maximum beam cross section dimension at the retroreflectors versus the angle α shown in the first column. The third column of the table shown in FIG. 14 shows data comparing the distance between mirrors used as beam directing elements at the height 5.0 mm above the surface of the scale grating versus the angle α shown in the first column. The resulting maximum beam cross section dimension varies from 4.6 mm when the angle α is 10 degrees to 0.9 mm when the angle α is 40 degrees. The resulting distance between beam directing mirrors varies from 56.7 mm when in the angle α is 10 degrees to 11.9 mm when in the angle α is 40 degrees.

One design consideration in various exemplary embodiments according to this invention is that the spot on a retroreflector becomes elongated and overfills the aperture of the retroreflection element, thereby wasting light, and/or falling on imperfect edges of the retroreflector. Another design consideration is that the distance between beam directing mirrors may determine the overall length of the encoder readhead. A beam cross section of 4.6 mm requires relatively larger retroreflector elements, leading to a relatively larger encoder readhead. A distance between mirrors of 56.7 mm likewise leads to a relatively larger encoder readhead. Therefore, even though lesser angles α generally reduce the sensitivity to various dynamic errors as shown in FIG. 13, in various exemplary embodiments, the angle α is made greater than or equal to 20 degrees, to enable a smaller overall size for the encoder readhead.

Figure 15:
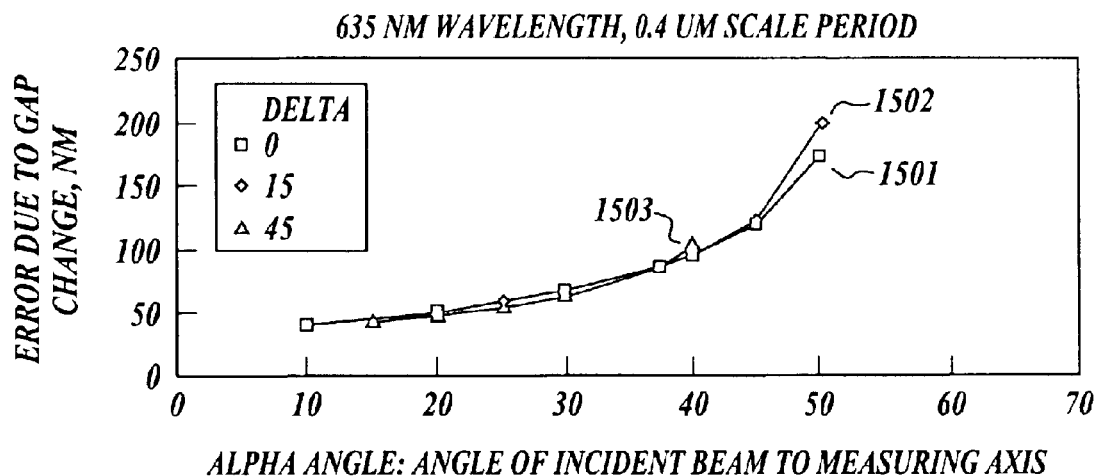
FIG. 15 is a graph showing error sensitivity data for dynamic gap misalignment at various incident beam angles and at various inclined plane angles, using a 635 nm wavelength in an optical displacement sensing device in accordance with this invention.

FIG. 15 is a graph showing error sensitivity data for dynamic gap misalignment at various incident beam angles α and at various inclination angles (delta), for the encoder parameters previously described with reference to FIG. 13, unless otherwise indicated. The dynamic gap change is 10 μm. The curves 1501–1503, corresponding to inclination angles of delta=0 degrees, delta=15 degrees and delta=45 degrees, respectively, are nearly indistinguishable. However, as best shown by the curves 1501 and 1502, for the stated combination of readhead parameters, the errors associated with dynamic gap change increase more rapidly when α is greater than approximately 40 degrees. Therefore, in various exemplary embodiments according to this invention, the components of the encoder readhead are configured such that α is less than or equal to 40 degrees.

Figure 16:
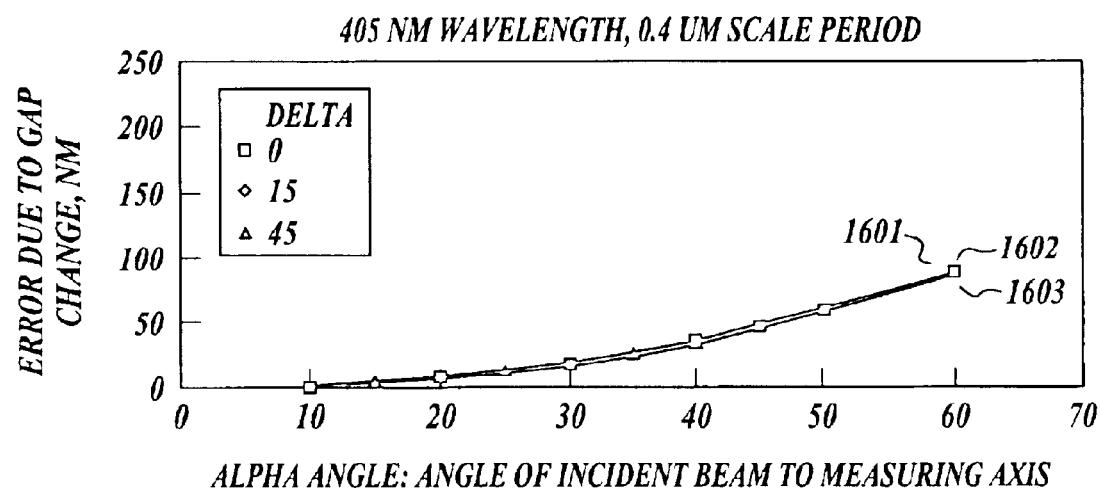
FIG. 16 is a graph showing error sensitivity data for dynamic gap misalignment at various incident beam angles and at various inclined plane angles, using a 405 nm wavelength in an optical displacement sensing device in accordance with this invention.

FIG. 16 is a graph identical to the graph shown in FIG. 15, except that the light source wavelength in nominally 405 nm, instead of 635 nm. The curves 1601–1603, corresponding to inclination angles of delta=0 degrees, delta=15 degrees and delta=45 degrees, respectively, are indistinguishable. Compared to the results shown in FIG. 15, the reduced light source wavelength reduces the dynamic errors due to gap change, for the stated combination of readhead parameters. Furthermore, the errors associated with dynamic gap change increase relatively slowly up to an operating range of 60 degrees for the angle α. Therefore, in various exemplary embodiments according to this invention, the components of the encoder readhead are configured such that α is less than or equal to 60 degrees. However, since the errors associated with dynamic gap change are restricted to values below approximately 50 nm when the angle α is less than or equal to 45 degrees and the wavelength and grating pitch are as stated, in various exemplary embodiments according to this invention, the components of the encoder readhead are configured such that α is less than or equal to 45 degrees.

Figure 17:
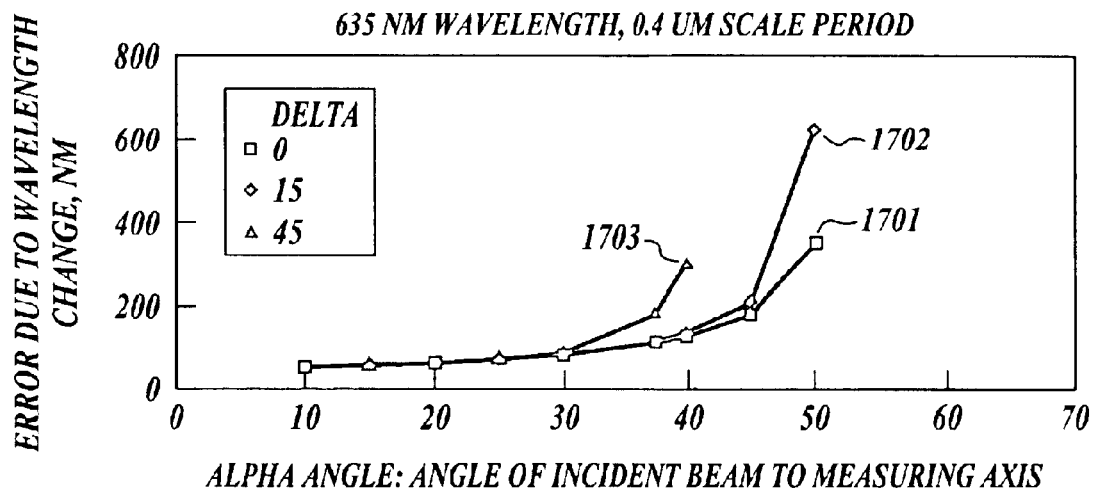
FIG. 17 is a graph showing error sensitivity data for wavelength drift at various incident beam angles and at various inclined plane angles, using a 635 nm wavelength in an optical displacement sensing device in accordance with this invention.

FIG. 17 is a graph showing error sensitivity data for dynamic wavelength drift at various incident beam angles and at various inclined plane angles, for the encoder parameters previously described with reference to FIG. 13, unless otherwise indicated. The curves 1701–1703 correspond to inclination angles of delta=0 degrees, delta=15 degrees and delta=45 degrees, respectively. The light source wavelength dynamically changes by 0.25 nm. This dynamic light source wavelength change produces significantly larger dynamic errors than those due to the due to gap change previously discussed with reference to FIGS. 15 and 16. Thus if the light source of an encoder readhead exhibits this type of instability, for high accuracy it is particularly important to choose an angle α that reduces this sensitivity. For the curves 1701 and 1702, the errors associated with dynamic wavelength change increase relatively slowly up to an operating range of 40 degrees for the angle α. Therefore, in various exemplary embodiments according to this invention, the components of the encoder readhead are configured such that α is less than or equal to 40 degrees. However, for the curve 1703, corresponding the angle delta=45 degrees, the errors increase more rapidly versus the angel α. Therefore, in various other exemplary embodiments according to this invention, the components of the encoder readhead are configured such that α is less than or equal to 30 degrees.

Figure 18:
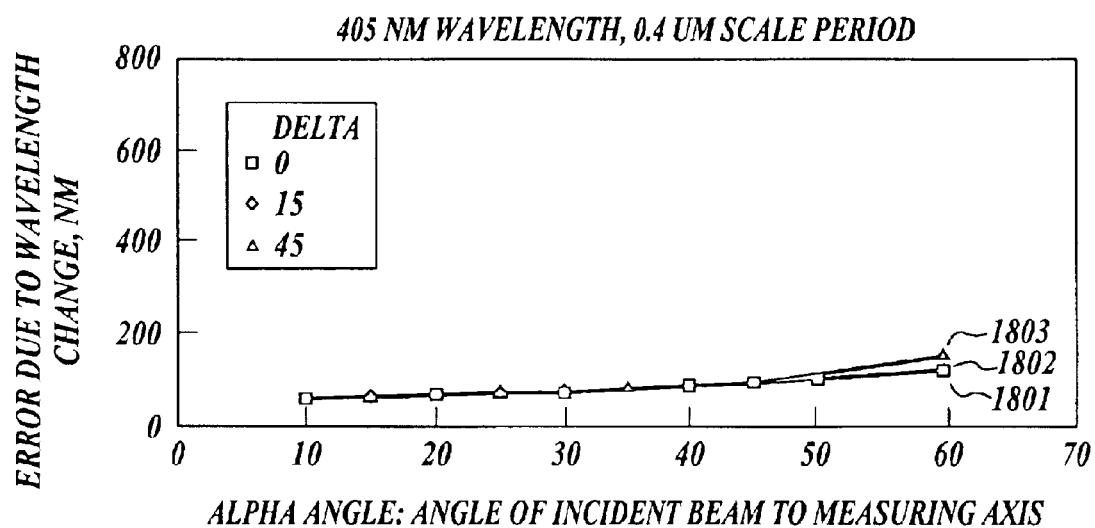
FIG. 18 is a graph showing error sensitivity data for wavelength drift at various incident beam angles and at various inclined plane angles, using a 405 nm wavelength in an optical displacement sensing device in accordance with this invention.

FIG. 18 is a graph identical to the graph shown in FIG. 17, except that the light source wavelength in nominally 405 nm, instead of 635 nm. The curves 1801–1803, corresponding to inclination angles of delta=0 degrees, delta=15 degrees and delta=45 degrees, respectively, are nearly indistinguishable. Compared to the results shown in FIG. 17, the reduced light source wavelength reduces the dynamic errors due to wavelength change, for the stated combination of readhead parameters. Furthermore, the errors associated with dynamic wavelength change increase relatively slowly up to an operating range of 60 degrees for the angle α. Therefore, in various exemplary embodiments according to this invention, the components of the encoder readhead are configured such that α is less than or equal to 60 degrees. However, since the errors associated with dynamic wavelength change are restricted to values below approximately 100 nm when the angle that α is less than or equal to 45 degrees and the wavelength and grating pitch are as stated, in various exemplary embodiments according to this invention, the components of the encoder readhead are configured such that α is less than or equal to 45 degrees.

FIG. 19 is a three-dimensional conceptual view of an optical displacement sensing device in accordance with a fourth exemplary embodiment within the scope of the invention. The configuration shown in FIG. 19 is analogous to the configuration shown in FIGS. 5A–5D, except the inclination angle 473 shown in FIG. 5D is chosen to be zero in the configuration shown in FIG. 19. Because the inclination angle is zero, the embodiment shown in FIG. 19 is a practical configuration that offers the possibility to fabricate a relatively narrow encoder readhead. However, when the inclination angle is zero, the zero-order reflection beams arising from the light beams 401a, 401b, 402a and 402b in the first zone 431, and from the light beams 402ar, 402br, 403a and 403b in the second zone 432, become cross-over beams, as previously discussed. Thus for the configuration shown in FIG. 19, the beam splitting element 415 of the split light beam input portion 410 should incorporate polarizing elements to separate or filter out the cross-over beams, such as the readhead grating shown in FIG. 10E, or the beamsplitter shown in FIG. 11D, or the like. Furthermore, the optical detector assembly 460 should include further include polarizing elements, such as the optical detector 460P described below with reference to FIG. 21, or the like. More generally, the optical detector assembly 460 can be any now known or later developed optical detector which provides signals that are usable to determine the relative phase between the lights of orthogonally polarized beams entering the optical detector. Various alternative detector schemes will be apparent to one skilled in the art. Instructive descriptions of detector schemes are also included in the discussion of FIGS. 1 and 2 above and in the incorporated '895, '085 and '833 patents.

Figure 20B:
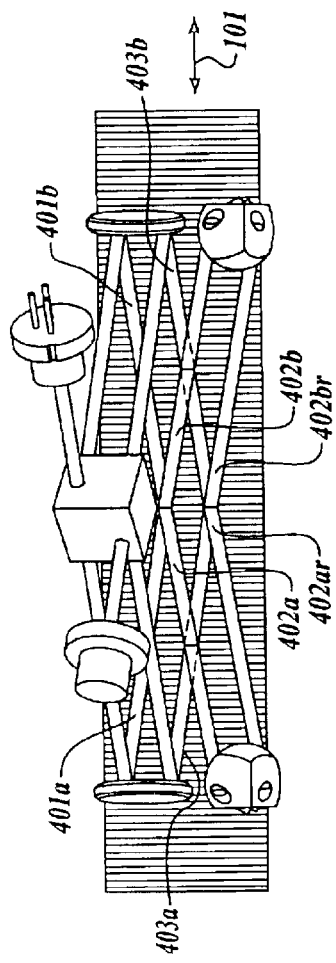
FIG. 20B is a top view of the optical displacement sensing device shown in FIG. 20A.
Figure 20A:
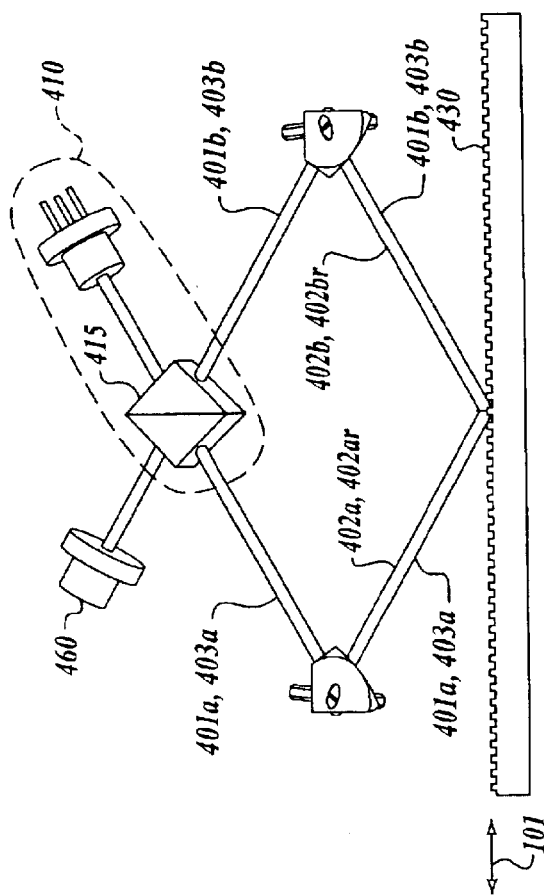
FIG. 20A is a conceptual side view of an optical displacement sensing device in accordance with a fifth exemplary embodiment according to the invention.
Figure 20C:
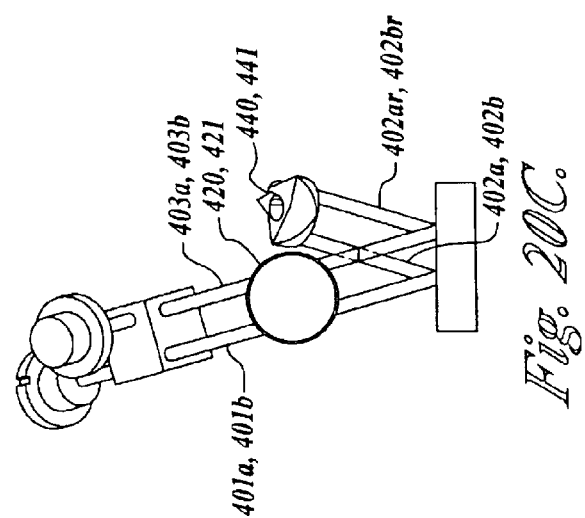
FIG. 20C is an end view of the optical displacement sensing device shown in FIG. 20A.

FIG. 20A is a conceptual side view of an optical displacement sensing device in accordance with a fifth exemplary embodiment within the scope of the invention. FIG. 20B is a top view of the optical displacement sensing device shown in FIG. 20A and FIG. 20C is an end view of the optical displacement sensing device shown in FIG. 20A. The configuration shown in FIGS. 20A–20C is analogous to the configuration shown in FIGS. 12A–12D, except the components of the encoder readhead are arranged such that the portion of each of the light beams that impinges upon or is diffracted from the scale grating 430, as best shown by the numbered light beam portions shown in FIG. 20B, forms the same angle with respect to a hypothetical line which extends parallel to the measuring axis direction 101 and through the respective points of impingement or diffraction. Such a configuration can be designed in accordance with EQUATIONS 1–3, previously discussed.

In such a configuration, using a suitable inclination angle the light beam directing elements 420, 421 and the retroreflectors 440, 441 may be positioned at approximately the same height, as best shown in FIG. 20C, which in various exemplary embodiments results in a readhead having a relatively small overall height. However, because each of the light beams that impinges upon or is diffracted from the scale grating 430 forms the same angle with respect to the hypothetical line which extends parallel to the measuring axis direction 101, the zero-order reflection beams arising from the light beams 401a, 401b, 402a and 402b in the first zone 431, and from the light beams 402ar, 402br, 403a and 403b in the second zone 432, become cross-over beams, as previously discussed. Thus for the configuration shown in FIGS. 20A–20C, the beam splitting element 415 of the split light beam input portion 410 should incorporate polarizing elements to separate or filter out the cross-over beams, such as the readhead grating shown in FIG. 10E, or the beamsplitter shown in FIG. 11D, or the like. Furthermore, the optical detector assembly 460 should include polarizing elements, such as the optical detector 460P described below with reference to FIG. 21, or the like, as previously discussed with reference to FIG. 19.

Figure 21:
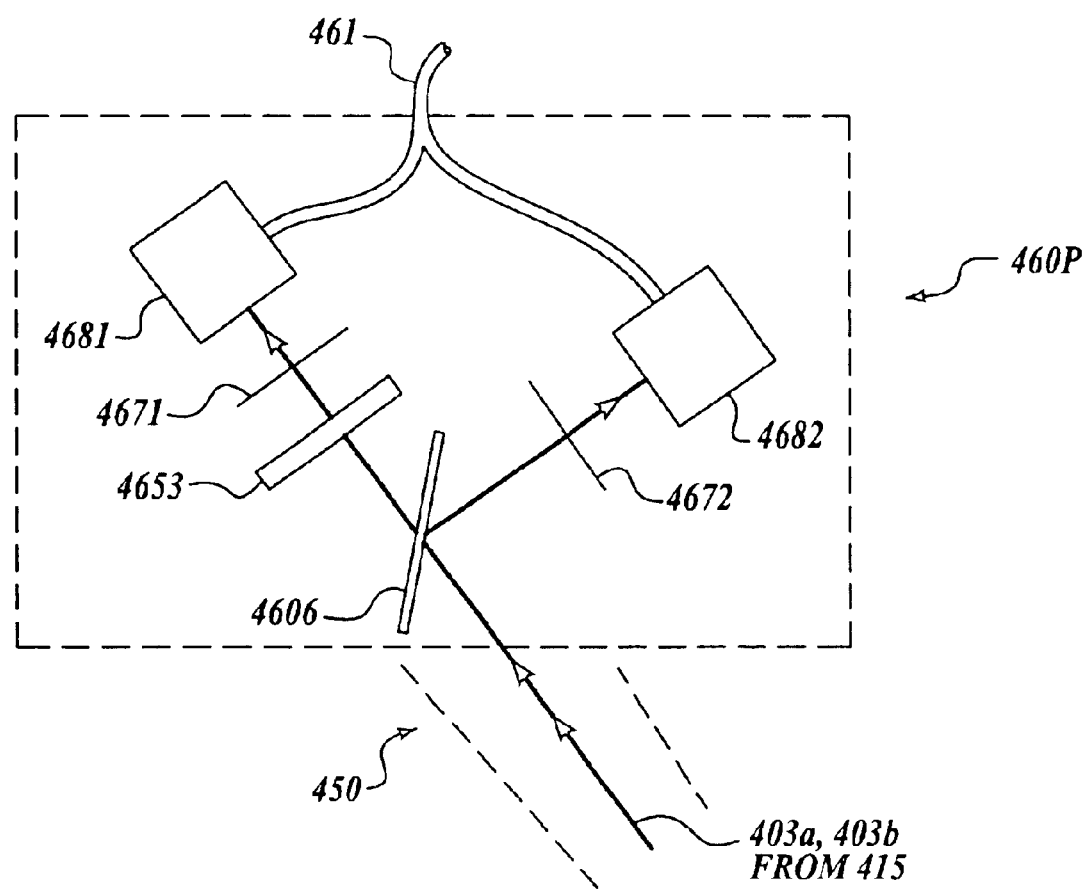
FIG. 21 is a schematic side view of an optical detector including a polarizer configuration usable in various exemplary embodiments according to the invention.

FIG. 21 is a schematic side view of an optical detector 460P including a polarizer configuration. The optical detector 460P is, Thus useful in various exemplary embodiments according to the invention that include cross-over beams. More generally, the optical detector 460P is useful in various exemplary embodiments wherein the light beams 403a and 403b are orthogonally polarized in the shared zone 450 for any reason. In operation, orthogonally polarized light beams 403a and 403b are emitted from a beam splitting element 415 into the shared zone 450 along aligned optical paths to optical detector 460P. Beam splitter 4606 splits the orthogonally polarized light beams 403a and 403b into two split detection beams. A first split detection beam passes through a quarter wave plate 4653 and a polarizer 4671 to a photodetector element 4681. A second split detection beam passes through a polarizer 4672 to a photodetector element 4682. The polarizers 4671 and 4672 are each nominally oriented at a 45 degree angle between the orthogonally polarized beams that reach them, and are further arranged to pass mutually orthogonally polarized light. The quarter wave plate 4653 delays one of the output light beams a quarter of a wave or 90 degrees. Hence, detector 4681 detects a signal that is 90 degrees phase shifted relative to the signal detected by detector 4682, providing a well known quadrature signal format on one or more signal lines 461. In this embodiment of the invention, the optical detector 460P is shown as one integrated unit. However, other configurations of a detector may be used to achieve the same objective as the configuration shown in FIG. 21, as will be apparent to one skilled in the art.

FIG. 22A is a conceptual side view of an optical displacement sensing device in accordance with a sixth exemplary embodiment within the scope of the invention. FIG. 22B is a top view of the optical displacement sensing device shown in FIG. 22A, and FIG. 22C is an end view of the optical displacement sensing device in shown in FIG. 22A. The configuration shown in FIGS. 22A–22C is analogous to the configuration shown in FIGS. 20A–20C. The components of the encoder readhead are arranged such that the portion of each of the light beams that impinges upon or is diffracted from the scale grating 430 forms the same angle with respect to a hypothetical line which extends parallel to the measuring axis direction 101 and through the respective points of impingement or diffraction. However, in contrast to the configuration shown in FIGS. 20A–20C, the impingement points of the light beams in the first zone 431 and the second zone 432, respectively, are separated along the measuring axis direction, as best shown in FIG. 22B. As a result, the zero order reflection paths represented by the lines 2201 and 2202 shown in FIG. 22A, fall outside the effective apertures of the light beam directing elements 420, 421 and the retroreflectors 440, 441, eliminating potential cross-over beams. Thus the configuration shown in FIGS. 22A–22C need not include polarizers in the light beam paths or in the optical detector. However, similarly to the configuration shown in FIGS. 20A–20C, in such a configuration the light beam directing elements 420, 421 and the retroreflectors 440, 441 may be positioned at approximately the same height, which in various exemplary embodiments results in a readhead having a relatively small overall height.

Figure 23:
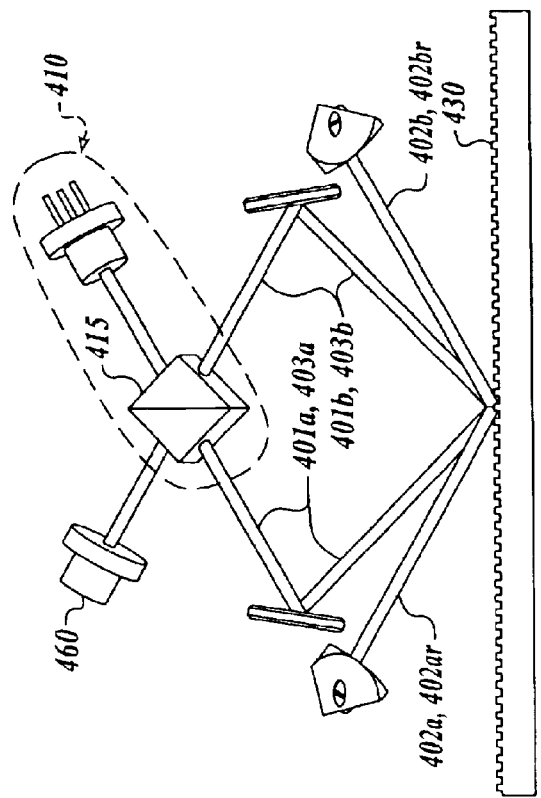
FIG. 23 is a conceptual side view of an optical displacement sensing device in accordance with a seventh exemplary embodiment according to the invention.

FIG. 23 is a conceptual side view of an optical displacement sensing device in accordance with a seventh exemplary embodiment within the scope of the invention. In the configuration shown in FIG. 23, the optical readhead components are positioned such that the light beam paths 402a, 402ar, 402b and 402br lie nearer to the scale grating than the light beam paths 401a, 403a, 401b and 403b. This configuration may be used with an inclination angle, which eliminates cross-over beams, and thus eliminates the need for polarizers in the configuration. Alternatively, for inclination angles which do not eliminate cross-over beams, the beam splitting element 415 of the split light beam portion 410 may include polarizers to separate out the cross-over beams, as previously discussed.

Figure 24:
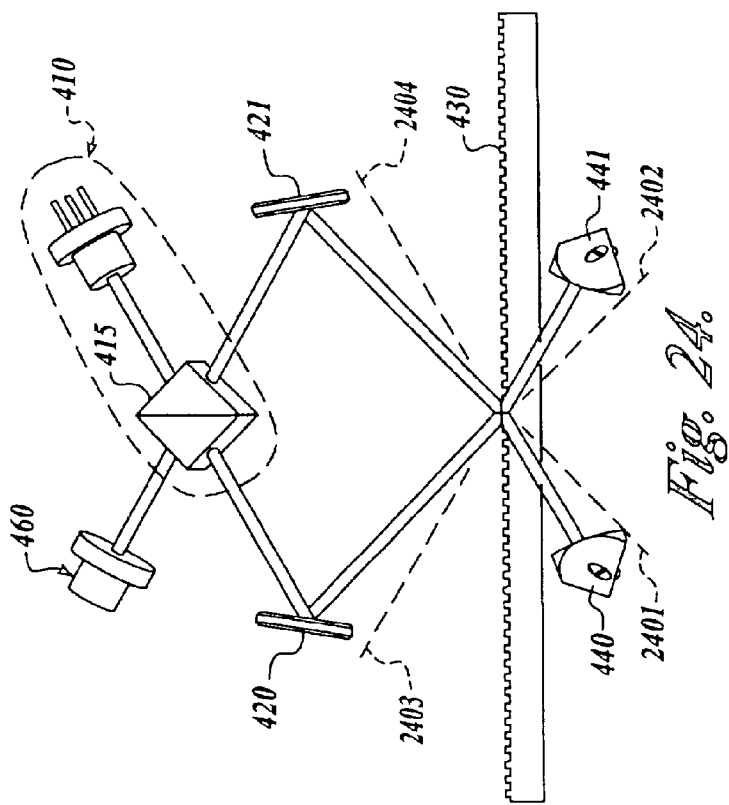
FIG. 24 is a conceptual side view of an optical displacement sensing device in accordance with an eighth exemplary embodiment according to the invention.

FIG. 24 is a conceptual side view of an optical displacement sensing device in accordance with an eighth exemplary embodiment within the scope of the invention. In the configuration shown in FIG. 24, the scale grating 430 is a transmission grating and the retroreflectors 440, 441 are positioned to receive transmitted diffracted orders. If the configuration is arranged such that transmitted zero-order beams fall outside the effective apertures of the light beam directing elements 420, 421, and the retroreflectors 440, 441, as represented by the lines 2401–2404, then cross-over beams will be eliminated from the configuration, thus eliminating the need for polarizers in the configuration, regardless of the inclination angle used. Alternatively, for configurations which do not eliminate cross-over beams, the beam splitting element 415 of the split light beam portion 410 may include polarizers to separate out the cross-over beams, as previously discussed.

Figure 25:
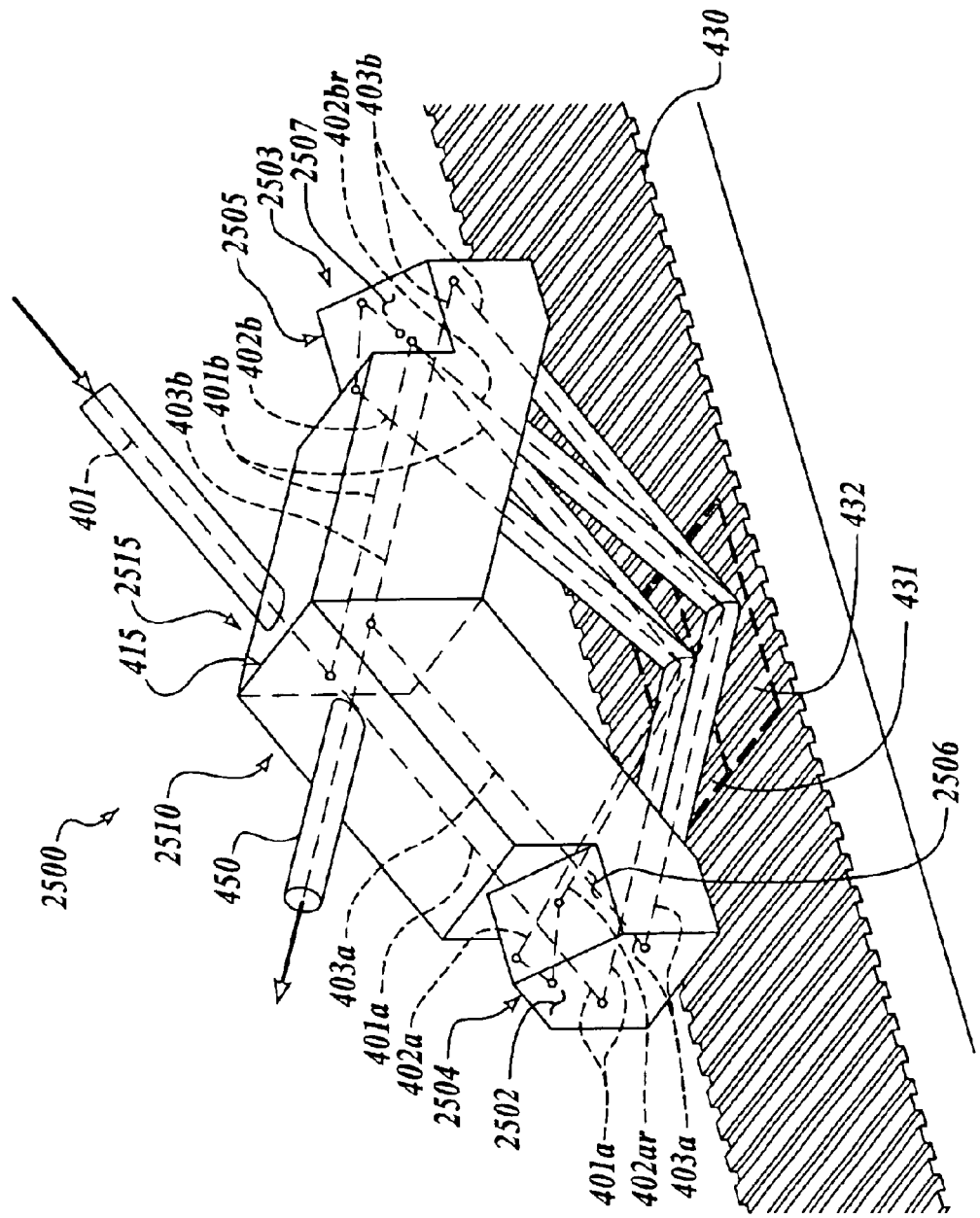
FIG. 25 is a three-dimensional view showing a first exemplary transparent block configuration usable in various exemplary embodiments according to the invention.

FIG. 25 is a three-dimensional view showing a first exemplary transparent block configuration usable in various exemplary embodiments according to the invention. Refractive effects on the various light beam paths are ignored in FIG. 25, but the adjustments needed for such effects will be readily understood by one skilled in the art. FIG. 25 shows a transparent block 2500 including a first block portion 2510 and a second block portion 2515 which are joined at an interface which is fabricated to include a half-silvered mirror or the like in order to provide a beam splitting element 415. The first block portion 2510 includes an end surface 2502 and orthogonal retroreflector surfaces 2504 and 2506 that are all coated to be reflective. The second block portion 2515 includes an end surface 2503 and orthogonal retroreflector surfaces 2505 and 2507 that are all coated to be reflective. The transparent block 2500 is usable for providing the beam path configuration and encoder readhead operating characteristics previously described with reference to FIG. 19. Thus the transparent block 2500 must also provide a polarizing function equivalent to the beamsplitter shown in FIG. 11D, or the like, in order to separate out cross-over beams, as previously described with reference to FIG. 19. In various exemplary embodiments, this is achieved by incorporating mutually orthogonal polarizers on the portions of the end surfaces 2502 and 2503 where the beams 401a, 403a, 401b and 403b, are reflected.

The transparent block 2500 is usable to provide a very compact and dimensionally stable encoder readhead assembly. It should be appreciated that the transparent block 2500 may be fabricated by bonding together, or fabricating together, various combinations of individual optical elements. The optical pieces may comprise a fewer number of more complex individual optical elements or a greater number of less complex individual optical elements. The individual elements may be joined along any combination of bonding planes (not shown) which allow practical, compact and accurate fabrication of the optical pieces. The optical pieces may further incorporate mounting provisions for being joined to various light sources, photodetector arrangements and/or encoder readhead mounting elements. Thus the configuration shown in FIG. 25 is an exemplary configuration only, and is not intended to be limiting.

Figure 26A:
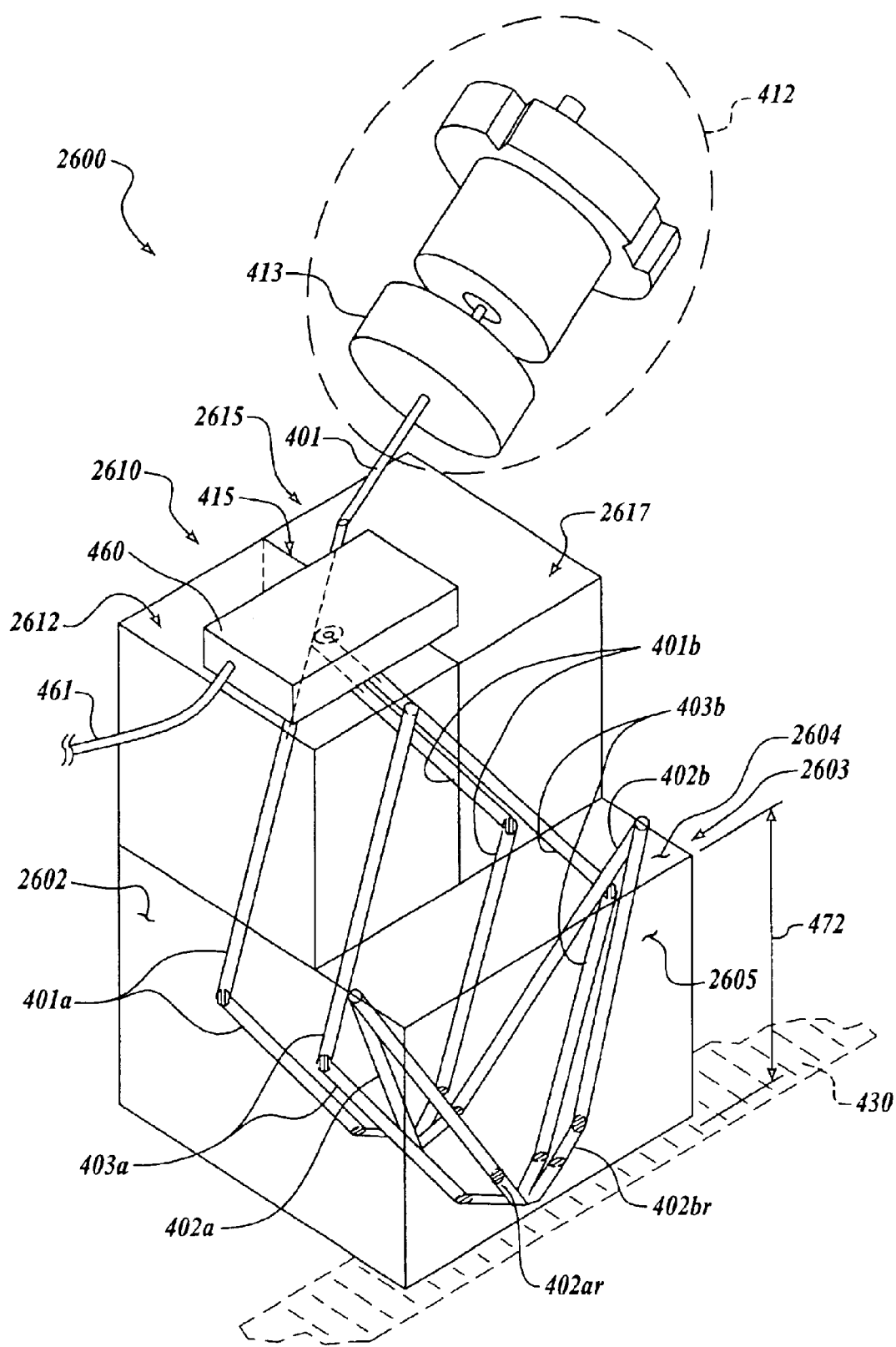
FIG. 26A is a three-dimensional view showing a second exemplary transparent block configuration usable in various exemplary embodiments according to the invention.

FIG. 26A is a three-dimensional view showing a second exemplary transparent block configuration usable in various exemplary embodiments according to the invention. FIGS. 26B and 26C are side and end views, respectively, clarifying the beam paths provided by the transparent block configuration shown in FIG. 26A. Refractive effects on the various light beam paths are included in all figures. The nominal light beam diameters are reduced only in FIG. 26A, to better distinguish the various beam paths. FIG. 26A shows a light source 412, including a collimating lens 413, which inputs a light beam 401 to a transparent block 2600. An optical detector 460 is also shown. The transparent block 2600 includes a left half block portion 2510 and a right half block portion 2515. An upper left half portion 2612 and an upper right half portion 2617 are joined at an interface which is fabricated to include a half-silvered mirror or the like in order to provide a beam splitting element 415. The left half block portion 2610 includes an end surface 2602 and the left half of orthogonal retroreflector surfaces 2604 and 2605, which are all coated to be reflective, and which together comprise the retroreflector 440, as best shown in FIGS. 26B and 26C. The right half block portion 2615 includes an end surface 2603 and the right half of orthogonal retroreflector surfaces 2604 and 2605, which are all coated to be reflective, and which together comprise the retroreflector 441, as best shown in FIGS. 26B and 26C. The transparent block 2600 is usable for providing the beam path configuration and encoder readhead operating characteristics previously described with reference to FIGS. 5A–5D or 12A–12D, for example, when the nominal retroreflector height dimension 472 is suitably chosen. The transparent block 2600 provides for suitable non-zero inclination angles 473. Thus in contrast to the block configuration shown in FIG. 25, cross-over beams may be eliminated and polarizers are not needed.

In various exemplary embodiments, the transparent block 2600 incorporates an optical deflection element (not shown), which provides the same function as the optical wedge element 491 previously discussed with reference FIG. 11B. The optical deflection element is incorporated on the portion of the end surface 2602 or 2603 where the beam 403a or 403b, respectively, is reflected, solely to enable the use of an optical detector scheme which uses an array detector to detect an interference fringe pattern such as the interference fringe pattern 451 discussed with reference to FIG. 11B. The resulting interference pattern translates spatially in correspondence to the scale grating displacement. The translation of the interference pattern can be quantitatively detected by various optical detector array techniques known in the art and/or currently commercially available. In various alternative embodiments the optical detector 460 used with the transparent block 2600 includes the use of a quadrature array which directly produces quadrature signals, and in various other embodiments the optical detector 460 includes the use of a linear or 2-dimensions CCD arrays or the like, allows the interference pattern translation to be imaged and digitally analyzed at a higher resolution. Any of these arrays may be assembled to the transparent block 2600 at a desired position, orientation and spacing, by means of adhesives for example, to provide a precise, stable, economical and compact encoder readhead.

In various other exemplary embodiments, mutually orthogonal polarizers are incorporated on the portions of the end surfaces 2602 and 2603 where the beams 403*a* and 403*b* and/or 401*a* and 401*b*, are reflected, solely to enable the use of an optical detector scheme which uses polarizers.

The transparent block 2600 is usable to provide a very compact and dimensionally stable encoder readhead assembly. It should be appreciated that the transparent block 2600 may be fabricated by bonding together, or fabricating together, various combinations of individual optical elements. It should further be appreciated that although the beams 402*a* and/or 402*b* appear to impinge on corner of the surfaces 2602 and 2604, and 2603 and 2604, respectively, before impinging on the surface 2605 to complete the retroreflection, in various exemplary embodiments the beam 402*a* avoids the corner and impinges on the surfaces 2602 and 2604 in succession. Likewise, the beam 402*b* avoids the corner and impinges on the surfaces 2603 and 2604 in succession, in order to avoid wavefront aberrations induced by imperfect corners. Thus the configuration shown in FIGS. 26A–26C is an exemplary configuration only, and is not intended to be limiting.

FIG. 27A is a three-dimensional view showing a third exemplary transparent block configuration usable in various exemplary embodiments according to the invention. FIGS. 27B and 27C are side and end views, respectively, clarifying the beam paths provided by the transparent block configuration shown in FIG. 27A. The transparent block configuration shown in FIGS. 27A–27C is usable for providing the beam path configuration and encoder readhead operating characteristics previously described with reference to FIG. 4, for example. Refractive effects on the various light beam paths are included in all figures. The nominal light beam diameters are reduced only in FIG. 27A, to better distinguish the various beam paths.

FIG. 27A shows a light source 412, including an input beam directing element 414, which inputs a light beam 401 to a transparent block 2700. An optical detector 460 is also shown. The transparent block 2700 includes a left half block portion 2710 and a right half block portion 2715. The left half block portion 2710 includes a rear end surface 2702, a forward end surface 2704 and the left half of orthogonal retroreflector surfaces 2706 and 2707, which are all coated to be reflective. The forward end surface 2704 and the left half of orthogonal retroreflector surfaces 2706 and 2707 together comprise the retroreflector 440, as best shown in FIGS. 27B and 27C. The right half block portion 2715 includes a rear end surface 2703, a forward end surface 2705 and the right half of orthogonal retroreflector surfaces 2706 and 2707, which are all coated to be reflective. The forward end surface 2705 and the right half of orthogonal retroreflector surfaces 2706 and 2707 together comprise the retroreflector 441, as best shown in FIGS. 27B and 27C. A top rear surface of the transparent block 2700 includes a transmissive readhead grating, which in various embodiments may be any of the readhead gratings previously discussed with reference to FIGS. 10A–10E, and which may be fabricated as a separate element or integrated to the surface in order to provide a beam splitting element 415. As previously discussed, the inventor has found that in embodiments according to this invention where the beam splitting element is a readhead grating such as the readhead gratings shown in FIGS. 10A–10E, or the like, that the errors in such embodiments related to pitch misalignment and dynamic pitch misalignment and the like tend to be relatively reduced as the beam splitting height dimension 471 is made smaller, and/or the retroreflector height dimension 472 approaches equality with the beam splitting height dimension 471, as provided by the exemplary transparent block 2700.

The transparent block 2700 provides for non-zero inclination angles 473. Thus similar to the block configuration shown in FIGS. 26A–26C, cross-over beams may be eliminated and polarizers are not needed. In various exemplary embodiments, the transparent block 2700 incorporates an optical deflection element (not shown), which provides the same function as the optical wedge element 491 previously discussed with reference FIG. 10C. The optical deflection element is incorporated on the portion of the rear end surface 2702 or 2703 where the beam 403*a* or 403*b*, respectively, is reflected, solely to enable the use of an optical detector scheme which uses an array detector to detect an interference fringe pattern, as previously discussed with reference to FIGS. 26A–26C. Alternatively, the readhead grating shown in FIG. 10B may be used, to achieve the same effect. In such cases, the optical detector 460 includes an array detector according to previously described interference fringe detection schemes, and may be assembled to the transparent block 2600 at a desired position, orientation and spacing, by means of adhesives for example, to provide a precise, stable, economical, and compact encoder readhead.

In various other exemplary embodiments, mutually orthogonal polarizers are incorporated on the portions of the rear end surfaces 2702 and 2703 where the beams 403*a* and 403*b* and/or 401*a* and 401*b*, are reflected, solely to enable the use of an optical detector scheme which uses polarizers.

The transparent block 2700 is usable to provide a very compact and dimensionally stable encoder readhead assembly. It should be appreciated that the transparent block 2700 may be fabricated by bonding together, or fabricating together, various combinations of individual optical elements. It should further be appreciated that although the beams 402*a* and/or 402*b* appear to impinge on a corner of the surfaces 2704 and 2706, and 2705 and 2706, respectively, before impinging on the surface 2707 to complete the retroreflection, in various exemplary embodiments the beam 402*a* avoids the corner and impinges on the surfaces 2704 and 2706 in succession. Likewise, the beam 402*b* avoids the corner and impinges on the surfaces 2705 and 2706 in succession, in order to avoid wavefront aberrations induced by imperfect corners. Thus the configuration shown in FIGS. 26A–26C is an exemplary configuration only, and is not limiting.

Figure 28:
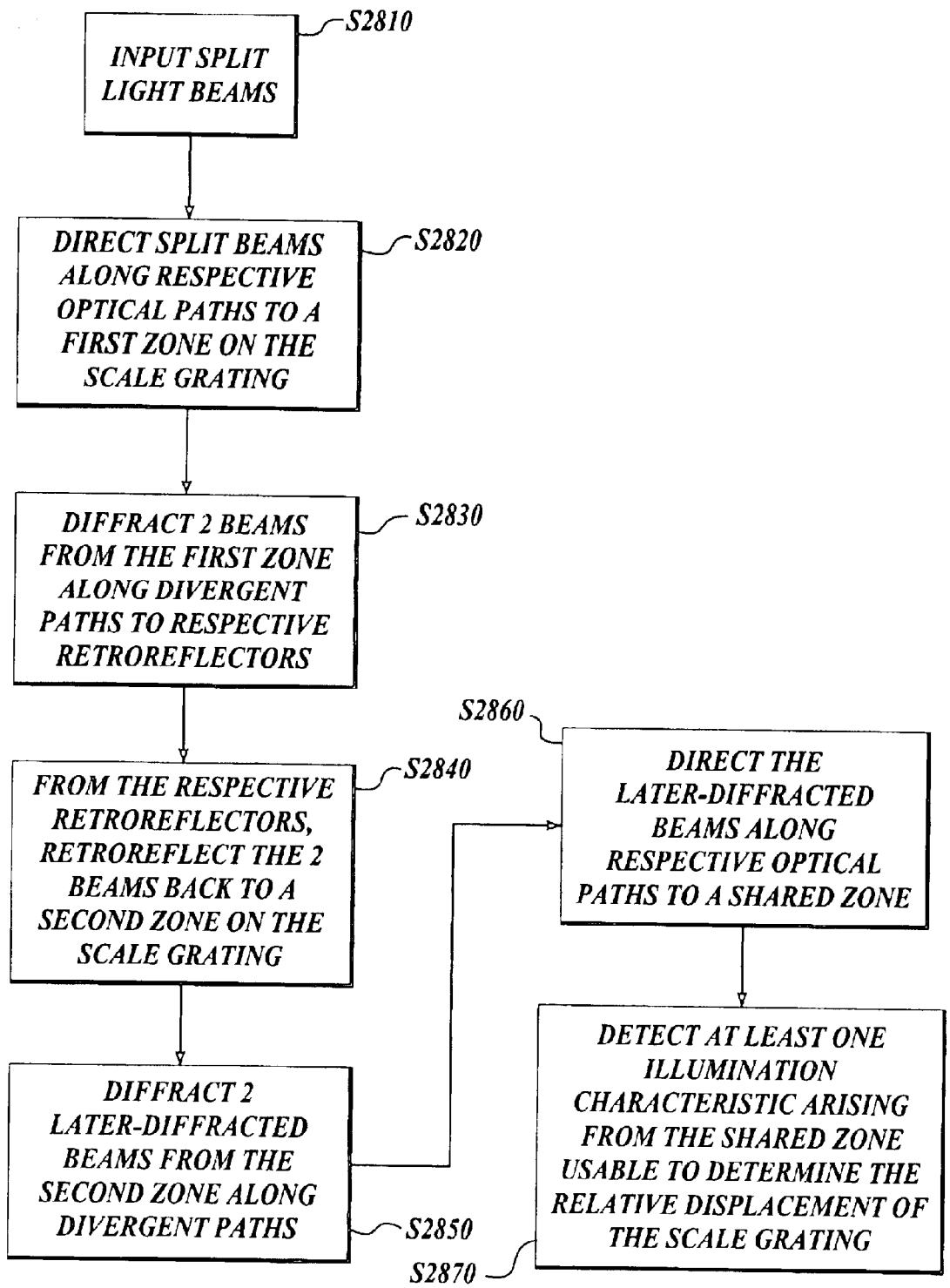
FIG. 28 is a flow diagram for a first method of using an optical displacement sensing device in accordance with various exemplary embodiments of the invention.

FIG. 28 shows a flow diagram for a method of using an optical displacement sensing device in accordance with various exemplary embodiments of the invention. The method begins at a block S2810, by inputting split light beams to be received by respective light directing elements of the optical displacement sensing device. The method then continues to a block S2820, by directing the split light beams to a first zone on a scale grating using various light directing elements. In a preferred embodiment, the split light beams area directed along nominally symmetrical paths to the first zone. The method then continues to a block S2830.

At block S2830, the split light beams are each diffracted from the first zone on the scale grating, and two diffracted beams are directed along divergent paths and enter respective retroreflectors. The method then continues to a block S2840, by retroreflecting the beams entering the respective retroreflectors back to a second zone on the scale grating. The method then continues to a block S2850, where the beams retroreflected back to the second zone on the scale are each diffracted from the second zone on the scale grating, and two diffracted beams are directed along divergent paths after leaving the second zone. The method then continues to a block S2860.

At block S2860, the two diffracted beams along divergent paths after leaving the second zone are directed along respective paths to a shared zone, using various light directing elements. In a preferred embodiment, the beams directed to the shared zone are directed along nominally symmetrical paths. The method then continues to a block S2870, where the method ends by detecting at least one illumination characteristic arising from the shared zone and determining a relative displacement of the scale grating relative to the optical displacement sensing device based on the detection result.

FIG. 29A is a conceptual side view of an optical displacement sensing device in accordance with a ninth exemplary embodiment according to the invention. FIG. 29B is a top view of the optical displacement sensing device shown in FIG. 29A, while FIG. 29C is an end view of the optical displacement sensing device shown in FIG. 29A.

As previously discussed, in various exemplary embodiments according to this invention, depending on the location of the retroreflectors 440 and 441 relative to the diffracted light beams 402a and 402b, respectively, the light paths of the light beams 402ar and 402br may be offset, that is, separated from the diffracted light beams 402a and 402b in a direction transverse to the measuring axis direction 101 such as that shown in FIG. 4. In such a case the second zone is dimensioned similarly to the first zone 431, and is offset from the first zone 431 in a direction generally transverse, or perpendicular, to the measuring axis direction 101 as shown in FIG. 4, corresponding to the offset of the light paths of the light beams 402ar and 402br. However, also as previously discussed, more generally, in various exemplary embodiments the second zone 432 is nominally offset from the first zone 431 in the same direction as any offset of the light paths of the light beams 402ar and 402br relative to the diffracted light beams 402a and 402b. FIGS. 29A–29C illustrate one exemplary embodiment according to this more general case, where the light paths of the light beams 402ar and 402br are intentionally offset, or separated, from the diffracted light beams 402a and 402b, respectively, in respective offset directions that are not generally transverse, or perpendicular, to the measuring axis direction 101. In contrast to various previously described embodiments according to this invention, the embodiment shown in FIGS. 29A–29C allows the sensitivity to static and dynamic pitch misalignments to be minimized relatively independently of the distance between the spots in the first zone 431 and/or the second zone 432, as described in detail below.

The configuration shown in FIGS. 29A–29C is analogous to the configurations shown in FIGS. 20A–20C and 22A–22C, in that the components of the encoder readhead are arranged such that the portion of each of the operational light beams that impinges upon or is diffracted from the scale grating 430 forms the same angle with respect to a hypothetical line which extends parallel to the measuring axis direction 101 and through the respective spots of impingement or diffraction. Such a configuration can be designed in accordance with EQUATIONS 1–3, as previously discussed. However, it should be appreciated that in contrast to various other embodiments according to this invention such as the configurations shown in FIGS. 20A–20C and 22A–22C, in the configuration shown in FIGS. 29A–29C the light beams 401a and 402ar impinge on a nominally aligned scale grating 430 at light spots that are not nominally aligned along a direction that is generally transverse, or perpendicular, to the measuring axis direction 101. Furthermore, the light spots where the light beams 401b and 402br impinge on a nominally aligned scale grating 430 are also not nominally aligned along a direction that is generally transverse, or perpendicular, to the measuring axis direction 101. Rather, as best shown in FIGS. 29B and 29D, in the ninth exemplary embodiment according to this invention it is the light beams 401b and 402ar, and the light beams 401a and 402br, respectively, that impinge on a nominally aligned scale grating 430 at respective pairs of light spots that are each nominally aligned along a direction that is generally transverse, or perpendicular, to the measuring axis direction 101. In such an embodiment, the sensitivity to static and dynamic pitch misalignments is minimized in a way that is approximately independent of the distance between the spots in the first zone 431 and/or the second zone 432, as described in detail below.

In FIGS. 29A–29C, evidently corresponding elements and/or elements having similar reference numbers are arranged and operate as previously described with reference to FIGS. 5A–5D, unless otherwise indicated. The generic discussions with reference to FIGS. 5A–5D apply in a corresponding manner to FIGS. 29A–29C, unless otherwise indicated. Furthermore, in FIGS. 29A–29C the reference numbers of several elements evidently corresponding to previously discussed generic or specific elements are omitted, since their arrangement and operation have already been made evident and are not further described with reference to FIGS. 29A–29C. Conversely, in FIGS. 29A–29C the reference numbers of elements are generally repeated or added if there is a related description or if the FIGS. 29A–29C serve to further clarify such elements.

The embodiment shown in FIGS. 29A–29C is a practical configuration that is substantially insensitive to various misalignments and dynamic misalignments, yet offers additional flexibility for designing and assembling various optical components in a compact and economical way in an encoder readhead. As best shown in FIG. 29A the beamsplitter element 415X receives the light beam 401 and produces two split light beams 401a and 401b, which are directed to the light beam directing elements 420 and 421. The light beam directing elements 420 and 421 direct the split light beams 401a and 401b along respective light paths such that the split light beams 401a and 401b first converge toward a hypothetical plane $P_C$ that is parallel to the scale grating surface and proximate to the first zone 431 on the scale grating 430, and then diverge from the hypothetical plane $P_C$ until they reach the scale grating 430. As best shown in FIG. 29B, the split light beams 401a and 401b impinge on the scale grating 430 in the first zone 431 at light spots having a nominal separation distance d1 along the measuring axis direction 101.

It should be appreciated that in various exemplary embodiments according to the configuration shown in FIGS. 29A–29C is the sensitivity to static and dynamic pitch misalignments is nominally independent of the separation distance d1 between the light spots in the first zone 431, as described in greater detail below. Thus, in one exemplary embodiment, the nominal separation distance d1 and the dimension of the first zone 431 along the measuring axis direction 101 are designed primarily to provide clearance between various diffracted and reflected light beams and various elements of the encoder readhead, as described further below. However, in various exemplary embodiments, the nominal separation distance d1 and the dimension of the first zone 431 are further designed to have the minimum dimensions that provide a minimum reliable clearance.

In any case, as best shown in FIG. 29A, the split light beams 401a and 401b diffract from the first zone 431, giving rise to respective diffracted light beams 402a and 402b, respectively, which are respective diffraction orders diffracted along respective light paths which converge toward the hypothetical plane $P_C$ proximate to the first zone 431, and then diverge from the hypothetical plane $P_C$ until they enter the retroreflectors 440 and 441. The retroreflectors 440 and 441 receive the diffracted light beams 402a and 402b, respectively, along their respective light paths and retroreflect them as light beams 402ar and 402br, respectively, parallel to the light paths of the diffracted light beams 402a and 402b.

In contrast to the light beams 402a and 402b, in various exemplary embodiments according to the configuration shown in FIGS. 29A–29C, the retroreflectors 440 and 441 are located and/or oriented relative to the diffracted light beams 402a and 402b such that the retroreflected beams 402ar and 402br converge both before and after reaching the hypothetical plane $P_C$, until they reach the scale grating 430. As best shown in FIG. 29B, the retroreflected beams 402ar and 402br impinge on the scale grating 430 in the second zone 432 at light spots having a nominal separation distance d2 along the measuring axis direction 101.

It should be appreciated that in various exemplary embodiments according to the configuration shown in FIGS. 29A–29C, the ability to minimize errors related to pitch misalignment and dynamic pitch misalignment is improved as the nominal separation distances d1 and d2 approach the same value. Thus, in various exemplary embodiments, the retroreflectors 440 and 441 are further located and/or oriented relative to the diffracted light beams 402a and 402b such that the nominal separation distance d2 is the same as the nominal separation distance d1. In various other exemplary embodiments, the retroreflectors 440 and 441 are further located and/or oriented relative to the diffracted light beams 402a and 402b so as to maintain clearance between various diffracted and reflected light beams and various elements of the encoder readhead, as described further below.

In any case, as best shown in FIG. 29A, the retroreflected light beams 402ar and 402br diffract from the second zone 432, giving rise to respective later-diffracted light beams 403a and 403b, respectively, which are respective diffraction orders diffracted along respective light paths which diverge from the second zone 432 toward the light beam directing elements 420 and 421. The later-diffracted light beams 403a and 403b are then directed by the light beam directing elements 420 and 421 such that the later-diffracted light beams 403a and 403b converge proximate to the beam splitting element 415X. A portion of the beam splitting element 415X receives the later-diffracted light beams 403a and 403b and acts as a light beam directing element that reflects or deflects at least one of the beams according to known optical principles to bring the later-diffracted light beams 403a and 403b into alignment or near alignment in the shared zone 450. The aligned or nearly aligned later-diffracted light beams 403a and 403b then enter a suitably-chosen optical detector 460, as previously described. It should be appreciated that in various exemplary embodiments, alternative and/or separate light beam directing elements can be used to direct the later-diffracted light beams 403a and 403b to converge proximate to an alternative and/or separate beam directing element that reflects or deflects at least one of the beams according to known optical principles to bring the later-diffracted light beams 403a and 403b into alignment or near alignment in the shared zone 450.

The configuration shown in FIGS. 29A–29C reduces or eliminates static and dynamic pitch sensitivity. For example, if the scale grating 430 is rotated about a pitch axis through the point $A_p$ shown in FIG. 29A, it will be appreciated that for small pitch angles the path lengths of the light beams 402ar and 403a will change by approximately the same amounts as the path lengths of the light beams 401b and 403b. Similarly, the path lengths of the light beams 402br and 403b will change by approximately the same amounts as the path lengths of the light beams 401a and 403a. Thus, the later-diffracted light beams 403a and 403b will enter the shared zone 450 with the approximately the same optical phase relation, regardless of static or dynamic pitch, and potential pitch errors are reduced or eliminated. More generally, it will be appreciated that in various exemplary embodiments, similar results are obtained if symmetry is preserved by aligning the midpoints of the distances d1 and d2 along an axis in the plane of the scale grating 430 and perpendicular to the measuring axis, even if the distances d1 and d2 differ.

FIG. 29D is a top view of one exemplary nominal spot pattern formed on the scale grating 430 according to the ninth exemplary embodiment shown in FIGS. 29A–29C. FIG. 29D shows a light spot S1b arising from the light beam 401b, a light spot S2ar arising from the light beam 402ar, a light spot S1a arising from the light beam 401a, and a light spot S2br arising from the light beam 402br. In general, it is desirable in various exemplary embodiments according to the configuration shown in FIGS. 29A–29C that the distances d1 and d2 are approximately similar, and that the respective pairs of light spots S1b and S2ar, and S1a and S2br, are each aligned along a direction that is approximately transverse, or perpendicular, to the measuring axis direction 101. Such embodiments reduce potential pitch errors. In particular, the inventors have determined that in various exemplary embodiments where the distances d1 and d2 are identical, and the respective pairs of light spots S1b and S2ar, and S1a and S2br, are each aligned along a direction that is perpendicular to the measuring axis direction 101, as shown in FIG. 29D, then potential pitch errors are effectively eliminated. In certain configurations, it may be advantageous to have the distances d1 and d2 be greater than 1 millimeter and less than 4 millimeters.

It will be appreciated that the encoder readhead configuration shown in FIGS. 29A–29C also has other advantages in addition to providing a desirable configuration of light spot locations and light beam path lengths as previously described. Specifically, as best shown in FIG. 29B, it is also possible to locate and/or orient the retroreflectors 440 and 441 relative to the diffracted light beams 402a and 402b so as to maintain clearance between various "unwanted"

reflected and/or diffracted light beams and various elements of the encoder readhead, so that crossover beams are eliminated. Various zero-order reflected light beam paths are indicated by dashed line in FIG. 29B. It can be seen that the zero-order reflected light beam paths Z1*b* and Z1*a* fall outside the retroreflectors 440 and 441, and are thus eliminated. Zero-order reflected light beam paths arising from the retroreflected light beams 402*ar* and 402*br* are received by the light beam directing elements 420 and 421 and directed to the beam splitting element 415X, to emerge along the combined zero-order reflected light beam path Z3. It can be seen that the zero-order reflected light beam path Z3 falls outside the detector 460, and is thus eliminated. It should be appreciated that such embodiments according to this invention need not include polarizers, thus avoiding unwanted encoder readhead fabrication and/or assembly constraints in some situations. However, it should be further appreciated that polarizers may be optionally included in such embodiments, as desired for compatibility with a particular optical detector 460 in a particular embodiment, for example.

It should also be appreciated that depending on the size and/or location and/or orientation of the retroreflectors 440 and 441 relative to the diffracted light beams 402*a* and 402*b* in various embodiments according to the configuration shown in FIGS. 29A–29C, various zero-order reflected light beam paths may not be eliminated, resulting in crossover beams. In such embodiments, the polarizing and detecting elements described with respect to the configuration shown in FIGS. 20A–20D should be used. It will be appreciated that such embodiments may still retain the other features and benefits of the ninth exemplary embodiment, as described above, and will thus remain insensitive to static and dynamic pitch misalignment, as also described above.

Furthermore, in the configuration of FIGS. 29A–29C, the sensing device may comprise a transparent block structure. Thus, the light beam-directing elements 420 and 421 may comprise opposing surfaces of the block of transparent material. Similarly, the retroreflector elements 440 and 441 may comprise respective corner regions of the block of transparent material. More generally, it should be appreciated that any generic discussions included in the preceding discussion of FIGS. 29A–29D are indicative of a number of configurations which may vary in their combination of elements and dimensions from the specific elements and dimensions indicated in FIGS. 29A–29D. Thus FIGS. 29A–29D should not be interpreted as limiting with regard to the meaning and intent of the generic portions of the preceding discussion.

Figure 30A:
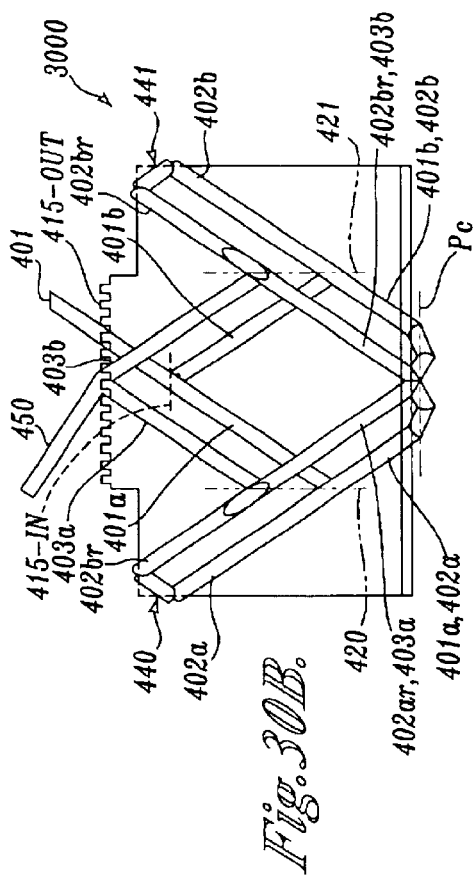
FIG. 30A is a three-dimensional conceptual view of third exemplary transparent block configuration usable in various exemplary embodiments of an optical displacement sensing device in accordance with a tenth exemplary embodiment of the invention.
Figure 30B:
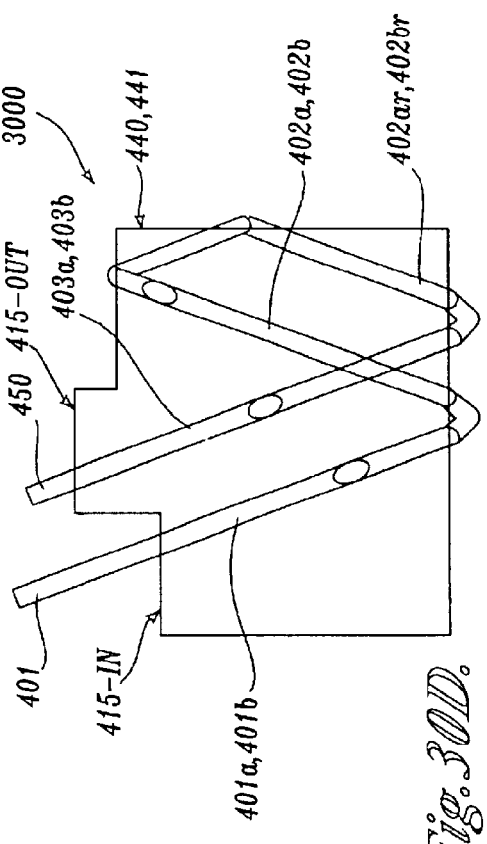
FIG. 30B is a side view of the transparent block configuration shown in FIG. 30A.
Figure 30C:
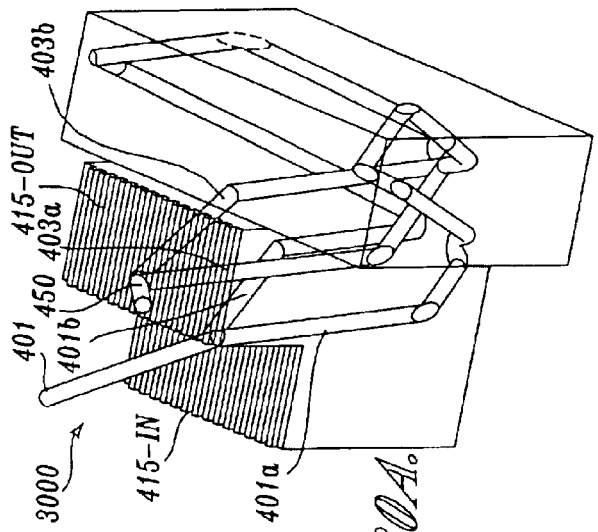
FIG. 30C is a top view of the transparent block configuration shown in FIG. 30A.
Figure 30D:
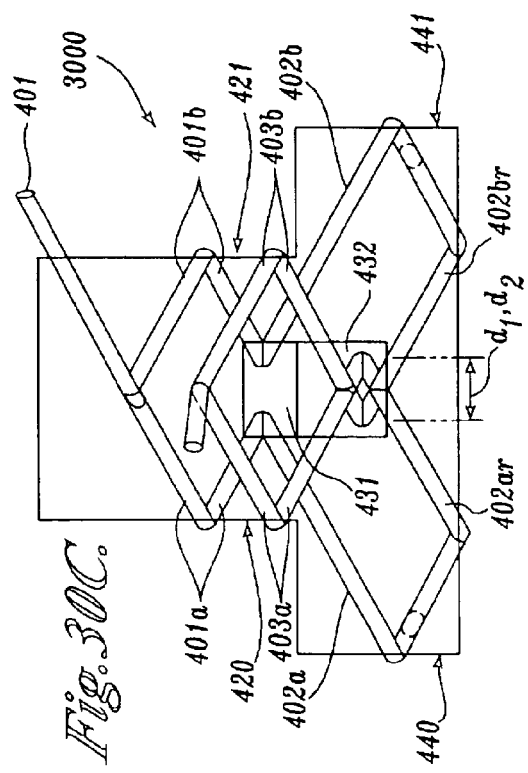
FIG. 30D is an end view of the transparent block configuration shown in FIG. 30A.
Figure 30F:
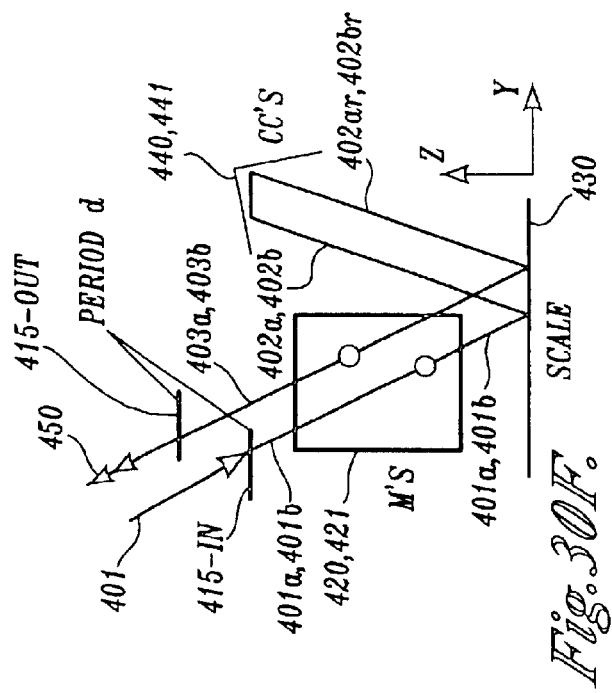
FIG. 30F is a schematic end view of the tenth exemplary embodiment shown in FIGS. 30A–30D.

FIG. 30A is a three-dimensional conceptual view of a third exemplary transparent block configuration usable in various exemplary embodiments of an optical displacement sensing device configuration in accordance with a tenth exemplary embodiment of the invention. FIG. 30B is a conceptual side view of the transparent block configuration shown in FIG. 30A, while FIG. 30C is a top view, and FIG. 30D is an end view. FIG. 30E is a schematic side view of the optical sensing device configuration shown in FIG. 30A, while FIG. 30F is a schematic end view. FIG. 30G is a top view of a nominal spot pattern formed on the scale grating according to the tenth exemplary embodiment shown in FIGS. 30A–30F.

The configuration shown in FIGS. 30A–30G is analogous to the configuration shown in FIGS. 29A–29D in at least two ways. First, the components of the encoder readhead are arranged such that the portion of each of the operational light beams that impinges upon or is diffracted from the scale grating 430 forms the same angle with respect to a hypothetical line which extends parallel to the measuring axis direction 101 and through the respective spots of impingement or diffraction. Such a configuration can be designed in accordance with EQUATIONS 1–3, as previously discussed. Second, the beam paths and light spot configuration of the configuration shown in FIGS. 30A–30G provides a similar measure of insensitivity to static and dynamic pitch misalignment, in a similar way.

It will be appreciated that the FIGS. 30A–30D show a transparent block 3000 which provides similar functions in a similar manner to the transparent block 2700 shown in FIGS. 27A–27C. Furthermore, in FIGS. 30A–30D, evidently corresponding elements and/or elements having similar reference numbers are arranged and operate as previously described with reference to FIGS. 27A–27C, unless otherwise indicated. The generic discussions with reference to FIGS. 27A–27C apply in a corresponding manner to FIGS. 30A–30D, unless otherwise indicated. Furthermore, in FIGS. 30A–30G the reference numbers of several elements evidently corresponding to previously discussed generic or specific elements are omitted, since their arrangement and operation have already been made evident and are not further described with reference to FIGS. 30A–30G. Conversely, in FIGS. 30A–30G the reference numbers of elements are generally repeated or added if there is a related description or if the FIGS. 30A–30G serve to further clarify such elements.

In the configuration shown in FIGS. 30A–30G, the light beam 401 is split by the input grating 415-IN into light beams 401*a* and 401*b*, as best shown in FIGS. 30A and 30E. The light beams 401*a* and 401*b* are received by the light beam directing elements 420 and 421 and directed along respective converging optical paths toward the first zone 431 on the scale grating 430. In one embodiment, the light beam directing elements 420 and 421 are reflective surfaces of the transparent block 3000, as best shown in FIG. 30C. In contrast to the light beams 401*a* and 401*b* shown in FIGS. 29A–29C, the light beams 401*a* and 401*b* according to the present embodiment converge both before and after reaching the hypothetical plane $P_C$, until they reach the scale grating 430, as best shown in FIGS. 30B and 30E. As best shown in FIGS. 30C and 30G, the split light beams 401*a* and 401*b* impinge on the scale grating 430 in the first zone 431 at light spots having a nominal separation distance d1 along the measuring axis direction 101.

This gives rise to the two diffracted light beams 402*a* and 402*b* which travel along respective diverging light paths until they enter the retroreflectors 440 and 441, which are provided by reflecting surfaces which meet at respective corners of the transparent block 3000. The retroreflectors 440 and 441 receive the two diffracted light beams 402*a* and 402*b* along the respective diverging light paths and retroreflect them as light beams 402*ar* and 402*br*, respectively, parallel to the light paths of the diffracted light beams 402*a* and 402*b*. In contrast to the light beams 402*a* and 402*b*, in various exemplary embodiments according to the configuration shown in FIGS. 30A–30G, the retroreflectors 440 and 441, that is, the retroreflecting surfaces of the transparent block 3000, are located and/or oriented relative to the diffracted light beams 402*a* and 402*b* such that the retroreflected beams 402*ar* and 402*br* first converge toward the hypothetical plane $P_C$ that is parallel to the scale grating surface and proximate to the first zone 432 on the scale grating 430, and then diverge from the hypothetical plane $P_C$, as best shown in FIGS. 30B and 30E. As best shown in FIG. 30C, the retroreflected beams 402*ar* and 402*br* impinge on the scale grating 430 in the second zone 432 at light spots having a nominal separation distance d2 along the measuring axis direction 101.

The retroreflected light beams 402ar and 402br diffract from the second zone 432, giving rise to respective later-diffracted light beams 403a and 403b. The later-diffracted light beams 403a and 403b then travel along respective optical paths to be directed by the light beam directing elements 420 and 421 toward the output grating 415-out which acts as a light beam directing element that deflects at least one of the beams to bring the later-diffracted light beams 403a and 403b into alignment or near alignment in the shared zone 450 according to the principles of this invention. It should be appreciated that in various exemplary embodiments having alternative optical paths according to the principles of this invention, alternative and/or separate light beam directing surfaces, such as add-on mirrors or the like (not shown), can be mounted on transparent portions of the surfaces that provide the light beam directing elements 420 and 421, to provide additional surfaces and/or dimensions that direct the later-diffracted light beams 403a and 403b to converge proximate to a beam directing element that brings the later-diffracted light beams 403a and 403b into alignment or near alignment in the shared zone 450.

As illustrated in FIGS. 30A–30G, the beam splitting elements 415-IN and 415-OUT are conceptually represented as readhead grating elements, with the later-diffracted light beams 403a and 403b each impinging upon the readhead grating element 415-OUT, while the readhead grating element 415-IN is impinged upon by the light beam 401. The structure and operation of various exemplary readhead grating elements, which are consistent with this illustration, were discussed above with reference to FIGS. 10A–10E. However, in various other embodiments, the beam splitting element(s) 415-IN and 415-OUT are more generally intended to represent any now known or later developed light beam splitting element or combination of elements, such as portions of a grating or multiple gratings or the like, including any of the configurations discussed above and shown in FIGS. 10A–10E or 11A–11D, which is operable to produce split and/or deflected light beams according to the principles of this invention.

FIG. 30G is a top view of one exemplary nominal spot pattern formed on the scale grating 430 according to the tenth exemplary embodiment shown in FIGS. 30A–30F. As illustrated in FIG. 30G, the light beam 401a nominally impinges on the scale grating 430 at a light spot S1a, giving rise to the diffracted light beam 402a. The light beam 401b nominally impinges on the scale grating 430 at a light spot S1b, giving rise to the diffracted light beam 402b. The light beam 402br nominally impinges on the scale grating 430 at a light spot S2br, giving rise to the later-diffracted light beam 403b. The light beam 402ar nominally impinges on the scale grating 430 at a light spot S2ar, giving rise to the later-diffracted light beam 403a.

Similarly to FIG. 29D, in FIG. 30G the light spots S1a and S1b are located within the first zone 431 and are separated by a first distance d1, and the light spots S2 ar and S2brare located within the second zone 432 and are separated by a second distance d2. In comparison to their positions as shown in FIG. 29D, as shown in FIG. 30G the positions of the light spots S1a and S1b are reversed, as are the positions of the light spots S23a and S23b. This is due to the differences between the ninth and tenth exemplary embodiments. However, it should be appreciated that because both sets of lights spots are reversed, all of the considerations related to the location and/or orientation of the retroreflectors 440 and 441 relative to the diffracted light beams 402a and 402b, the dimensions d1 and d2, and the location of the various lights spots for the configuration shown in FIGS. 30A–30G are essentially the same as the considerations previously discussed with respect to the configuration shown in FIGS. 29A–29D. Thus, the configuration shown in FIGS. 30A–30G provides similar or identical measures of insensitivity to static and dynamic pitch misalignments, in similar or identical ways.

It should be appreciated for the specific embodiment of the transparent block 3000 shown in FIGS. 30A–30D, various zero-order reflected light beam paths are not eliminated, resulting in crossover beams. Thus, the polarizing and detecting elements described with respect to the configuration shown in FIGS. 20A–20D, or their equivalent, should be included in readheads including such embodiments. However, it should also be appreciated that because the various zero-order reflected light beam paths arising from the light beams 401a, 401b, 402ar and 402br are not aligned with the various operational beams shown in 30A–30D, they may be blocked and eliminated by various appropriate means, and the polarizing and detecting elements described with respect to the configuration shown in FIGS. 20A–20D will not be required.

Figure 30H:
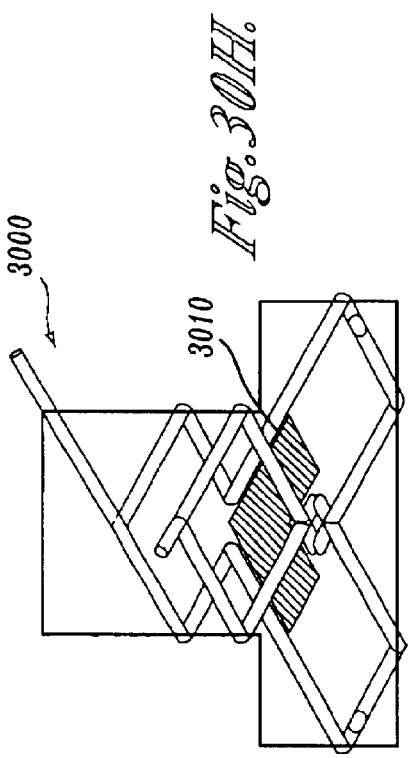
FIG. 30H is a top view illustrating one exemplary element for blocking crossover beams in various embodiments of the transparent block configuration shown in FIGS. 30A–30D.
Figure 30E:
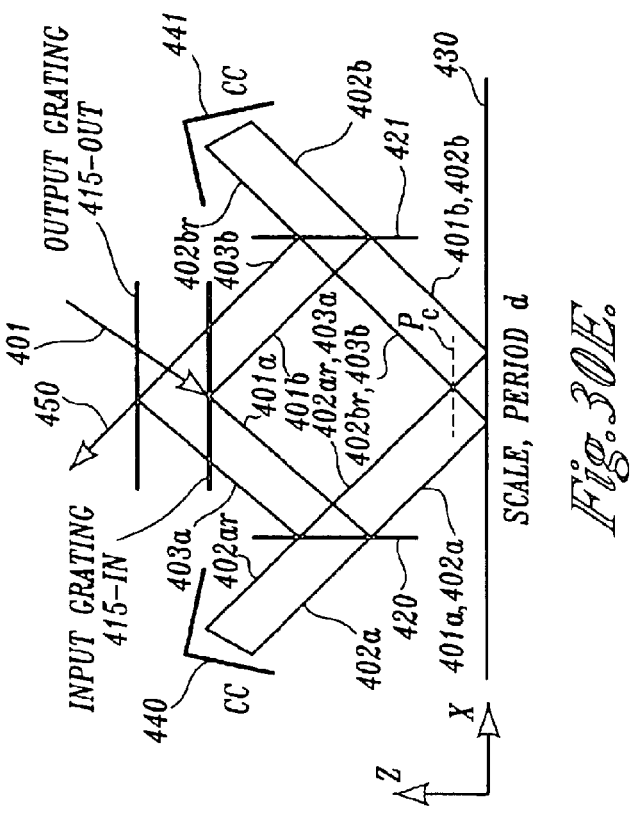
FIG. 30E is a schematic side view of the tenth exemplary embodiment shown in FIGS. 30A–30D.
Figure 30G:
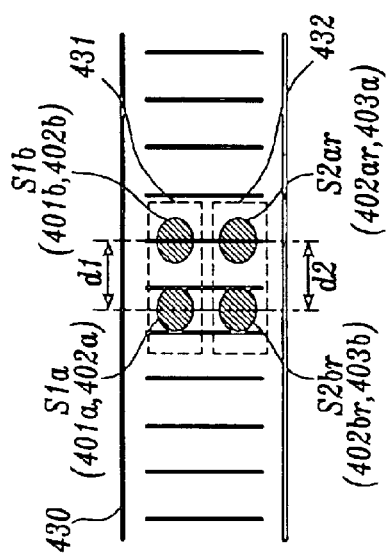
FIG. 30G is a top view of a nominal spot pattern formed on the scale grating according to the tenth exemplary embodiment shown in FIGS. 30A–30F.

FIG. 30H is a top view illustrating one exemplary element for blocking crossover beams in various embodiments of the transparent block 3000 shown in FIGS. 30A–30D. FIG. 30H shows a blocking element 3010 which is applied to the surface of the transparent block 3000 that is adjacent to the scale grating 430, that is, the bottom surface. The extent and location of the blocking element 3010 are determined such that all operational light beams that are diffracted by the scale grating 430, as described above, are admitted through the bottom of the transparent block 3000, but any zero-order reflected beams are blocked by the blocking element 3010 and are not admitted. The blocking element preferably is not reflective, such that any zero-order reflected beams are absorbed. In various exemplary embodiments, the blocking element 3010 is a dark opaque coating having a diffuse surface, applied to the bottom of the transparent block 3000 by any suitable now known or later developed method. Other methods of blocking, or otherwise eliminating zero-order reflected beams will be apparent to one skilled in the art.

Figures 31, 32:
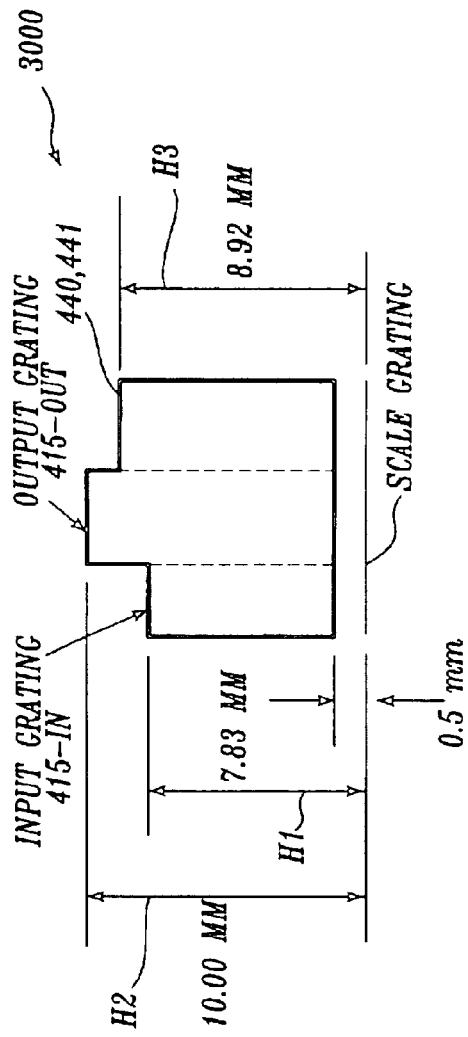
FIG. 31 is a block diagram illustrating a first exemplary embodiment of the heights of the input grating, output grating, and corner cube of the third exemplary transparent block configuration shown in FIG. 30A.
FIG. 32 is an error table showing the errors associated with various initial and dynamic misalignments and drifts for an optical displacement sensing device configuration corresponding to FIGS. 30A–30G and FIG. 31.

FIG. 31 is a block diagram illustrating a first exemplary embodiment of the height of the input grating 415-IN, the output grating 415-OUT and the retroreflectors 440 and 441 for the transparent block configuration 3000. As shown in FIG. 31, the input grating 415-IN is at a height H1, while the output grating 415-OUT is at a height H2, and the top surfaces of the retroreflectors 440 and 441 are at a height H3. In a preferred embodiment the height H3 is approximately midway between the height H1 and the height H2. As an illustrative example, in a preferred embodiment where the height H1 is approximately 7.83 mm and the height H2 is approximately 10 mm, the height H3 would be approximately 8.92 mm.

FIG. 32 shows an error table 3201, similar to the error tables 801 and 901, which lists as entries the error magnitudes associated with various dynamic misalignments and drifts for an optical displacement sensing device configuration according to this invention which corresponds to the basic configuration shown in FIGS. 30A–30G and FIG. 31, having the top surfaces of the retroreflectors 440 and 441 positioned at a height H3 that is midway between the input grating height H1 and the output grating height H2. For all entries in table 3201, the nominal wavelength λ is 0.635 μm, the nominal angle α is 38 degrees, the nominal angle β is 65 degrees, and the grating period of the scale is 0.4 μm. One important aspect of the results shown in table 3201 is that they indicate that the basic configuration shown in FIGS. 30A–30G and FIG. 31 can virtually eliminate dynamic pitch error, similar to various other embodiments described above.

The most significant errors shown in table 3201 are for dynamic wavelength deviation and dynamic gap change. The errors associated with dynamic gap change have the same magnitude in table 3201 and tables 801 and 901, as have been previously discussed. The error associated with dynamic wavelength deviation may be overcome by using more stable light sources and/or improved temperature control in various exemplary embodiments. However, it has also been determined that various encoder readhead configurations according to the principles discussed above with reference to FIGS. 13–18 are also usable to influence the magnitude of the errors associated with dynamic wavelength deviation.

Figures 33, 34:
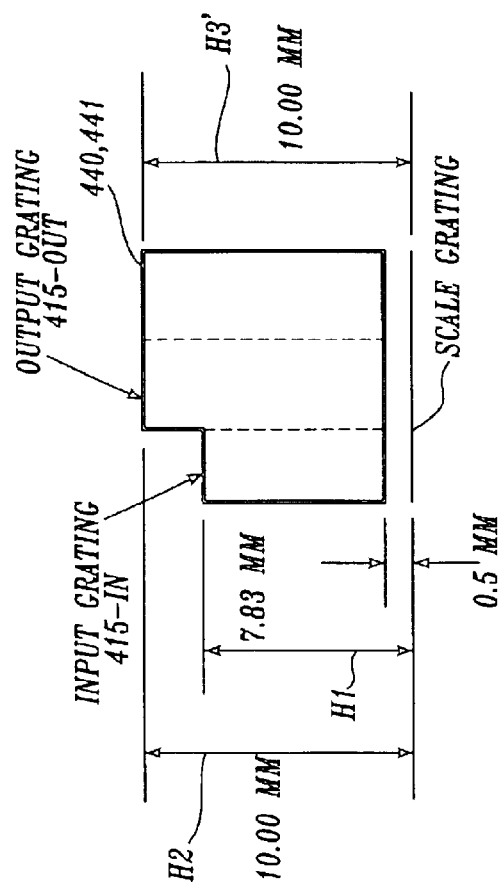
FIG. 33 is a block diagram illustrating a second exemplary embodiment of the heights of the input grating, output grating, and corner cubes of the third exemplary transparent block configuration shown in FIG. 30A.
FIG. 34 is an error table showing the errors associated with various initial and dynamic misalignments and drifts for an optical displacement sensing device configuration corresponding to FIGS. 30A–30G and FIG. 33.

FIG. 33 is a block diagram illustrating a second exemplary embodiment of the height of the input grating 415-IN, the output grating 415-OUT, and the retroreflectors 440 and 441, for the transparent block configuration 3000. The configuration illustrated in FIG. 33 is similar to the configuration illustrated in FIG. 31, with the exception that the configuration in FIG. 33 has the top surfaces of the retroreflectors 440 and 441 at a height H3' which is approximately equal to the height H2 of the output grating 415-OUT.

FIG. 34 shows an error table 3401, which is similar to the error table 3201, except that it corresponds to the basic configuration shown in FIG. 33. Similar to table 3201 of FIG. 32, table 3401 of FIG. 34 illustrates that the underlying encoder readhead embodiment according to this invention virtually eliminates dynamic pitch error. As was the case for table 3201 of FIG. 32, the most significant errors shown in table 3401 of FIG. 34 are for dynamic wavelength deviation and dynamic gap change. In comparing the table 3401 with the table 3201, it can be seen that the errors for the dynamic wavelength deviation are slightly worse in table 3401 as compared to table 3201.

Figure 35A:
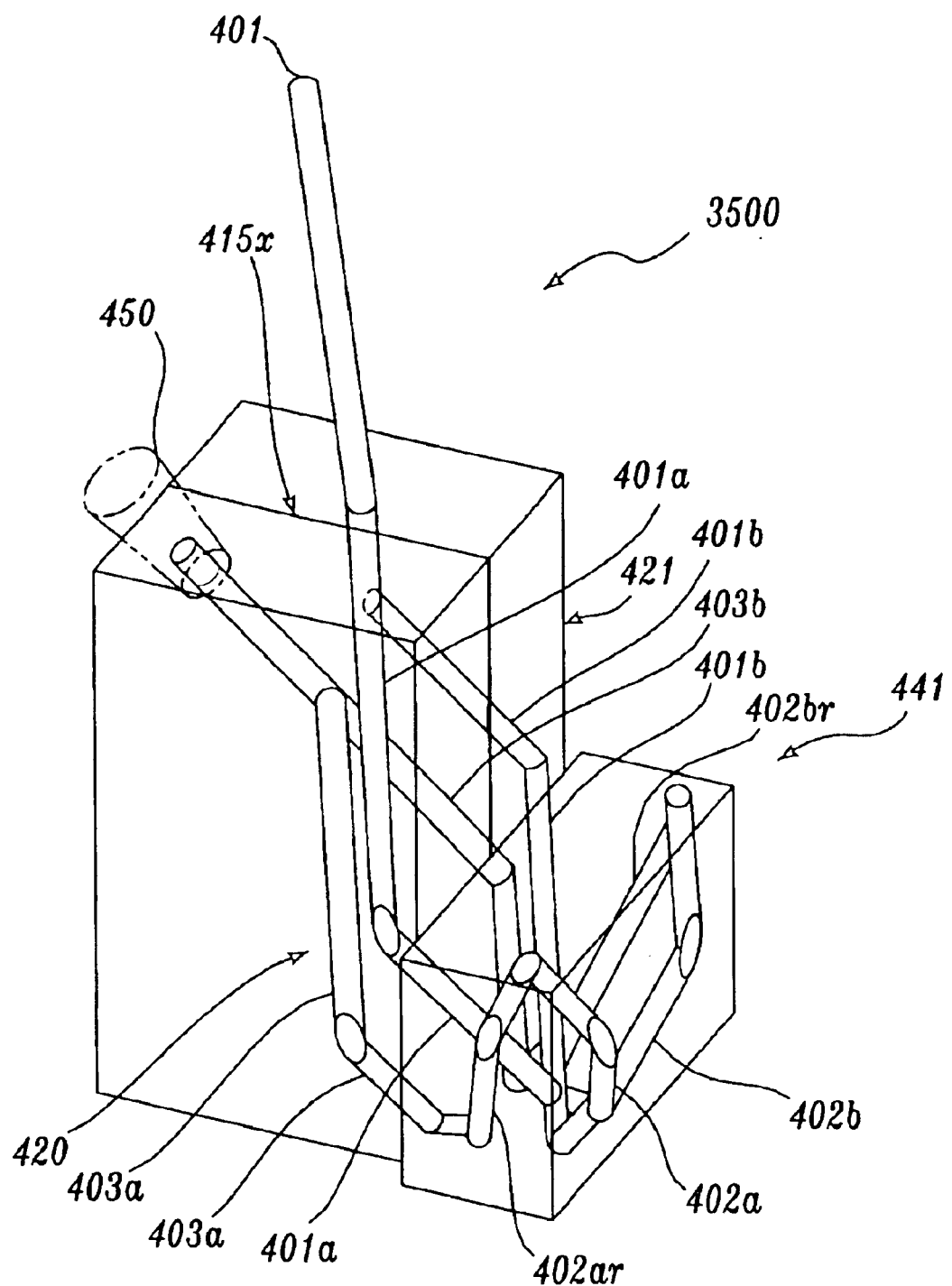
FIG. 35A is a three-dimensional conceptual view of a fourth exemplary transparent block configuration usable in various exemplary embodiments of an optical displacement sensing device in accordance with an eleventh exemplary embodiment of the invention.

FIG. 35A is a three-dimensional conceptual view of a fourth exemplary transparent block configuration usable in various exemplary embodiments of an optical displacement sensing device configuration in accordance with an eleventh exemplary embodiment of the invention. FIG. 35B is a conceptual side view of the transparent block configuration shown in FIG. 35A, while FIG. 35C is a top view, and FIG. 35D is an end view. FIG. 35E is a schematic side view of the optical sensing device configuration shown in of FIG. 35A, while FIG. 35F is a schematic end view. FIG. 35G is a top view of a nominal spot pattern formed on the scale grating according to the eleventh exemplary embodiment shown in FIGS. 35A–35F.

The configuration shown in FIGS. 35A–35G is analogous to the configuration shown in FIGS. 29A–29D in at least two ways. First, the components of the encoder readhead are arranged such that the portion of each of the operational light beams that impinges upon or is diffracted from the scale grating 430 forms the same angle with respect to a hypothetical line which extends parallel to the measuring axis direction 101 and through the respective spots of impingement or diffraction. Such a configuration can be designed in accordance with EQUATIONS 1–3, as previously discussed. Second, the beam paths and light spot configuration of the configuration shown in FIGS. 35A–35G provides a similar measure of insensitivity to static and dynamic pitch misalignment, in a similar way.

It will be appreciated that the FIGS. 35A–35D show a transparent block 3500 which provides similar functions in a similar manner to the transparent block 2600 shown in FIGS. 26A–26C. Furthermore, in FIGS. 35A–35D, evidently corresponding elements and/or elements having similar reference numbers are arranged and operate as previously described with reference to FIGS. 26A–26C, unless otherwise indicated. The generic discussions with reference to FIGS. 26A–26C apply in a corresponding manner to FIGS. 35A–35D, unless otherwise indicated. Furthermore, in FIGS. 35A–35G the reference numbers of several elements evidently corresponding to previously discussed generic or specific elements are omitted, since their arrangement and operation have already been made evident and are not further described with reference to FIGS. 35A–35G.

In the configuration shown in FIGS. 35A–35G, the light beam 401 is split by a beam splitting element 415X into light beams 401*a* and 401*b*, as best shown in FIGS. 35A and 35E. In one embodiment, the beam splitting element 415X is an interface between two sub-blocks of the transparent block 3500 that is fabricated to include a half-silvered mirror or the like. More generally, it will be appreciated that in various embodiments the illustrated beam splitting element 415X is intended to represent any appropriate now known or later developed light beam splitting element or combination of elements, including but not limited to those discussed above with reference to FIGS. 11A–11D, which may be incorporated into the structure and assembly of the transparent block 3500.

In any case, the light beams 401*a* and 401*b* from the beam splitting element 415X are received by the light beam directing elements 420 and 421 and directed along respective converging optical paths toward the first zone 431 on the scale grating 430. In one embodiment, the light beam directing elements 420 and 421 are reflective surfaces of the transparent block 3500, as best shown in FIG. 35C. Similarly to the light beams 401*a* and 401*b* shown in FIGS. 29A–29C, the light beams 401*a* and 401*b* according to the present embodiment first converge toward a hypothetical plane P$_C$ that is parallel to the scale grating surface and proximate to the first zone 431 on the scale grating 430, and then diverge from the hypothetical plane P$_C$ until they reach the scale grating 430. As best shown in FIG. 35C, the split light beams 401*a* and 401*b* impinge on the scale grating 430 in the first zone 431 at light spots having a nominal separation distance d1 along the measuring axis direction 101. In contrast to the configuration shown in FIGS. 29A–29C, in the present embodiment the first zone 431 is toward the bottom of FIGS. 35C and 35G, relative to the second zone 432, because of the relative location and orientation of the beam paths 401*a*, 401*b*, 402*a*, and 402*b* relative to the retroreflectors 440 and 441 in the present embodiment.

The split light beams 401*a* and 401*b* diffract from the first zone 431, giving rise to respective diffracted light beams 402*a* and 402*b*, respectively, which are respective diffraction orders diffracted along respective light paths which converge toward the hypothetical plane P$_C$ proximate to the first zone 431, and then diverge from the hypothetical plane P$_C$ until they enter the retroreflectors 440 and 441, which are provided by reflecting surfaces which meet at respective corners of the transparent block 3500. The retroreflectors 440 and 441 receive the diffracted light beams 402*a* and 402*b*, respectively, along their respective light paths and retroreflect them as light beams 402*ar* and 402*br*, respectively, parallel to the light paths of the diffracted light beams 402*a* and 402*b*.

In contrast to the light beams 402*a* and 402*b*, in various exemplary embodiments according to the configuration shown in FIGS. 35A–35G, the retroreflectors 440 and 441 that is, the retroreflecting surfaces of the transparent block 3500, are located and/or oriented relative to the diffracted light beams 402a and 402b such that the retroreflected beams 402ar and 402br converge both before and after reaching the hypothetical plane $P_C$, until they reach the scale grating 430, as best shown in FIGS. 35B and 35E. As best shown in FIG. 35C, the retroreflected beams 402ar and 402br impinge on the scale grating 430 in the second zone 432 at light spots having a nominal separation distance d2 along the measuring axis direction 101.

The retroreflected light beams 402ar and 402br diffract from the second zone 432, giving rise to respective later-diffracted light beams 403a and 403b. The later-diffracted light beams 403a and 403b then travel along respective optical paths to be directed by the light beam directing elements 420 and 421 toward a portion of the beam splitting element 415X which acts as a light beam directing element that deflects at least one of the beams to bring the later-diffracted light beams 403a and 403b into alignment or near alignment in the shared zone 450 according to the principles of this invention.

FIG. 35G is a top view of one exemplary nominal spot pattern formed on the scale grating 430 according to the eleventh exemplary embodiment shown in FIGS. 35A–35F. As illustrated in FIG. 35G, the light beam 401a nominally impinges on the scale grating 430 at a light spot S1a, giving rise to the diffracted light beam 402a. The light beam 401b nominally impinges on the scale grating 430 at a light spot S1b, giving rise to the diffracted light beam 402b. The light beam 402br nominally impinges on the scale grating 430 at a light spot S2br, giving rise to the later-diffracted light beam 403b. The light beam 402ar nominally impinges on the scale grating 430 at a light spot S2ar, giving rise to the later-diffracted light beam 403a.

Similarly to FIG. 29D, in FIG. 35G the light spots S1a and S1b are located within the first zone 431 and are separated by a first distance d1, and the light spots S2ar and S2br are located within the second zone 432 and are separated by a second distance d2. In comparison to their positions as shown in FIG. 29D, as shown in FIG. 35G the positions of the first zone 431 and the second zone 432 are reversed. This is due to the differences between the tenth and eleventh exemplary embodiments. Nevertheless, it should be appreciated from the foregoing discussions that all of the considerations related to the location and/or orientation of the retroreflectors 440 and 441 relative to the diffracted light beams 402a and 402b, the dimensions d1 and d2, and the location of the various lights spots for the configuration shown in FIGS. 35A–35G are essentially the same as the considerations previously discussed with respect to the configuration shown in FIGS. 29A–29D. Thus, the configuration shown in FIGS. 35A–35G provides similar or identical measures of insensitivity to static and dynamic pitch misalignments, in similar or identical ways.

It should be further appreciated for the specific embodiment of the transparent block 3000 shown in FIGS. 35A–35D, various zero-order reflected light beam paths are not eliminated, resulting in crossover beams. Thus, the polarizing and detecting elements described with respect to the configuration shown in FIGS. 26A–26C, or their equivalent, should be included in readheads including such embodiments. However, it should also be appreciated that because the various zero-order reflected light beam paths arising from the light beams 401a, 401b, 402ar and 402br are not aligned with the various operational beams shown in 35A–35D, in various embodiments they may be blocked and eliminated by various appropriate means, as previously discussed with respect to FIG. 30H, and the polarizing and detecting elements described with respect to the configuration shown in FIGS. 26A–26C will not be required. Instead, the non-polarized detection schemes, and various related elements such as the optical wedge element 491 and the like, previously described with respect to FIGS. 26A–26C, may be used in such embodiments.

Figure 36:
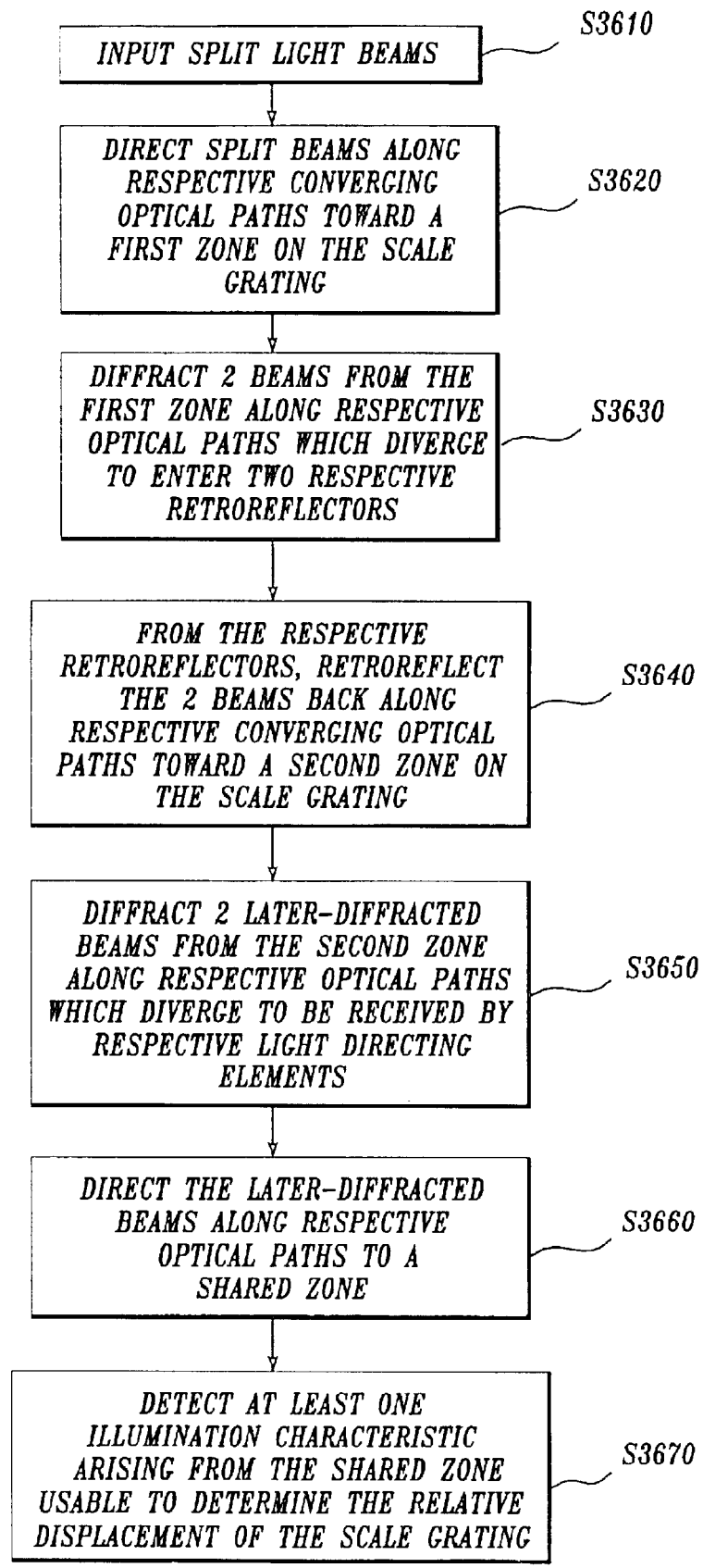
FIG. 36 is a flow diagram for a second method of using an optical displacement sensing device in accordance with various exemplary embodiments of the invention.

It will be appreciated that FIG. 36 shows a flow diagram for a method of using an optical displacement sensing device in accordance with various previously described exemplary embodiments of the invention. Certain elements of the flow diagram of FIG. 36 are similar to the elements of the flow diagram of FIG. 28. As shown in FIG. 36, the method begins at a block S3610 by inputting split light beams to be received by respective light directing elements of the optical displacement sensing device. The method then continues to a block S3620, where the split light beams are directed along respective converging optical paths toward a first zone on a scale grating using various light directing elements. In a preferred embodiment, the split light beams are directed along nominally symmetrical converging paths toward the first zone. In various embodiments, the respective converging optical paths of the split light beams converge until reaching the first zone on a scale grating. In various other embodiments, the respective converging optical paths of the split light beams converge until reaching a hypothetical plane parallel and proximate to the first zone on a scale grating and then diverge over a small remaining distance to the first zone on the scale grating. The method then continues to a block S3630.

At block S3630, the split light beams are each diffracted from the first zone on the scale grating, and two diffracted beams are directed along respective optical paths, which diverge to enter two respective retroreflectors. The method then continues to a block S3640.

At block S3640 the two diffracted beams entering the respective retroreflectors are retroreflected as two retroreflected beams back along respective converging optical paths toward a second zone on the scale grating. In various embodiments, if at the block S3620 the respective converging optical paths of the split light beams converged until reaching the first zone on a scale grating, then at the block S3640 the two retroreflected beams converge back along respective converging optical paths until reaching a hypothetical plane parallel and proximate to the second zone on the scale grating and then diverge over a small remaining distance to the second zone on the scale grating. In various other embodiments, if at the block S3620 the respective converging optical paths of the split light beams converged until reaching a hypothetical plane parallel and proximate to the first zone on the scale grating and then diverged over a small remaining distance to the first zone on the scale grating, then at the block S3640 the two retroreflected beams converge back along respective converging optical paths until reaching the second zone on a scale grating. The method then continues to a block S3650.

At block S3650 the beams retroreflected back to the second zone on the scale grating are each diffracted from the second zone on the scale grating to produce two later-diffracted beams that are directed along respective optical paths which diverge to be received by respective light directing elements. The method then continues to a block S3660.

At block S3660, the respective light directing elements direct the two later-diffracted beams along respective paths to a shared zone. In a preferred embodiment, the beams directed to the shared zone are directed along nominally symmetrical paths until being received by a light directing element that deflects at least one of the beams so as to bring the beams approximately into alignment in the shared zone. The method then continues to a block S3670, where the method ends by detecting at least one illumination characteristic arising from the shared zone and determining a relative displacement of the scale grating relative to the optical displacement sensing device based on the detection result.

While this invention has been described in conjunction with the specific embodiments above, it should be appreciated that these specific embodiments offer many alternatives, combinations, modifications, and variations. As one example, although the various embodiments according to the invention are shown herein as linear transducers, the designs may be used in or adapted to cylindrical and circular rotary applications by one of ordinary skill in the art. As a separate example, this invention may use light wavelengths outside the visible spectrum, provided that such wavelengths are operable with scale gratings and optical detectors according to the principles of this invention. Accordingly, the preferred embodiments of this invention, as set forth above, are intended to be illustrative and not limiting. Various changes can be made without departing from the spirit and scope of this invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A device for measuring the relative displacement of a scale along a measuring axis, the scale having a grating formed along the measuring axis, the device comprising:

a split light beam input portion;

two or more light beam directing elements;

two or more retroreflector elements; and an optical detector;

wherein:
   the split light beam input portion is positioned to input two split light beams along respective light paths;

the two or more light beam directing elements are positioned to receive the two split light beams along their respective light paths and direct the two split light beams along respective converging light paths toward a first zone on the scale grating, the two split light beams giving rise to two diffracted light beams from the first zone along respective light paths which diverge to enter the two or more retroreflector elements;

the two or more retroreflector elements are positioned to receive the two diffracted light beams from the first zone and retroreflect two retroreflected light beams along respective converging light paths toward a second zone on the scale grating; and the two retroreflected light beams give rise to two later-diffracted light beams along respective light paths from the second zone that diverge to be received by respective light beam directing elements and are directed to enter a shared zone; and the optical detector detects at least one illumination characteristic arising from the shared zone, the detected at least one illumination characteristic usable to determine the relative displacement of the scale.

2. The device of claim 1, wherein the optical detector is usable to output at least one output signal which is indicative of the at least one detected illumination characteristic usable to determine the relative displacement of the scale.

3. The device of claim 1, wherein the respective light paths which diverge to enter the two or more retroreflector elements each receive a diffracted light beam arising from only one of the split beams.

4. The device of claim 1, wherein the respective light paths from the second zone which diverge to be received by the two or more light beam directing elements each receive a later-diffracted light beam arising from only one of the retroreflected light beams.

5. The device of claim 1, wherein the scale grating has a pitch, the pitch of the scale grating being less than a wavelength of light input by the split light beam input portion.

6. The device of claim 1, wherein the two split light beams giving rise to two diffracted light beams from the first zone each impinge on a nominally positioned scale grating at first zone spots which are separated by a first nominal distance along the direction of the measuring axis and the two retroreflected light beams giving rise to two later-diffracted light beams along respective light paths from the second zone each impinge on the nominally positioned scale grating at second zone spots which are separated by a second nominal distance along the direction of the measuring axis.

7. The device of claim 6, wherein both of the first nominal distance and the second nominal distance are zero.

8. The device of claim 6, wherein a first one of the two diffracted light beams from the first zone originates from the first zone spot which is farthest in a first direction along the measuring axis and is retroreflected as the retroreflected light beam which impinges at the second zone spot which is farthest in the opposite direction along the measuring axis.

9. The device of claim 8, wherein the midpoint of the first nominal distance and the midpoint of the second nominal distance are located approximately perpendicular to the measuring axis direction relative to each other.

10. The device of claim 8, wherein the respective light paths which diverge to enter the two or more retroreflector elements each receive a diffracted light beam arising from only one of the split beams.

11. The device of claim 8, wherein at least one of the first nominal distance and the second nominal distance is greater than 1 millimeter and less than 4 millimeters.

12. The device of claim 8, wherein the first nominal distance and the second nominal distance are equal.

13. The device of claim 1, wherein the first and second zones are separated from one another along a direction perpendicular to the measuring axis.

14. The device of claim 1, wherein the two split light beams nominally impinge on the first zone on the scale grating such that each forms the same respective angle less than or equal to 60 degrees and greater than or equal to 10 degrees relative to a line extending parallel to the measuring axis and through their respective impingement spots.

15. The device of claim 14, wherein the respective angle is less than or equal to 40 degrees and greater than or equal to 20 degrees.

16. The device of claim 14, wherein the respective angle is less than or equal to 30 degrees and greater than or equal to 20 degrees.

17. The device of claim 14, wherein the scale grating has a pitch, the pitch of the scale grating being less than a wavelength of the light input by the split light beam input portion.

18. The device of claim 17, wherein the pitch of the scale grating is less than 0.8 times the wavelength of the light and the respective angle is less than or equal to 45 degrees and greater than or equal to 20 degrees.

19. The device of claim 1, wherein at least a portion of the respective converging light paths toward the first zone are inclined in a first direction away from a plane aligned parallel to the measuring axis and normal to a nominal positioning plane for the scale grating, and at least a portion of the respective light paths from the first zone which diverge to enter the two or more retroreflector elements are inclined in an opposite direction away from the plane aligned parallel to the measuring axis and normal to the nominal positioning plane for the scale grating.

20. The device of claim 1, wherein the measuring axis comprises a circular track and the scale grating is formed along at least a portion of the circular track, the scale is operable by rotation, and the device is usable to measure the angular displacement of the scale.

21. The device of claim 1, wherein the two or more light beam directing elements comprise at least one plane mirror surface for each respective split light beam path.

22. The device of claim 21, wherein a first portion of each respective plane mirror surface is used for directing a respective split light beam and a second portion of each respective plane mirror surface is used for directing a respective later-diffracted light beam.

23. The device of claim 21, wherein the two or more light beam directing elements comprise opposing surfaces of a block of transparent material.

24. The device of claim 1, wherein the two or more retroreflector elements comprise respective corner regions of a block of transparent material.

25. The device of claim 1, wherein the split light beam input portion comprises a light source and one of a beam splitter and an input grating.

26. The device of claim 25, further comprising an output grating that at least partially directs at least one of the later-diffracted light beams to enter the shared zone, wherein the split light beam input portion comprises the input grating.

27. The device of claim 26, wherein for each of the two or more retroreflector elements the reflective portion which is farthest from the nominal positioning plane for the scale grating is positioned at a height which is approximately half-way between the heights of the input grating and the output grating.

28. The device of claim 1, wherein the optical detector comprises an optical array and the at least one illumination characteristic arising from the shared zone arises from an interference fringe pattern in the shared zone.

29. The device of claim 1, wherein zero order reflected light beams are eliminated from the operable light paths of the device so that no polarizing elements are required.

30. A method for determining the relative displacement of a scale along a measuring axis, the scale having a grating formed along the measuring axis, the method comprising:
transmitting a light beam from a light source onto a light beam splitting element to generate two split light beams;
directing the two split light beams along respective converging light paths toward a first zone on the scale grating;
diffracting the two split light beams to produce two diffracted light beams along respective light paths which diverge to enter respective retroreflectors;
retroreflecting the two diffracted light beams as two retroreflected beams along respective converging light paths toward a second zone on the scale grating;
diffracting the two retroreflected beams to produce two later-diffracted light beams along respective light paths from the second zone that diverge to be received by respective light beam directing elements;
directing the two later-diffracted light beams to enter a shared zoned; and
detecting at least one illumination characteristic arising from the shared zone, the detected at least one illumination characteristic usable to determine the relative displacement of the scale.

31. The method of claim 30, further comprising outputting at least one output signal from the optical detector which is indicative of the at least one detected illumination characteristic, and determining the relative displacement of the scale based on the at least one output signal.

32. The method of claim 30, wherein the respective light paths which diverge to enter the two or more retroreflector elements each receive a diffracted light beam arising from only one of the split beams.

33. The method of claim 30, wherein the respective light paths from the second zone that diverge to be received by the two or more light beam directing elements each receive a later-diffracted light beam arising from only one of the retroreflected light beams.

34. The method of claim 30, wherein the two split light beams giving rise to two diffracted light beams from the first zone are each directed to impinge on a nominally positioned scale grating at first zone spots which are separated by a first nominal distance along the direction of the measuring axis and the two retroreflected light beams giving rise to two later-diffracted light beams along respective light paths from the second zone are each retroreflected to impinge on the nominally positioned scale grating at second zone spots which are separated by a second nominal distance along the direction of the measuring axis.

35. The method of claim 34, wherein both of the first nominal distance and the second nominal distance are zero.

36. The method of claim 34, wherein a first one of the two diffracted light beams from the first zone originates from the first zone spot which is farthest in a first direction along the measuring axis and is retroreflected as the retroreflected light beam which impinges at the second zone spot which is farthest in the opposite direction along the measuring axis.

37. The method of claim 36, wherein the midpoint of the first nominal distance and the midpoint of the second nominal distance are located approximately perpendicular to the measuring axis direction relative to each other.

38. The method of claim 36, wherein the respective light paths which diverge to enter the two or more retroreflector elements each receive a diffracted light beam arising from only one of the split beams.

39. The method of claim 36, wherein at least one of the first nominal distance and the second nominal distance is greater than 1 millimeter and less than 4 millimeters.

40. The method of claim 36, wherein the first nominal distance and the second nominal distance are equal.

41. The method of claim 30, wherein the two split light beams nominally impinge on the first zone on the scale grating such that each forms the same respective angle less than or equal to 60 degrees and greater than or equal to 10 degrees relative to a line extending parallel to the measuring axis and through their respective impingement spots.

42. The method of claim 41, wherein the respective angle is less than or equal to 40 degrees and greater than or equal to 20 degrees.

43. The method of claim 41, wherein the respective angle is less than or equal to 30 degrees and greater than or equal to 20 degrees.

44. The method of claim 41, wherein the scale grating has a pitch, the pitch of the scale grating being less than 0.8 times a wavelength of the light transmitted from the light source and the respective angle is less than or equal to 45 degrees and greater than or equal to 20 degrees.

45. The method of claim 30, wherein at least a portion of the respective converging light paths toward the first zone are inclined in a first direction away from a plane aligned parallel to the measuring axis and normal to a nominal positioning plane for the scale grating, and at least a portion of the respective light paths from the first zone which diverge to enter the two or more retroreflector elements are inclined in an opposite direction away from the plane aligned parallel to the measuring axis and normal to the nominal positioning plane for the scale grating.

46. A device for measuring the relative displacement of a scale along a measuring axis, the scale having a grating formed along the measuring axis, the device comprising:

a split light beam input portion for inputting two split light beams along respective light paths;

two or more light beam directing elements for directing the two split light beams along respective light paths which converge proximate to a first zone on the scale grating to give rise to two diffracted light beams along respective light paths which diverge proximate to the first zone;

two or more retroreflector elements for receiving the two diffracted light beams along respective light paths and retroreflecting the two diffracted light beams along respective light paths which converge proximate to a second zone on the scale grating to give rise to two later-diffracted light beams along respective light paths which diverge proximate to the second zone; and an optical detector;

wherein the two later-diffracted light beams along respective light paths which diverge proximate to the second zone are directed to enter a shared zone and the optical detector detects at least one illumination characteristic arising from the shared zone, the detected at least one illumination characteristic usable to determine the relative displacement of the scale.

47. The device of claim 46, wherein the optical detector is usable to output at least one output signal which is indicative of the at least one detected illumination characteristic usable to determine the relative displacement of the scale.

48. The device of claim 46, wherein the respective light paths which diverge proximate to the first zone each receive a diffracted light beam arising from only one of the split beams.

49. The device of claim 46, wherein the respective light paths which diverge proximate to the second zone each receive a later-diffracted light beam arising from only one of the retroreflected light beams.

50. The device of claim 46, wherein the scale grating has a pitch, the pitch of the scale grating being less than a wavelength of light input by the split light beam input portion.

51. The device of claim 46, wherein the respective light paths which converge proximate to the first zone on the scale grating at least partially overlap at a nominal positioning plane for the scale grating.

52. The device of claim 46, wherein the respective light paths which converge proximate to the first zone on the scale grating nominally fully overlap at a nominal positioning plane for the scale grating.

53. The device of claim 46, wherein the respective light paths which converge proximate to the second zone on the scale grating at least partially overlap at a nominal positioning plane for the scale grating.

54. The device of claim 46, wherein the respective light paths which converge proximate to the second zone on the scale grating nominally fully overlap at a nominal positioning plane for the scale grating.

55. The device of claim 46, wherein the first and second zones at least partially overlap, and wherein the respective light paths which converge proximate to the second zone and the respective light paths which converge proximate to the first zone at least partially overlap at a nominal positioning plane for the scale grating.

56. The device of claim 46, wherein the first and second zones are separated from one another along a direction perpendicular to the measuring axis.

57. The device of claim 46, wherein the two split light beams nominally impinge on the first zone on the scale grating such that each forms the same respective angle less than or equal to 60 degrees and greater than or equal to 10 degrees relative to a line extending parallel to the measuring axis and through their respective impingement points.

58. The device of claim 57, wherein the respective angle is less than or equal to 60 degrees and greater than or equal to 20 degrees.

59. The device of claim 57, wherein the respective angle is less than or equal to 50 degrees and greater than or equal to 20 degrees.

60. The device of claim 57, wherein the respective angle is less than or equal to 40 degrees and greater than or equal to 20 degrees.

61. The device of claim 57, wherein the respective angle is less than or equal to 30 degrees and greater than or equal to 20 degrees.

62. The device of claim 57, wherein the scale grating has a pitch, the pitch of the scale grating being less than a wavelength of the light input by the split light beam input portion.

63. The device of claim 62, wherein the pitch of the scale grating is less than 0.8 times the wavelength of the light and the respective angle is less than or equal to 45 degrees and greater than or equal to 20 degrees.

64. The device of claim 46, wherein at least a portion of the respective light paths which converge proximate to the first zone nominally coincide with a plane aligned parallel to the measuring axis and normal to a nominal positioning plane for the scale grating, and at least a portion of the respective light paths which diverge proximate to the first zone nominally coincide with the plane aligned parallel to the measuring axis and normal to the nominal positioning plane for the scale grating.

65. The device of claim 46, wherein at least a portion of the respective light paths which converge proximate to the first zone are inclined in a first direction away from a plane aligned parallel to the measuring axis and normal to a nominal positioning plane for the scale grating, and at least a portion of the respective light paths which diverge proximate to the first zone are inclined in an opposite direction away from the plane aligned parallel to the measuring axis and normal to the nominal positioning plane for the scale grating.

66. The device of claim 46, wherein the measuring axis comprises a circular track and the scale grating is formed along at least a portion of the circular track, the scale is operable by rotation, and the device is usable to measure the angular displacement of the scale.

67. The device of claim 46, wherein the two or more light beam directing elements comprise at least one plane mirror surface for each respective split light beam path.

68. The device of claim 67, wherein a first portion of each respective plane mirror surface is used for directing a respective split light beam and a second portion of each respective plane mirror surface is used for directing a respective later-diffracted light beam.

69. The device of claim 67, wherein the two or more light beam directing elements comprise opposing surfaces of a block of transparent material.

70. The device of claim 46, wherein the two or more retroreflector elements comprise respective corner regions of a block of transparent material.

71. The device of claim 46, wherein the split light beam input portion comprises a light source and one of a beam splitter and a grating.

72. The device of claim 71, wherein the light source comprises one of a laser diode and laser light received through an optical fiber.

73. The device of claim 71, wherein the split light beam input portion comprises the beam splitter, and the two split light beams are input at a first height relative to a nominal positioning plane for the scale grating, and for each of the two or more retroreflector elements the reflective portion which is farthest from nominal positioning plane for the scale grating is positioned at a height which is not more than 80% of the first height.

74. The device of claim 71, wherein the split light beam input portion comprises the grating, and the two split light beams are input at a first height relative to a nominal positioning plane for the scale grating, and for each of the two or more retroreflector elements the reflective portion which is farthest from nominal positioning plane for the scale grating is positioned at a height which is more than 80% and less than 120% of the first height.

75. The device of claim 46, wherein the optical detector comprises an optical array and the at least one illumination characteristic arising from the shared zone arises from an interference fringe pattern in the shared zone.

76. The device of claim 46, wherein the device further comprises at least one polarizing element arranged such that the two later-diffracted light beams along respective light paths which diverge proximate to the second zone are orthogonally polarized upon entering the shared zone; and the optical detector comprises two or more polarization sensitive detector portions.

77. A method for determining the relative displacement of a scale along a measuring axis, the scale having a diffraction grating formed along the measuring axis, the method comprising:

transmitting a light beam from a light source onto a light beam splitting element to generate two split light beams;

directing the two split light beams along respective light paths which converge proximate to a first zone on the scale grating;

diffracting the two split light beams in the first zone to produce two diffracted light beams along respective light paths which diverge proximate to the first zone and which enter respective retroreflectors;

retroreflecting the two diffracted light beams along respective light paths which converge proximate to a second zone on the scale grating;

diffracting the two diffracted light beams to produce two later-diffracted light beams along respective light paths which diverge proximate to the second zone and which enter a shared zone; and detecting at least one illumination characteristic arising from the shared zone, the detected at least one illumination characteristic usable to determine the relative displacement of the scale.

78. The method of claim 77, further comprising outputting at least one output signal from the optical detector which is indicative of the at least one detected illumination characteristic; and determining the relative displacement of the scale based on the at least one output signal.

79. The method of claim 77, wherein the respective light paths which diverge proximate to the first zone each receive a diffracted light beam arising from only one of the split beams.

80. The method of claim 77, wherein the respective light paths which diverge proximate to the second zone each receive a later-diffracted light beam arising from only one of the retroreflected light beams.

81. The method of claim 77, wherein the scale grating has a pitch, the pitch of the scale grating being less than a wavelength of the light transmitted from the light source.

82. The method of claim 77, wherein the respective light paths which converge proximate to the first zone on the scale grating at least partially overlap at a nominal positioning plane for the scale grating.

83. The method of claim 77, wherein the respective light paths which converge proximate to the first zone on the scale grating nominally fully overlap at a nominal positioning plane for the scale grating.

84. The method of claim 77, wherein the respective light paths which converge proximate to the second zone on the scale grating at least partially overlap at a nominal positioning plane for the scale grating.

85. The method of claim 77, wherein the respective light paths which converge proximate to the second zone on the scale grating nominally fully overlap at a nominal positioning plane for the scale grating.

86. The method of claim 77, wherein the first and second zones at least partially overlap, and wherein the respective light paths which converge proximate to the second zone and the respective light paths which converge proximate to the first zone at least partially overlap at a nominal positioning plane for the scale grating.

87. The method of claim 77, wherein the first and second zones are separated from one another along a direction perpendicular to the measuring axis.

88. The method of claim 77, wherein the two split light beams nominally impinge on the first zone on the scale grating such that each forms the same respective angle less than or equal to 60 degrees and greater than or equal to 10 degrees relative to a line extending parallel to the measuring axis and through their respective impingement points.

89. The method of claim 88, wherein the respective angle is less than or equal to 60 degrees and greater than or equal to 20 degrees.

90. The method of claim 88, wherein the respective angle is less than or equal to 50 degrees and greater than or equal to 20 degrees.

91. The method of claim 88, wherein the respective angle is less than or equal to 40 degrees and greater than or equal to 20 degrees.

92. The method of claim 88, wherein the respective angle is less than or equal to 30 degrees and greater than or equal to 20 degrees.

93. The method of claim 88, wherein the scale grating has a pitch, the pitch of the scale grating being less than a wavelength of the light transmitted from the light source.

94. The method of claim 93, wherein the scale grating has a pitch, the pitch of the scale grating being less than 0.8 times the wavelength of the light transmitted from the light source and the respective angle is less than or equal to 45 degrees and greater than or equal to 20 degrees.

95. The method of claim 77, wherein at least a portion of the respective light paths which converge proximate to the first zone are inclined in a first direction away from a plane aligned parallel to the measuring axis and normal to a nominal positioning plane for the scale grating, and at least a portion of the respective light paths which diverge proximate to the first zone are inclined in an opposite direction away from the plane aligned parallel to the measuring axis and normal to the nominal positioning plane for the scale grating.

* * * * *

UNITED STATES PATENT AND TRADEMARK OFFICE
CERTIFICATE OF CORRECTION

PATENT NO. : 6,771,377 B2
DATED : August 3, 2004
INVENTOR(S) : B.K. Jones et al.

It is certified that error appears in the above-identified patent and that said Letters Patent is hereby corrected as shown below:

Title page,
Item [56], References Cited, U.S. PATENT DOCUMENTS, insert:
-- 5,499,096   3/1996     Tamiya
   4,975,571  12/1990    McMurtry et al.
   4,930,895   6/1990    Nishimura et al.
   5,079,418   1/1992    Michel et al.
   5,146,085   9/1992    Ishizuka et al.
   5,424,833   6/1995    Huber et al.
   6,166,817  12/2000    Kuroda
   6,407,815   6/2002    Akihiro --

Signed and Sealed this

Twenty-second Day of February, 2005

JON W. DUDAS
*Director of the United States Patent and Trademark Office*